(12) United States Patent  
Shikano et al.

(10) Patent No.: US 12,276,131 B2  
(45) Date of Patent: Apr. 15, 2025

(54) MANAGEMENT SYSTEM, MANAGEMENT DEVICE, MANAGEMENT METHOD, AND STORAGE MEDIUM

(71) Applicant: HONDA MOTOR CO., LTD., Tokyo (JP)

(72) Inventors: Naoto Shikano, Wako (JP); Tomoki Murozono, Wako (JP); Shuhei Kondo, Wako (JP); Koji Masuda, Wako (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 553 days.

(21) Appl. No.: 17/637,822

(22) PCT Filed: Sep. 23, 2020

(86) PCT No.: PCT/JP2020/035740  
§ 371 (c)(1),  
(2) Date: Feb. 24, 2022

(87) PCT Pub. No.: WO2021/060257  
PCT Pub. Date: Apr. 1, 2021

(65) Prior Publication Data  
US 2022/0282512 A1    Sep. 8, 2022

(30) Foreign Application Priority Data

Sep. 24, 2019 (JP) .................................. 2019-173489  
Sep. 24, 2019 (JP) .................................. 2019-173490  
Sep. 24, 2019 (JP) .................................. 2019-173492

(51) Int. Cl.  
*E04H 6/16* (2006.01)  
*B60W 30/06* (2006.01)  
(Continued)

(52) U.S. Cl.  
CPC .................. *E04H 6/18* (2013.01); *E04H 6/12* (2013.01); *E04H 6/24* (2013.01); *E04H 6/424* (2013.01);  
(Continued)

(58) Field of Classification Search  
CPC ....... G08G 1/148; G08G 1/146; B60W 30/06; E04H 6/12; E04H 6/18; E04H 6/24; E04H 6/424  
See application file for complete search history.

(56) References Cited

U.S. PATENT DOCUMENTS 10,755,570 B1 * 8/2020 Zhou .................. B62D 15/0285  
2017/0004710 A1 * 1/2017 Dozono .................. G07F 17/24  
(Continued)

FOREIGN PATENT DOCUMENTS

JP    05-156837    6/1993  
JP    2002-163758    6/2002  
(Continued)

OTHER PUBLICATIONS

International Search Report and Written Opinion for International Application No. PCT/JP2020/035740 mailed on Dec. 15, 2020 10 pages.

*Primary Examiner* — Thomas Randazzo  
(74) *Attorney, Agent, or Firm* — Amin, Turocy & Watson, LLP

(57) ABSTRACT

According to an embodiment, a management system includes a vehicle management device configured to manage parking of a vehicle in a parking space and delivery of the vehicle from the parking space, and a vehicle conveying device configured to be able to convey the vehicle in forward-backward and widthwise directions of the vehicle. The vehicle management device includes a controller configured to control the vehicle conveying device so that the (Continued)

vehicle is conveyed to the parking space when a request for parking the vehicle located within a section where parking in the parking space is able to be requested has been received.

53 Claims, 33 Drawing Sheets

(51) Int. Cl.
    *E04H 6/12*      (2006.01)
    *E04H 6/18*      (2006.01)
    *E04H 6/24*      (2006.01)
    *E04H 6/42*      (2006.01)
    *G08G 1/14*      (2006.01)

(52) U.S. Cl.
    CPC ............ *G08G 1/146* (2013.01); *G08G 1/148* (2013.01); *B60W 30/06* (2013.01)

(56) References Cited

U.S. PATENT DOCUMENTS

| | | | | |
|---|---|---|---|---|
| 2018/0018870 A1* | 1/2018 | Sehra | ................. | G08G 1/04 |
| 2018/0229719 A1* | 8/2018 | Izumi | ................. | B60W 30/06 |
| 2019/0242148 A1* | 8/2019 | Richardson | ............. | H04W 4/40 |
| 2019/0283736 A1* | 9/2019 | Watanabe | ............. | B60W 30/06 |
| 2020/0242933 A1* | 7/2020 | Brudner | ................. | G08G 1/148 |
| 2020/0242943 A1* | 7/2020 | Kuwabara | .......... | B62D 15/0285 |
| 2020/0272950 A1* | 8/2020 | Xu | ..................... | G06Q 30/0185 |
| 2021/0343145 A1* | 11/2021 | Zhao | ..................... | H04N 7/188 |

FOREIGN PATENT DOCUMENTS

| | | | | | |
|---|---|---|---|---|---|
| JP | 2011-253295 | | 12/2011 | | |
| JP | 2011253295 | A | * 12/2011 | ............... | E04H 6/00 |
| JP | 2013-231322 | | 11/2013 | | |
| JP | 2014-142704 | | 8/2014 | | |
| JP | 2016-216936 | | 12/2016 | | |
| JP | 2017-182230 | | 10/2017 | | |
| JP | 2019-035261 | | 3/2019 | | |
| JP | 2019035261 | A | * 3/2019 | ............... | E04H 6/18 |
| JP | 2019-148131 | | 9/2019 | | |
| JP | 2019148131 | A | * 9/2019 | ............... | E04H 6/18 |

* cited by examiner

| VEHICLE ID | LICENSE PLATE | VEHICLE TYPE | PARKING LOCATION | PARKING START DATE AND TIME | PARKING END DATE AND TIME | STATUS |
|---|---|---|---|---|---|---|
| V1 | 12-34 | TYPEA | *** | 201908270900 | | PARKED |
| V2 | 23-45 | TYPEB | *** | 201908270910 | | PARKED |
| V3 | 34-56 | TYPEB | *** | 201908271010 | 201908271030 | DELIVERED |
| V4 | 45-67 | TYPEA | *** | 201908271028 | | PARKED |
| V5 | 56-78 | TYPEC | *** | 201908271045 | | PARKED |
| V6 | 67-89 | TYPEC | *** | 201908271111 | | PARKED |

MANAGEMENT SYSTEM, MANAGEMENT DEVICE, MANAGEMENT METHOD, AND STORAGE MEDIUM

TECHNICAL FIELD

The present invention relates to a management system, a management device, a management method, and a storage medium.

Priority is claimed on Japanese Patent Application No. 2019-173489, filed Sep. 24, 2019, the content of which is incorporated herein by reference.

Priority is claimed on Japanese Patent Application No. 2019-173492, filed Sep. 24, 2019, the content of which is incorporated herein by reference.

Priority is claimed on Japanese Patent Application No. 2019-173490, filed Sep. 24, 2019, the content of which is incorporated herein by reference.

BACKGROUND ART

In recent years, technology for conveying a vehicle by allowing a bogie to move under a lower part of the vehicle and allowing the bogie to travel autonomously in a state in which the wheels of the vehicle have been lifted has become known.

CITATION LIST

Patent Literature

[Patent Literature 1]
  Japanese Unexamined Patent Application, First Publication No. 2013-231322
[Patent Literature 2]
  Japanese Unexamined Patent Application, First Publication No. 2016-216936
[Patent Literature 3]
  Japanese Unexamined Patent Application, First Publication No. 2002-163758
[Patent Literature 4]
  Japanese Unexamined Patent Application, First Publication No. 2017-182230
[Patent Literature 5]
  Japanese Unexamined Patent Application, First Publication No. H05-156837
[Patent Literature 6]
  Japanese Unexamined Patent Application, First Publication No. 2014-142704

SUMMARY OF INVENTION

Technical Problem

When a plurality of vehicles are parked within a finite parking space provided in a prescribed section on a road or the like, it is necessary to make effective use of the parking space. For the effective use of the parking space, it is important to narrow the space between vehicles during parking as much as possible and reduce a space that is not used for parking. However, if a distance between vehicles is too narrow, a vehicle may accidentally come into contact with another vehicle when a vehicle is delivered or a vehicle may not be able to be delivered.

Solution to Problem

An aspect of the present invention has been made in consideration of the above-described circumstances and an objective of the present invention is to provide a management system, a management device, a management method, and a storage medium capable of enabling a parking process to be performed efficiently.

A management system, a management method, and a storage medium according to the present invention adopt the following configurations.

(1) According to an aspect of the present invention, there is provided a management system including: a vehicle management device configured to manage parking of a vehicle in a parking space and delivery of the vehicle from the parking space; and a vehicle conveying device configured to be able to convey the vehicle in forward-backward and widthwise directions of the vehicle, wherein the vehicle management device includes a controller configured to control the vehicle conveying device so that the vehicle is conveyed to the parking space when a request for parking the vehicle located within a section where parking in the parking space is able to be requested has been received.

(2) In the management system according to the above-described aspect (1), the controller controls the vehicle conveying device so that a distance from another vehicle parked within the parking space in the forward-backward direction is less than a prescribed distance and the vehicle is parallel parked with respect to the other vehicle.

(3) In the management system according to the above-described aspect (2), the prescribed distance is a distance at which the vehicle is not able to be delivered from the parking space even if the vehicle moves in the forward-backward direction with a steering operation.

(4) In the management system according to the above-described aspect (2) or (3), when a plurality of vehicles are parallel parked in the parking space, the vehicle conveying device is on standby in a state in which at least one of a foremost vehicle and a rearmost vehicle among the plurality of vehicles that are parallel parked is able to be conveyed.

(5) In the management system according to any one of the above-described aspects (2) to (4), when the plurality of vehicles are parallel parked in the parking space, the controller controls the vehicle conveying device so that at least one of a foremost vehicle and a rearmost vehicle among the plurality of vehicles that are parallel parked is parked in proximity to a boundary of the parking space.

(6) In the management system according to any one of the above-described aspects (1) to (5), the vehicle management device further includes a manager configured to calculate a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered.

(7) In the management system according to the above-described aspect (6), when the parking time period has exceeded a prescribed time period, the manager controls the vehicle conveying device so that a vehicle whose parking time period has exceeded the prescribed time period is conveyed outside of the parking space.

(8) In the management system according to the above-described aspect (6), when the parking time period has exceeded the prescribed time period, the manager requests conveyance of the vehicle whose parking time period has exceeded the prescribed time period by another device different from the vehicle conveying device.

(9) In the management system according to any one of the above-described aspects (1) to (8), the controller controls the vehicle conveying device so that a parking location of the vehicle that is a conveyance target is determined on the basis of location information of other vehicles parked within the parking space and the vehicle that is the conveyance target is conveyed to the determined parking location.

(10) The management system according to any one of the above-described aspects (2) to (5) further includes an adjuster configured to cause a vehicle parked within the parking space to move by controlling the vehicle conveying device so that a distance between vehicles parked within the parking space in the forward-backward direction is less than the prescribed distance when the distance between the vehicles parked within the parking space in the forward-backward direction is greater than or equal to the prescribed distance according to the delivery of the vehicle.

(11) According to another aspect of the present invention, there is provided a management method of managing parking of a vehicle in a parking space and delivery of the vehicle from the parking space, the management method including: controlling, by a computer of a vehicle management device, a vehicle conveying device capable of conveying the vehicle in forward-backward and widthwise directions of the vehicle so that the vehicle is conveyed to the parking space when a request for parking the vehicle located within a section where parking in the parking space is able to be requested has been received.

(12) According to yet another aspect of the present invention, there is provided a non-transitory computer-readable storage medium storing a program for managing parking of a vehicle in a parking space and delivery of the vehicle from the parking space, the program causing a computer of a vehicle management device to: control a vehicle conveying device capable of conveying the vehicle in forward-backward and widthwise directions of the vehicle so that the vehicle is conveyed to the parking space when a request for parking the vehicle located within a section where parking in the parking space is able to be requested has been received.

(13) According to yet another aspect of the present invention, there is provided a management system including: a vehicle conveying device configured to convey a vehicle that has entered a management area; and a management device configured to manage the management area, wherein the management device includes a determiner configured to determine whether or not it is necessary to convey a target vehicle that has entered the management area; and a first controller configured to cause the target vehicle to be conveyed to a target conveyance point by controlling the vehicle conveying device when the determiner determines that it is necessary to convey the target vehicle.

(14) In the management system according to the above-described aspect (13), the determiner determines that it is unnecessary to convey the target vehicle when the target vehicle is able to travel autonomously according to control of the management device, and the management device further includes a second controller configured to cause the target vehicle to move to a target movement point by controlling the target vehicle when the determiner determines that it is unnecessary to convey the target vehicle.

(15) In the management system according to the above-described aspect (14), the first controller causes the target vehicle to be conveyed to a target conveyance point within a range of a first area near a gate of the management area by controlling the vehicle conveying device, and the second controller causes the target vehicle to be moved to the target movement point within a range of a second area that is not near the gate of the management area by controlling the target vehicle.

(16) In the management system according to the above-described aspect (14) or (15), the first controller designates target conveyance points in order from a location nearest a gate of the management area, and the second controller designates target movement points in order from a location farthest from the gate of the management area.

(17) In the management system according to any one of the above-described aspects (14) to (16), the management device limits a traveling area where the vehicle conveying device is able to travel, the first controller designates a location where a filling density of vehicles in the traveling area becomes high as the target conveyance point, and the second controller designates a location where parking/delivery efficiency for vehicles becomes high as the target movement point.

(18) According to yet another aspect of the present invention, there is provided a management device for managing a management area, the management device including: a determiner configured to determine whether or not it is necessary to convey a target vehicle that has entered the management area; and a first controller configured to cause the target vehicle to be conveyed to a target conveyance point by controlling a vehicle conveying device that conveys a vehicle that has entered the management area when the determiner determines that it is necessary to convey the target vehicle.

(19) According to yet another aspect of the present invention, there is provided a management method including: determining, by a computer of a management device, whether or not it is necessary to convey a target vehicle that has entered a management area; and causing, by the computer of the management device, the target vehicle to be conveyed to a target conveyance point by controlling a vehicle conveying device that conveys a vehicle that has entered the management area when it is determined that it is necessary to convey the target vehicle.

(20) According to yet another aspect of the present invention, there is provided a non-transitory computer-readable storage medium storing a program for causing a computer of a management device to: determine whether or not it is necessary to convey a target vehicle that has entered a management area; and cause the target vehicle to be conveyed to a target conveyance point by controlling a vehicle conveying device that conveys a vehicle that has entered the management area when it is determined that it is necessary to convey the target vehicle.

(21) According to yet another aspect of the present invention, there is provided a management system for managing a vehicle within a multistory parking lot where an elevator is provided, the management system including: a conveyor device configured to be able to travel autonomously and convey the vehicle; and a control device configured to cause the conveyor device to travel autonomously on a floor of the multistory parking lot and cause the conveyor device to convey the vehicle, wherein the control device causes the conveyor device to convey the vehicle into the elevator when the vehicle is moved from a first floor of the multistory parking lot to a second floor, and wherein the control device causes the elevator into which the vehicle has been carried to be moved from the first floor to the second floor.

(22) In the management system according to the above-described aspect (21), the control device further causes the conveyor device to be placed on the elevator by causing the conveyor device to travel autonomously, and the control device further causes the conveyor device to be moved from the first floor to the second floor by lifting or lowering the elevator on which the conveyor device is placed.

(23) In the management system according to the above-described aspect (22), the control device determines a conveyor device to be placed on the elevator and moved to the second floor from among a plurality of conveyor devices on the basis of a state of each of the plurality of conveyor devices.

(24) In the management system according to the above-described aspect (23), the control device causes a conveyor device whose state is not more suitable than those of the other conveyor devices among the plurality of conveyor devices located on the first floor to be moved to the second floor via the elevator when the first floor has a higher vehicle conveyance frequency than the second floor, and the control device causes a conveyor device whose state is more suitable than those of the other conveyor devices among the plurality of conveyor devices located on the first floor to be moved to the second floor via the elevator when the first floor has a lower vehicle conveyance frequency than the second floor.

(25) In the management system according to the above-described aspect (23) or (24), the control device further causes a conveyor device whose state is more suitable than those of the other conveyor devices among the plurality of conveyor devices located on the second floor to be moved to the first floor via the elevator when the first floor has a higher vehicle conveyance frequency than the second floor, and the control device further causes a conveyor device whose state is not more suitable than those of the other conveyor devices among the plurality of conveyor devices located on the second floor to be moved to the first floor via the elevator when the first floor has a lower vehicle conveyance frequency than the second floor.

(26) In the management system according to the above-described aspect (25), the control device controls movement of the conveyor device between floors so that the number of conveyor devices on each floor is not changed.

(27) In the management system according to any one of the above-described aspects (22) to (26), the control device sets a number of conveyor devices according to the number of wheels of a vehicle that is a conveyance target as one set and causes the conveyor devices to travel autonomously, and, when a first conveyor device that is a conveyor device among a plurality of conveyor devices included in a first set located on the first floor is moved to the second floor via the elevator, the control device sets a second conveyor device that is a conveyor device included in a second set located on the first floor and the first conveyor device as a new set.

(28) In the management system according to the above-described aspect (7), the control device further sets a third conveyor device that is the remaining conveyor device when the first conveyor device is excluded from the first set and a fourth conveyor device that is the remaining conveyor device when the second conveyor device is excluded from the second set as a new set and causes the new set to be moved to the second floor.

(29) In the management system according to the above-described aspect (27) or (28), the control device determines any one conveyor device whose state is more suitable than those of the other conveyor devices among the plurality of conveyor devices included in the set as a master system conveyor device and determines the remaining conveyor devices as slave system conveyor devices, and the master system conveyor device controls the slave system conveyor devices on the basis of an instruction from the control device.

(30) In the management system according to the above-described aspect (28) or (29), when a new set is reorganized, the control device redetermines a master system conveyor device and a slave system conveyor device in the reorganized set.

(31) In the management system according to any one of the above-described aspect (21) to (30), when the vehicle is moved from the first floor to the second floor via the elevator, the control device causes the conveyor device to be moved to the second floor together with the vehicle.

(32) According to yet another aspect of the present invention, there is provided a management method of managing a vehicle parked in a multistory parking lot where an elevator is provided, the management method including: causing, by a computer, the vehicle to be conveyed to a conveyor device capable of traveling autonomously and conveying the vehicle by causing the conveyor device to travel autonomously on a floor of the multistory parking lot; causing, by the computer, the conveyor device to convey the vehicle into the elevator when the vehicle is moved to another floor of the multistory parking lot; and causing, by the computer, the elevator into which the vehicle is conveyed to be moved from a floor where the vehicle has been conveyed to the other floor.

(33) According to yet another aspect of the present invention, there is provided a non-transitory computer-readable storage medium storing a program for managing a vehicle parked in a multistory parking lot where an elevator is provided, the program causing a computer to: cause the vehicle to be conveyed to a conveyor device capable of traveling autonomously and conveying the vehicle by causing the conveyor device to travel autonomously on a floor of the multistory parking lot; cause the conveyor device to convey the vehicle into the elevator when the vehicle is moved to another floor of the multistory parking lot; and cause the elevator into which the vehicle is conveyed to be moved from a floor where the vehicle has been conveyed to the other floor.

Advantageous Effects of Invention

According to the above-described aspects (1), (9), (11), and (12), it is possible to perform parking efficiently. For example, parking can be efficiently managed by performing parking in a conveyance process of the conveyor device on the basis of a parking request at a prescribed location on a road.

According to the above-described aspect (2), because the distance between the vehicles in the forward-backward direction is less than the prescribed distance, parallel parking can be efficiently managed.

According to the above-described aspect (3), it is possible to prevent a delivery process from being performed outside of the management system and to manage the vehicles accurately and safely by setting a forward-backward distance of the vehicle to a distance less than the prescribed distance.

According to the above-described aspect (4), it is possible to prevent a delivery process from being performed outside of the management system and to manage the vehicles accurately and safely by waiting in a state in which at least one of the foremost vehicle and the rearmost vehicle can be conveyed.

According to the above-described aspect (5), it is possible to easily determine that a vehicle that has entered a side not arranged in proximity to the boundary is a newly parked vehicle because at least one of the foremost and rearmost vehicles is arranged in proximity to either a front or rear boundary of the parking space.

According to the above-described (6), accurate time measurement is possible when a fee based on a parking time period is calculated because the parking time period is calculated on the basis of the time point when the vehicle conveying device has started conveyance or the parking time point and the time point when the vehicle conveying device has ended the conveyance or the delivery time point. Also, it is not necessary to provide a special time measuring device in the parking space and it is possible to reduce management costs.

According to the above-described aspect (7), it is possible to promote the use within an available parking time period because the conveyor device causes a vehicle whose parking time period has exceeded the available parking time period to be delivered automatically.

According to the above-described aspect (8), in addition to a process in which the conveyor device causes a vehicle whose parking time period has exceeded the available parking time period to be delivered automatically, it is possible to prevent a vehicle delivered to request conveyance by another vehicle (for example, a tow truck) from obstructing traffic near the parking space.

According to the above-described aspect (10), it is possible to make more effective use of the available parking space.

According to the above-described aspects (13) to (20), when a vehicle that is conveyed by the conveyor device and an automated driving vehicle coexist, the vehicle and the automated driving vehicle can be appropriately moved.

According to the above-described aspect (15), a conveyance time period can be shortened.

According to the above-described aspect (16), a conveyance distance can be limited.

According to the above-described aspect (17), the area can be used efficiently.

According to any one of the above-described aspects (21) to (33), the vehicle can be efficiently conveyed in the multistory parking lot.

According to the above-described aspects (24) and (25), it is possible to limit the bias of an operating state in which only some of the conveyor devices are concentratedly operated among the plurality of conveyor devices operating in the multistory parking lot.

According to the above-described aspect (26), the number of conveyor devices operating on each floor of the multistory parking lot can be kept constant and the conveyor devices can be operated in accordance with the vehicle conveyance frequency on each floor.

According to the above-described aspect (27), because a number of conveyor devices corresponding to the number of wheels of the vehicle that is the conveyance target are set as one set and moved when the conveyor device is moved to another floor to limit the bias of the operating state, it is possible to limit an arrangement of an excessive number of conveyor devices on a movement source floor and a movement destination floor.

According to the above-described aspect (28), because some conveyor devices remaining in the existing sets are set as a new set when some conveyor devices included in each of a plurality of existing sets different from each other are set as a new set and moved, it is possible to further limit the bias of the operating state.

According to the above-described aspects (29) and (30), the stability of the system in which the master system conveyor device and the slave system conveyor device are used as a set can be improved.

According to the above-described aspect (31), because the conveyor device is moved together with the vehicle when the conveyor device is moved to another floor so that the bias of the operating state is limited, the number of operations of the elevator is reduced.

BRIEF DESCRIPTION OF DRAWINGS

FIG. 11 is a diagram showing an example of parking information corresponding to a situation shown in FIG. 10.

DESCRIPTION OF EMBODIMENTS

Hereinafter, embodiments of a management system, a management device, a management method, and a storage medium of the present invention will be described with reference to the drawings.

First Embodiment

[Overall Configuration]

Figure 1:
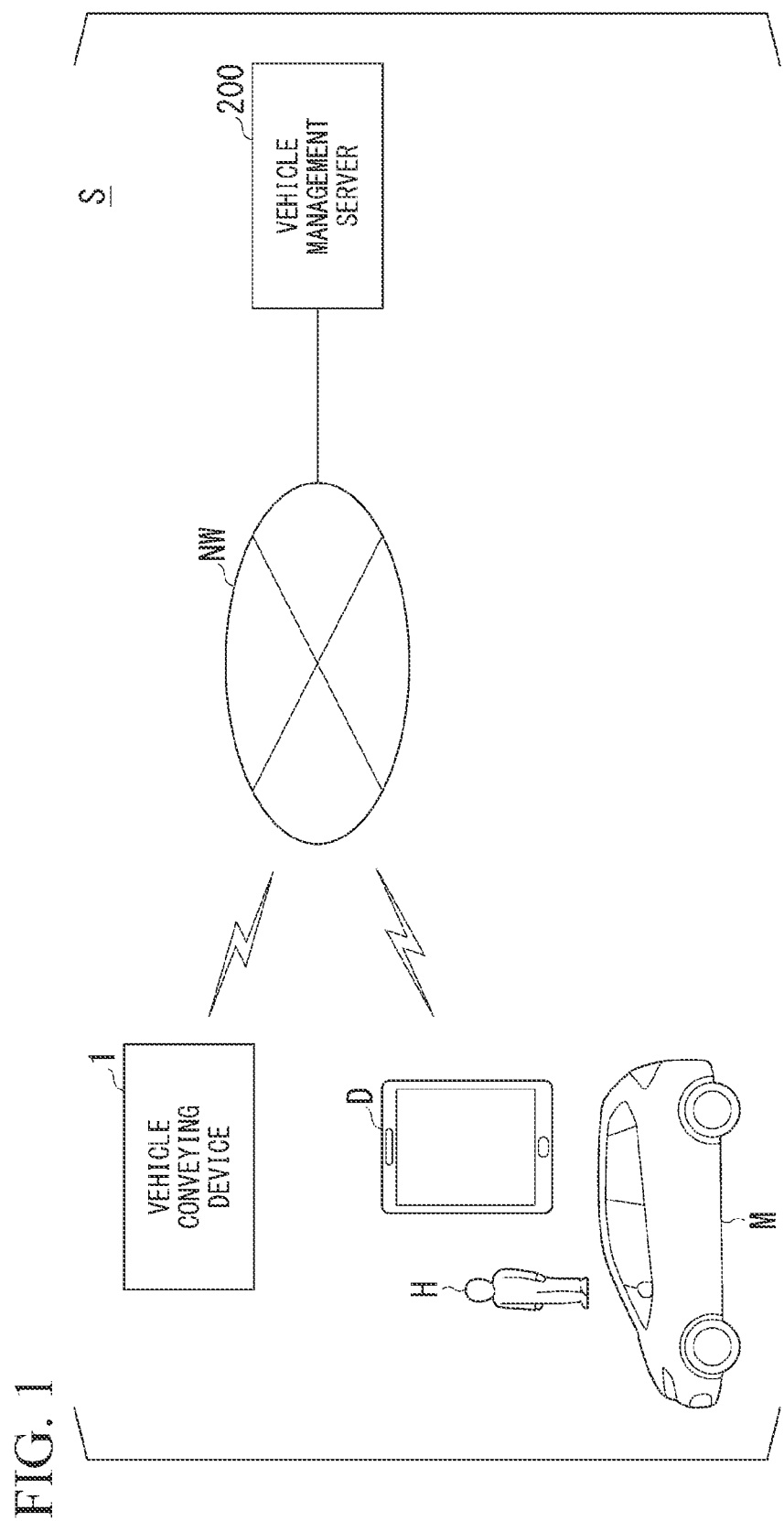
FIG. 1 is a configuration diagram of a management system using a vehicle conveying device according to a first embodiment.

FIG. 1 is a configuration diagram of a management system S using a vehicle conveying device 1 according to a first embodiment. The management system S performs a parking process by conveying a vehicle M that is a conveyance target to a parking location in a parking space and performs a delivery process by conveying the vehicle M that is the conveyance target from the parking location to a delivery location. Thereby, the management system S manages the parking of the vehicle. Also, the vehicle M is not limited to a specific vehicle and the management system S can set any vehicle as the conveyance target. Hereinafter, the vehicle M having two front wheels assumed to be steering wheels and two rear wheels assumed to be non-steering wheels will be described. The management system S includes, for example, a vehicle conveying device 1 and a vehicle management server 200 (an example of a vehicle management device and a management device). The vehicle management server 200 manages parking of the vehicle in the parking space and delivery of the vehicle from the parking space. The vehicle conveying device 1 is allowed to perform the parking process and the delivery process with respect to the vehicle M on the basis of a request from a user H (for example, an occupant of the vehicle M) who desires to park the vehicle M via a terminal device D. The terminal device D, the vehicle conveying device 1, and the vehicle management server 200 can communicate with each other via a network NW. The network NW includes the Internet, a wide area network (WAN), a local area network (LAN), a public circuit, a provider device, a dedicated circuit, a radio base station and the like.

[Outline of Vehicle Conveying Device]

Figure 2:
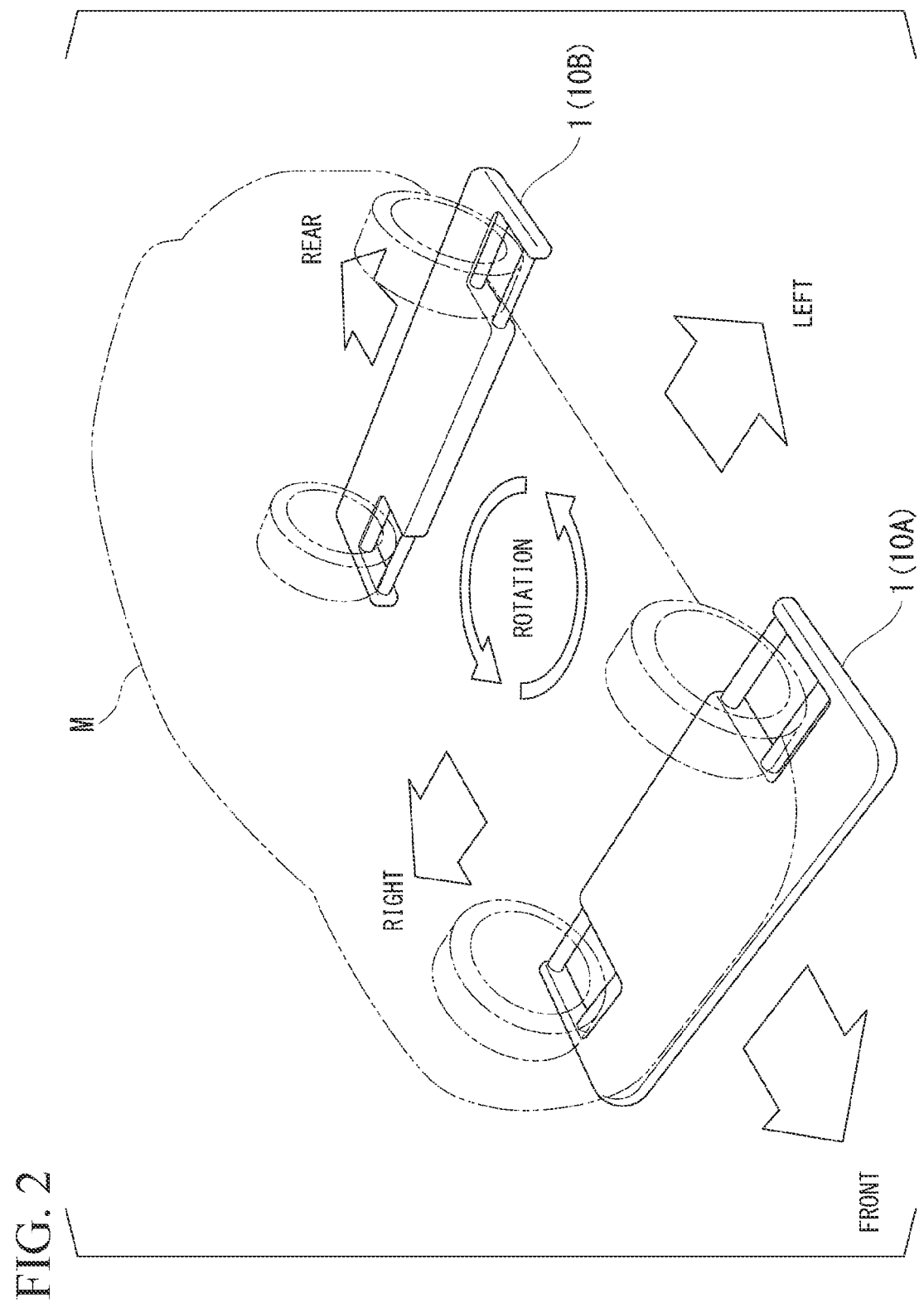
FIG. 2 is a schematic diagram showing an example of the vehicle conveying device according to the first embodiment.

FIG. 2 is a schematic diagram showing an example of the vehicle conveying device 1 according to the first embodiment. The vehicle conveying device 1 conveys the vehicle M to a desired target location by moving the vehicle M that is the conveyance target in any direction. The vehicle conveying device 1 can convey the vehicle M in a forward direction, a backward direction, a left direction, and a right direction (a widthwise direction) of the vehicle body of the vehicle M. Also, the vehicle conveying device 1 can change (rotate) an orientation of the vehicle body of the vehicle M without moving the location of the vehicle M.

The vehicle conveying device 1 includes, for example, a set of conveyor robots 10 (a first conveyor robot 10A and a second conveyor robot 10B) capable of autonomously traveling in a prescribed area. The first conveyor robot (an example of a first conveyor device) 10A moves under the vehicle M during conveyance, lifts the front wheels of the vehicle M, and autonomously travels. The second conveyor robot (an example of a second conveyor device) 10B moves under the vehicle M, lifts the rear wheels of the vehicle M, and autonomously travels. Structures of the first conveyor robot 10A and the second conveyor robot 10B may be the same. One of the first conveyor robot 10A and the second conveyor robot 10B may be a master machine and the other may be a slave machine.

Figure 3:
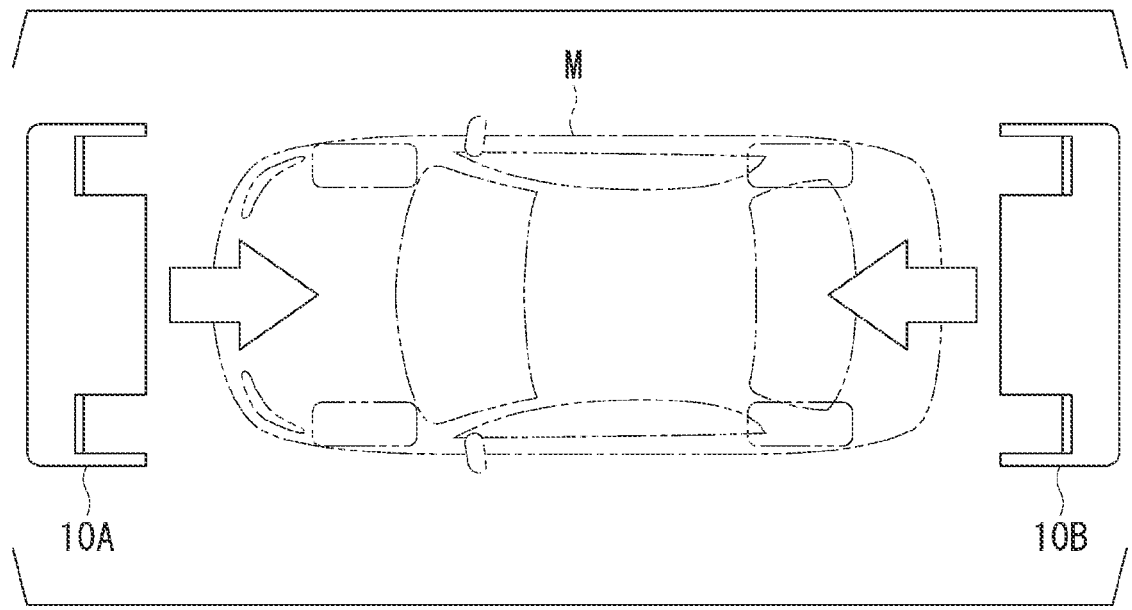
FIG. 3 is a diagram showing an example of operations of a first conveyor robot and a second conveyor robot when a vehicle is conveyed according to the first embodiment.
Figure 4:
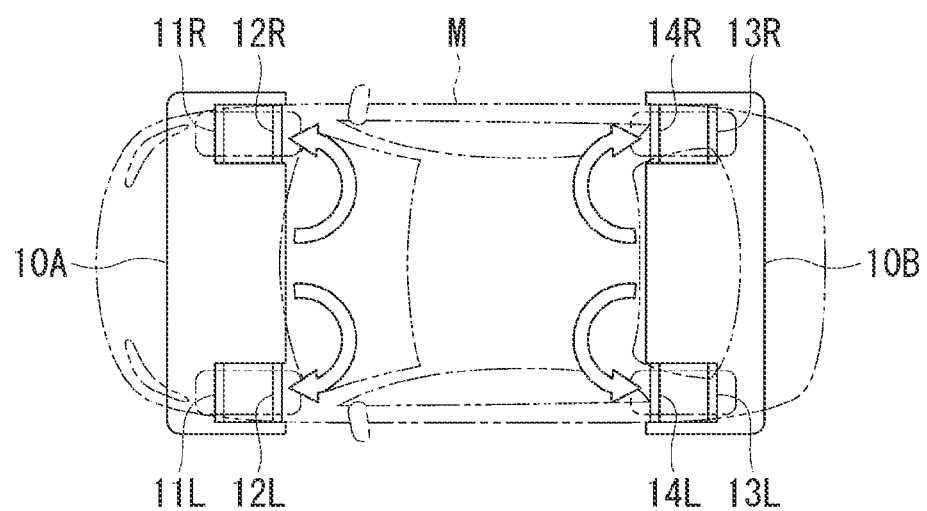
FIG. 4 is a diagram showing an example of operations of the first conveyor robot and the second conveyor robot when a vehicle is conveyed according to the first embodiment.

FIGS. 3 and 4 are diagrams showing an example of operations of the first conveyor robot 10A and the second conveyor robot 10B during conveyance of the vehicle M according to the first embodiment. As shown in FIG. 3, when the vehicle M is conveyed, the first conveyor robot 10A moves under the vehicle M in front of the vehicle M. Also, when the vehicle M is conveyed, the second conveyor robot 10B moves under the vehicle M behind the vehicle M.

As shown in FIG. 4, the first conveyor robot 10A that has moved under the vehicle M stops after moving to a location where a right contact portion 11R and a left contact portion 11L to be described below come into contact with front portions of the front wheels. Subsequently, the first conveyor robot 10A moves a right lift arm 12R and a left lift arm 12L stored in a storage portion to be described below to a location where they come into contact with rear portions of the front wheels. The first conveyor robot 10A lifts the right front wheel using the right contact portion 11R and the right lift arm 12R by further moving the right lift arm 12R toward the right contact portion 11R and lifts the left front wheel using the left contact portion 11L and the left lift arm 12L by further moving the left lift arm 12L toward the left contact portion 11L.

As shown in FIG. 4, the second conveyor robot 10B that has moved under the vehicle M stops after moving to a location where a right contact portion 13R and a left contact portion 13L to be described below come into contact with rear portions of the rear wheels. Subsequently, the second conveyor robot 10B moves a right lift arm 14R and a left lift arm 14L stored in a storage portion to be described below to a location where they come into contact with the front portions of the rear wheels. The second conveyor robot 10B lifts a right rear wheel using the right contact portion 13R and the right lift arm 14R by further moving the right lift arm 14R toward the right contact portion 13R and lifts a left rear wheel using the left contact portion 13L and the left lift arm 14L by further moving the left lift arm 14L toward the left contact portion 13L. Subsequently, the vehicle M can be moved when the first conveyor robot 10A and the second conveyor robot 10B autonomously travel in cooperation using a drive mechanism. Also, the vehicle conveying device 1 may lift a part of the vehicle body of the vehicle M (for example, a front cross member, a rear cross member, or the like) instead of lifting the wheels of the vehicle M.

[Structure of Conveyor Robot]

Next, a structure of the conveyor robot 10 (the first conveyor robot 10A and the second conveyor robot 10B) will be described. Because the structures of the first conveyor robot 10A and the second conveyor robot 10B are the same, the first conveyor robot 10A will be described below and the description of the second conveyor robot 10B will be omitted as appropriate.

Figure 5:
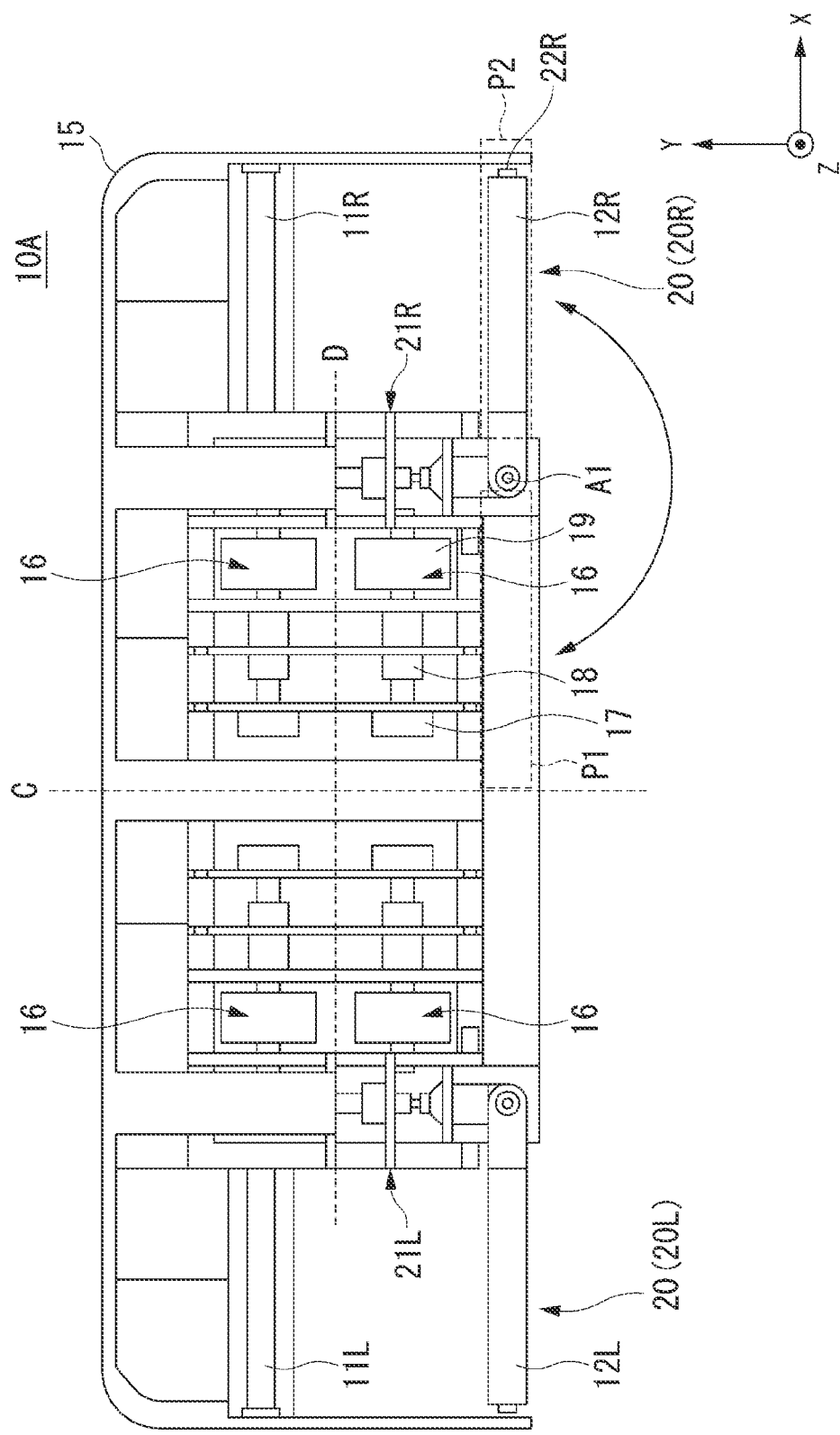
FIG. 5 is a diagram showing an example of a structure of the first conveyor robot according to the first embodiment.
Figure 6:
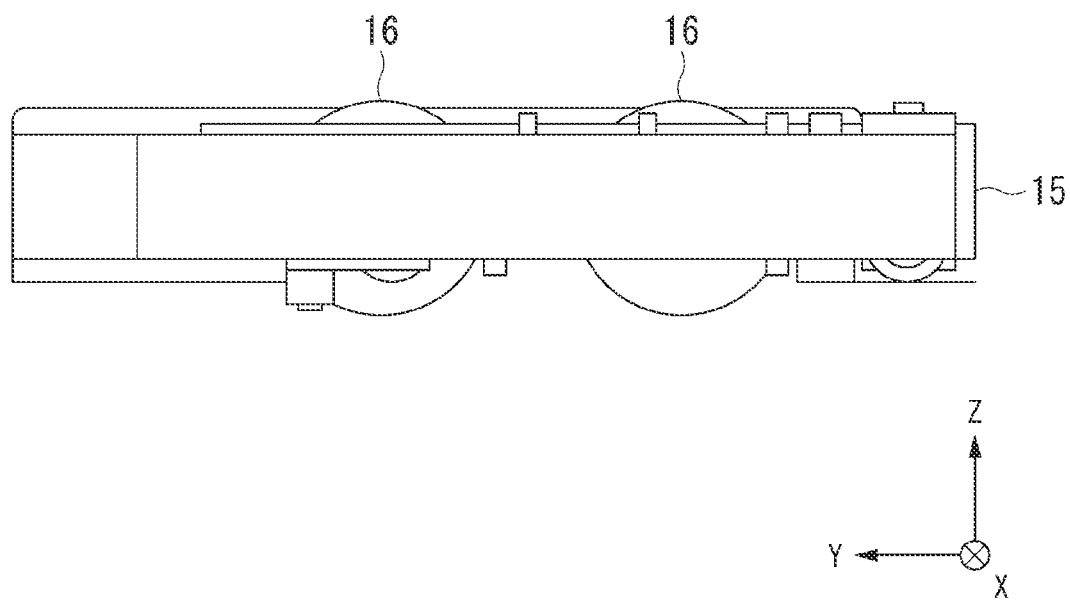
FIG. 6 is a diagram showing an example of a structure of the first conveyor robot according to the first embodiment.

FIGS. 5 and 6 are diagrams showing an example of the structure of the first conveyor robot 10A according to the first embodiment. In FIG. 5, the first conveyor robot 10A from which an upper cover with which an upper part of a main body 15 is covered has been removed is shown. Also, in the present description, for convenience of description, directions with respect to the first conveyor robot 10A are defined as follows. A direction in which the right contact portion 11R and the left contact portion 11L are arranged with respect to the right lift arm 12R and the left lift arm 12L is a Y-direction. Also, a direction in which a right cargo handling mechanism 20R to be described below is arranged with respect to a center location (hereinafter referred to as a centerline C) in the widthwise direction of the first conveyor robot 10A is defined as an X-direction. Also, a height direction of the first conveyor robot 10A orthogonal to a plane formed by the X-direction and the Y-direction is defined as a Z-direction.

The first conveyor robot 10A includes, for example, the main body 15, four drive mechanisms 16 arranged inside the main body 15, and a cargo handling mechanism 20. The cargo handling mechanism 20 includes, for example, the right cargo handling mechanism 20R and a left cargo handling mechanism 20L. The right cargo handling mechanism 20R is arranged on the right side (a +X-direction) with respect to the centerline C. The left cargo handling mechanism 20L is arranged on the left side (a —X-direction) with respect to the centerline C. The four drive mechanisms 16 are arranged between the right cargo handling mechanism 20R and the left cargo handling mechanism 20L. The main body 15 is a frame that supports each component of the first conveyor robot 10A.

Each of the drive mechanisms 16 includes, for example, a traveling motor 17, a drive-side decelerator 18, and wheels 19. The four drive mechanisms 16 are separately arranged in two sets on the left and right side (the —X-direction and the +X-direction) with the centerline C as a boundary. The two sets of drive mechanisms 16 on the left side and the two sets of drive mechanisms 16 on the right side are arranged to be line-symmetrical with respect to the centerline C as an axis. The two sets of drive mechanisms 16 on the front side (a +Y-direction) and the two sets of drive mechanisms 16 on the rear side (a —Y-direction) are arranged to be line-symmetrical with respect to a parallel line D parallel to the widthwise direction of the first conveyor robot 10A as an axis.

The traveling motor 17 is, for example, an electric motor. An output shaft of the traveling motor 17 is connected to an input shaft of the drive-side decelerator 18. The drive-side decelerator 18 has the input shaft and the output shaft on the same line, and has, for example, a planetary gear decelerator. The output shaft of the drive-side decelerator 18 is connected to the wheel 19.

The wheel 19 is, for example, a Mecanum wheel. Mecanum wheels provided in the drive mechanisms 16 can be driven in cooperation with each other, thereby moving the main body 15 in all directions. Also, the drive mechanism 16 may have other wheels that can move in all directions. For example, the drive mechanism 16 may be replaced with an omni wheel or a wheel having a steering function.

The right cargo handling mechanism 20R includes, for example, a right contact portion 11R, a right lift arm 12R, and a right rotational force transfer mechanism 21R. The left cargo handling mechanism 20L includes, for example, a left contact portion 11L, a left lift arm 12L, and a left rotational force transfer mechanism 21L. The right cargo handling mechanism 20R and the left cargo handling mechanism 20L are arranged to be line-symmetrical with respect to the centerline C as an axis. Because the right cargo handling mechanism 20R and the left cargo handling mechanism 20L have the same structure, the structure of the right cargo handling mechanism 20R will be described below and the description of the left cargo handling mechanism 20L will be omitted as appropriate.

The right rotational force transfer mechanism 21R includes a drive device for moving the right lift arm 12R between a right storage location P1 and a right deployment location P2. For example, the right rotational force transfer mechanism 21R rotates and moves the right lift arm 12R between the right storage location P1 and the right deployment location P2 along an XY plane with an axis A1 in the Z-direction as a fulcrum. The right rotational force transfer mechanism 21R includes, for example, a motor, a brake, and the like.

The right lift arm 12R is a rotary rod including a shaft member and a cylindrical member that is concentric with the shaft member and is rotatable around the shaft member. The right lift arm 12R rotates and moves between the right storage location P1 where a tip 22R thereof faces the center side of the main body 15 in the widthwise direction (the —X direction) and the right deployment location P2 where the tip 22R thereof faces the outer side of the main body 15 in the widthwise direction (the +X-direction) according to the control of the right rotational force transfer mechanism 21R.

The right storage location P1 and the right deployment location P2 are locations where the shaft member of the right lift arm 12R is parallel to the widthwise direction. In other words, the right storage location P1 is the location of the right lift arm 12R after the right lift arm 12R is rotated 180 degrees along the XY plane from the right deployment location P2. In contrast, the right deployment location P2 is the location of the right lift arm 12R after the right lift arm 12R is rotated 180 degrees along the XY plane from the right storage location P1.

The right contact portion 11R is a rotary rod including a shaft member and a cylindrical member that is concentric with the shaft member and is rotatable around the shaft member. Both ends of the shaft member of the right contact portion 11R are fixed to the main body 15.

[Functional Configuration of Conveyor Robot]

Figure 7:
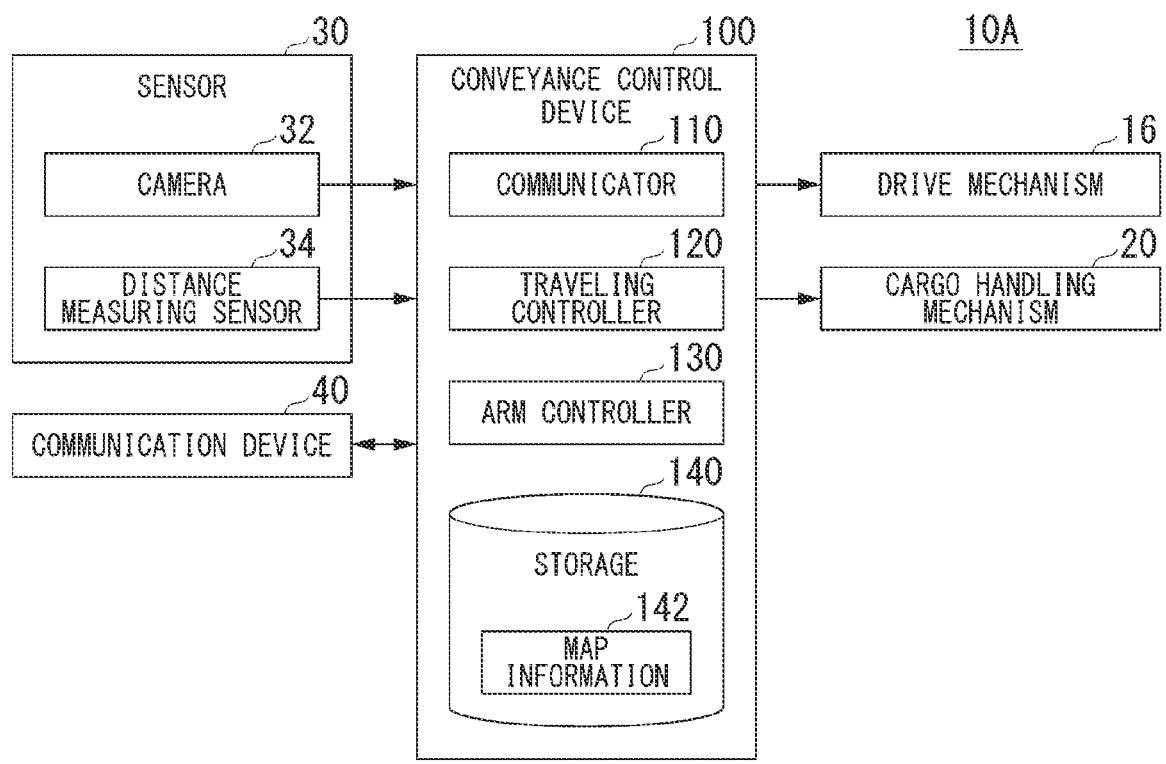
FIG. 7 is a diagram showing an example of a functional configuration of the first conveyor robot according to the first embodiment.

Next, a functional configuration of the conveyor robot 10 will be described. FIG. 7 is a diagram showing an example of the functional configuration of the first conveyor robot 10A according to the first embodiment. The first conveyor robot 10A includes, for example, the drive mechanism 16, the cargo handling mechanism 20, a sensor 30, a communication device 40, and a conveyance control device 100.

The sensor 30 includes, for example, a camera 32 and a distance measuring sensor 34. The camera 32 images surroundings of the first conveyor robot 10A. The distance measuring sensor 34 is, for example, a position sensitive detector (PSD) sensor, a radar device, a light detection and ranging (LiDAR) sensor, a laser range finder (LRF), a time of flight (TOF) sensor, or the like. The distance measuring sensor 34 detects a distance from a physical object located near the first conveyor robot 10A. The distance measuring sensor 34 detects, for example, a distance from the vehicle M of the conveyance target. A plurality of cameras 32 and a plurality of distance measuring sensors 34 are provided so that a detection process is performed in all directions of the first conveyor robot 10A. Four sets of cameras 32 and distance measuring sensors 34 are attached to, for example, a right front portion, a left front portion, a right rear portion, and a left rear portion of the upper cover.

The communication device 40 includes, for example, a device for performing wireless communication with an external communication device and an antenna. The external communication device is, for example, a vehicle management server 200, and is a communication device of the other conveyor robot 10 (the second conveyor robot 10B) that forms a pair with the first conveyor robot 10A. The communication device 40 includes a communication module for performing short-range wireless communication and a communication module for performing wireless communication via a public circuit.

The conveyance control device 100 includes, for example, a communicator 110, a traveling controller 120, an arm controller 130, and a storage 140. Each of the communicator 110, the traveling controller 120, and the arm controller 130 is implemented by, for example, a hardware processor such as a central processing unit (CPU) (a computer) executing a program (software). Some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as an HDD or a flash memory of the conveyance control device 100 or may be stored in a removable storage medium such as a DVD or a CD-ROM and installed in the HDD or the flash memory of the conveyance control device 100 when the storage medium (the non-transitory storage medium) is mounted in a drive device.

The communicator 110 acquires various types of instructions transmitted by the vehicle management server 200 via the communication device 40. The instructions transmitted by the vehicle management server 200 include, for example, an instruction for parking the vehicle in the parking space, an instruction for delivering the vehicle from the parking space, an instruction for adjusting a parking location of the vehicle parked in the parking space, and the like.

The traveling controller 120 controls the drive mechanism 16 so that the vehicle conveying device 1 is moved to a location indicated in an instruction on the basis of the instruction acquired by the communicator 110. For example, the traveling controller 120 controls the drive mechanism 16 so that the vehicle conveying device 1 is moved to the location of the vehicle M that is the conveyance target when a parking instruction has been acquired by the communicator 110.

The arm controller 130 controls the cargo handling mechanism 20 so that the cargo handling mechanism 20 lifts the vehicle that is the conveyance target or lowers the lifted vehicle on the basis of the instruction acquired by the communicator 110. For example, when the parking instruction has been acquired by the communicator 110, the arm controller 130 controls the cargo handling mechanism 20 so that the vehicle conveying device 1 lifts the vehicle M after moving to the location of the vehicle M according to the control of the traveling controller 120.

The storage 140 is implemented by, for example, an HDD, a flash memory, an electrically erasable programmable read-only memory (EEPROM), a read-only memory (ROM), a random-access memory (RAM), or the like. The storage 140 stores, for example, information such as map information 142 within a management area (within a parking management section) where the first conveyor robot 10A can travel.

[Functional Configuration of Vehicle Management Server]

Figure 8:
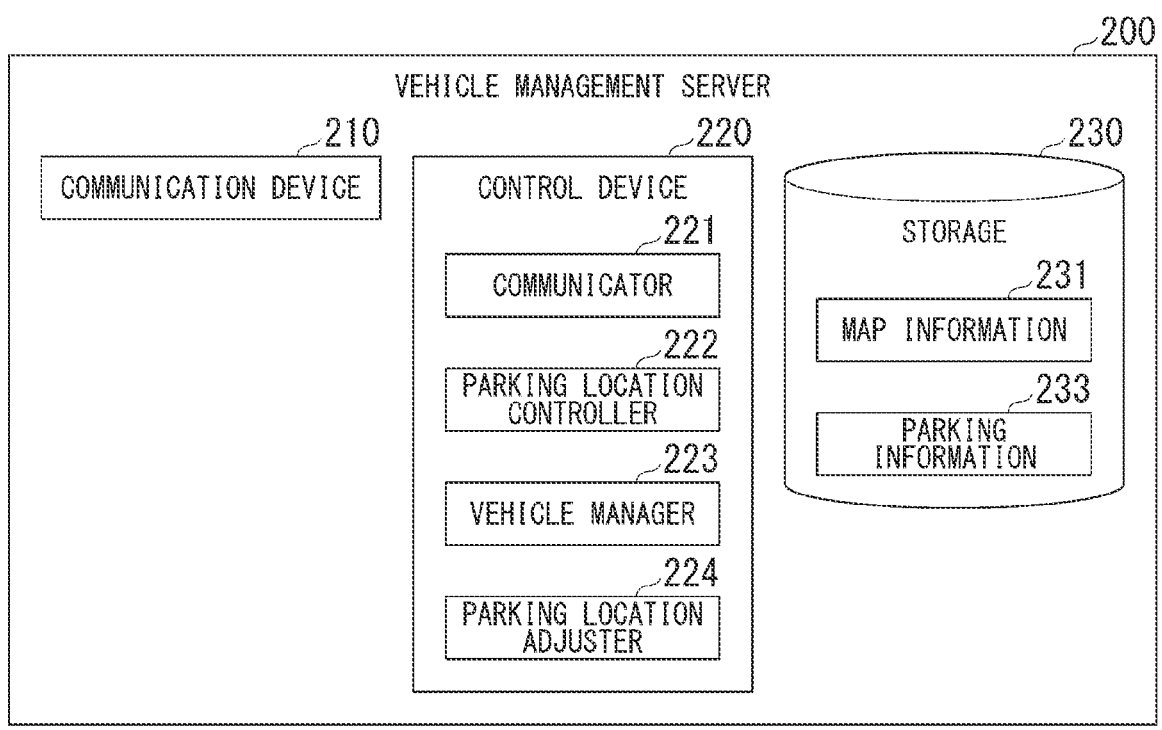
FIG. 8 is a diagram showing an example of a functional configuration of a vehicle management server according to the first embodiment.

Next, a functional configuration of the vehicle management server 200 will be described. FIG. 8 is a diagram showing an example of the functional configuration of the vehicle management server 200 according to the first embodiment. The vehicle management server 200 includes, for example, a communication device 210, a control device 220, and a storage 230. The communication device 210 includes a device for performing wireless communication with an external communication device and an antenna. The external communication device is, for example, a vehicle conveying device 1, a terminal device D, or the like.

The control device 220 includes, for example, a communicator 221, a parking location controller 222 (a controller), a vehicle manager 223 (a manager), and a parking location adjuster 224 (an adjuster). The communicator 221 acquires various types of information from an external communication device via the communication device 210, and provides various types of information to the external communication device.

The parking location controller 222 determines a parking location of the vehicle M within the parking space on the basis of the parking request transmitted by the terminal device D. The parking request includes information for identifying the vehicle M (for example, a vehicle ID issued in advance by the vehicle management server 200), license plate information of the vehicle M, vehicle type information of the vehicle M, and the like. The parking location controller 222 searches for an empty space where the vehicle M can be parked within the parking space with reference to map information 231 and parking information 233 stored in the storage 230. When the parking location controller 222 has found an empty space, the parking location controller 222 determines the empty space as the parking location. When a request for parking the vehicle M located in a section where parking in the parking space PS can be requested has been received, the parking location controller 222 controls the vehicle conveying device 1 so that the vehicle conveying device 1 conveys the vehicle M to the parking space.

The parking location controller 222 controls the vehicle conveying device 1 so that a distance from another vehicle parked within the parking space PS in the forward-backward direction is less than a prescribed distance and the vehicle M is parallel parked with respect to the other vehicle. This prescribed distance is a distance at which the vehicle M is not able to be delivered from the parking space without coming into contact with another vehicle even if the vehicle M moves in the forward-backward direction with a steering operation.

For example, the vehicle manager 223 associates various types of information about the vehicle (a vehicle ID, a license plate, and a vehicle type), a parking location, a parking start date and time, and a parking end date and time with each vehicle (for each vehicle ID) on the basis of information transmitted by the vehicle conveying device 1 and the terminal device D and causes the associated information to be stored as the parking information 233 in the storage 230.

The parking location adjuster 224 adjusts the parking location of the parked vehicle. For example, the parking location adjuster 224 controls the vehicle conveying device 1 so that a distance between the parked vehicles is shortened when an unnecessary empty space is generated between the parked vehicles due to an iterated process in which vehicles are parked and delivered. Thereby, it is possible to make more effective use of the finite parking space.

Each functional unit of the control device 220 is implemented by, for example, a hardware processor such as a CPU (computer) executing a program (software). Also, some or all of the above components may be implemented by hardware (including a circuit; circuitry) such as an LSI circuit, an ASIC, an FPGA, or a GPU or may be implemented by software and hardware in cooperation. The program may be prestored in a storage device (a storage device including a non-transitory storage medium) such as an HDD or a flash memory of the vehicle management server 200 or may be stored in a removable storage medium such as a DVD or a CD-ROM and installed in the HDD or the flash memory of the vehicle management server 200 when the storage medium (the non-transitory storage medium) is mounted in a drive device.

The storage 230 is implemented by, for example, an HDD, a flash memory, an EEPROM, a ROM, a RAM, or the like. The storage 230 stores, for example, information such as the map information 231 and the parking information 233 within the management area (within the parking management section) where the conveyor robot 10 can travel. The map information 231 is the same as the map information 142 stored in the storage 140 of the conveyor robot 10.

[Parking Process]

Figure 9:
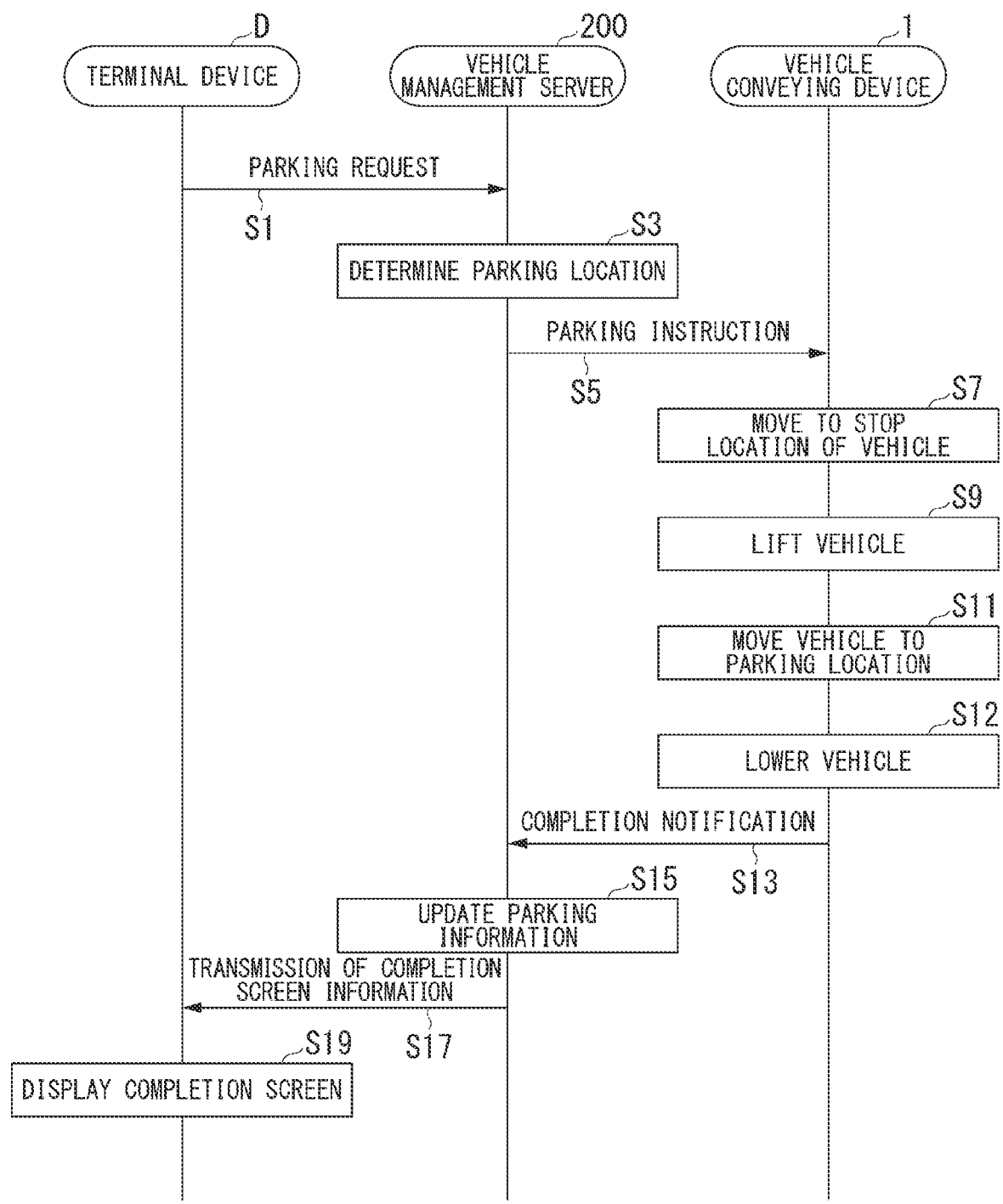
FIG. 9 is a sequence diagram showing an example of a parking process of the management system according to the first embodiment.
Figure 10:
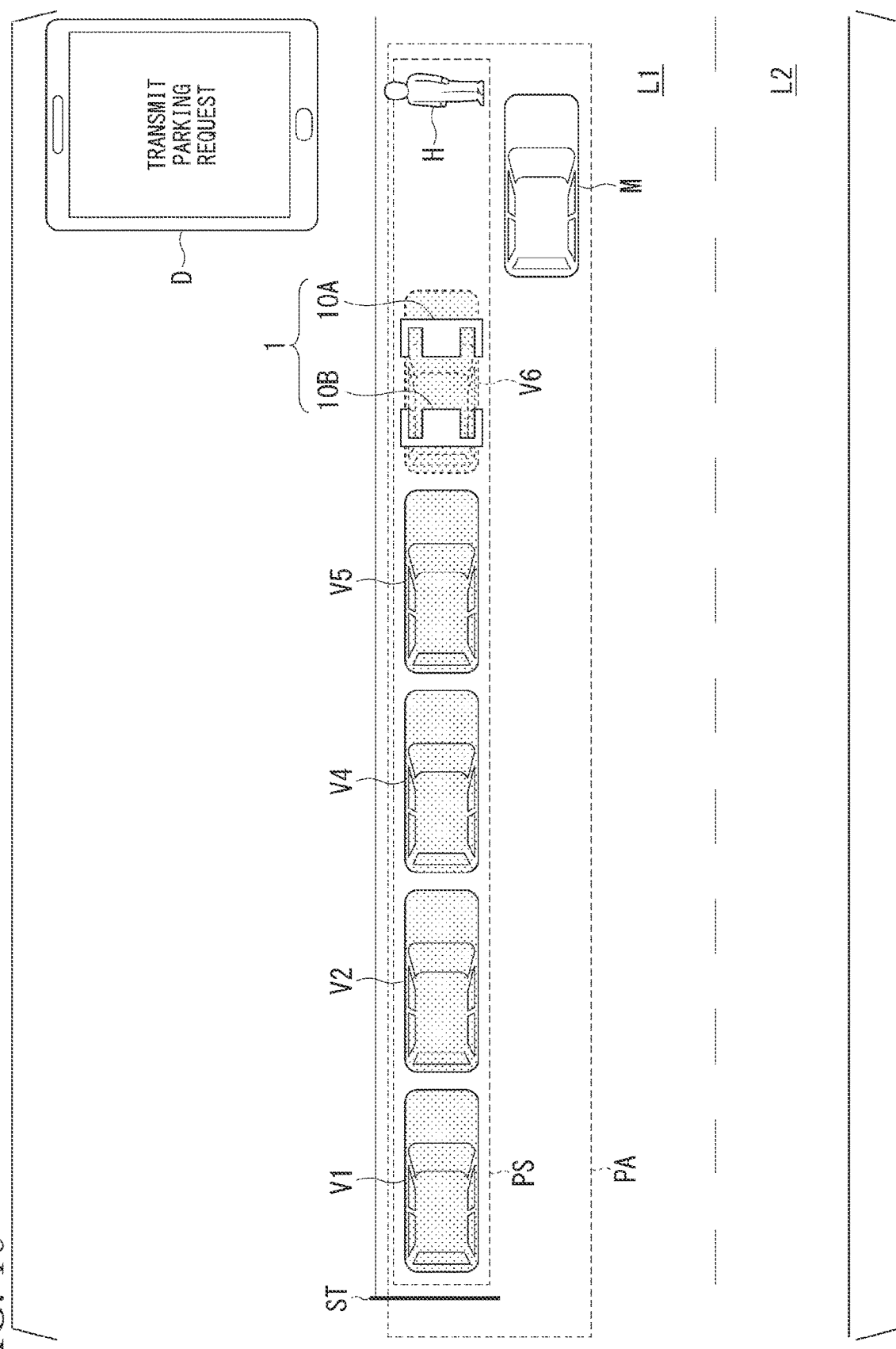
FIG. 10 is a diagram showing an example of a state in which a parking request operation is performed in the parking process according to the first embodiment.

Next, a flow of a parking process of the management system S will be described. FIG. 9 is a sequence diagram showing an example of the parking process of the management system S according to the first embodiment. FIG. 10 is a diagram showing an example of a state in which a parking request operation is performed in the parking process according to the first embodiment. In FIG. 10, a case where the vehicle M is parked in the parking space PS provided in one section on a road L1 will be described as an example. In this example, a total of five vehicles including a vehicle V1, a vehicle V2, a vehicle V4, a vehicle V5, and a vehicle V6 are parked in the parking space PS. A stopper ST (a wall) is provided at one end of the parking space PS so that the vehicle is prevented from moving due to manual driving or the like (a steering operation). That is, the parking location controller 222 controls the vehicle conveying device 1 so that at least one of a foremost vehicle and a rearmost vehicle among the plurality of vehicles that are parallel parked is parked in proximity to the boundary of the parking space PS when a plurality of vehicles are parallel parked in the parking space PS. When there is a physical structure such as a fence or a wall at the boundary of the parking space PS, the forward-backward movement of the vehicle can be restricted by the structure.

The vehicle conveying device 1 is on standby in a state in which the vehicle conveying device 1 has moved under a vehicle (the vehicle V6) parked at the other end of the parking space PS (a state in which the vehicle conveying device 1 has lifted the vehicle V6). The first conveyor robot 10A may be on standby in a state in which the first conveyor robot 10A has moved under a vehicle (the vehicle V1) parked at one end (a state in which the first conveyor robot 10A has lifted the rear or front wheels of the vehicle V1 or a standby state in which the first conveyor robot 10A can immediately lift the wheels) and the second conveyor robot 10B may be on standby in a state in which the second conveyor robot 10B has moved under a vehicle (the vehicle V6) parked at the other end (a state in which the second conveyor robot 10B has lifted the rear or front wheels of the vehicle V6 or a standby state in which the second conveyor robot 10B can immediately lift the wheels). That is, when a plurality of vehicles are parallel parked in the parking space PS, the vehicle conveying device 1 is on standby in a state in which at least one of the foremost vehicle and the rearmost vehicle among the plurality of vehicles that are parallel parked can be conveyed. Thereby, the vehicle is prevented from moving according to manual driving or the like. Also, whether or not the vehicle conveying device 1 is on standby in a conveyable state may be determined on the basis of whether or not there is a physical structure at the boundary of the parking space PS. When there is a physical structure, the forward-backward movement of the vehicle can be restricted due to the structure, so that the vehicle conveying device 1 may not be on standby in a conveyable state.

In the parking space PS, the parking location for each vehicle is not fixed in advance and the parking location dynamically changes with a size (a total length or a width) of a vehicle that is a parking target and the vacancy of the parking space.

The user H who desires to park the vehicle M causes the vehicle M to stop within a parking management section PA, operates the terminal device D, and makes a parking request. For example, the user H makes the parking request by operating the terminal device D to access a website to be referred to using a browser that manages the parking space PS or an application page to be referred to using an application program, and inputting prescribed information. The prescribed information includes information for identifying the vehicle M (for example, the vehicle ID), license plate information of the vehicle M, vehicle type information of the vehicle M, and the like. The terminal device D transmits the parking request to the vehicle management server 200 on the basis of an operation of the user H (step S1). The parking request may include location information of the terminal device D acquired by a Global Positioning System (GPS) reception device of the terminal device D.

The parking management section PA is a section managed by the vehicle conveying device 1 and the vehicle conveying device 1 can autonomously travel within the parking management section PA. The parking management section PA is wider than the parking space PS. Although a case where the vehicle M is stopped near an empty space in front of the vehicle V6 within the parking management section PA is shown in the example shown in FIG. 10, a place where the vehicle M may be stopped is anywhere within the parking management section PA. Also, it is only necessary for the place where the vehicle M is stopped to be a place where at least a part of the vehicle body of the vehicle M is located within the parking management section PA.

Subsequently, the parking location controller 222 of the vehicle management server 200 determines the parking location of the vehicle M within the parking space PS on the basis of the parking request transmitted by the terminal device D (step S3). The parking location controller 222 searches for an empty space where the vehicle M can be parked within the parking space PS with reference to the map information 231 and the parking information 233 stored in the storage 230.

FIG. 11 is a diagram showing an example of parking information 233 corresponding to the situation shown in FIG. 10. The parking location controller 222 searches for an empty space within the parking space PS with reference to a "parking location" of a vehicle whose "status" indicates "parked" in the parking information 233. When the parking location controller 222 has found an empty space, the parking location controller 222 determines the empty space as the parking location of the vehicle M. Also, when no empty space has been found, the parking location controller 222 transmits a notification indicating that parking is not possible to the terminal device D.

When the parking location has been determined by the parking location controller 222, the vehicle manager 223 transmits a parking instruction to the vehicle conveying device 1 (step S5). This parking instruction includes information indicating the parking location determined by the parking location controller 222 and information for identifying the vehicle M such as license plate information of the vehicle M and vehicle type information of the vehicle M. When the parking request includes the location information of the terminal device D, the location indicated in the location information may be regarded as a current location of the vehicle M and may be included in the parking instruction.

Figure 12:
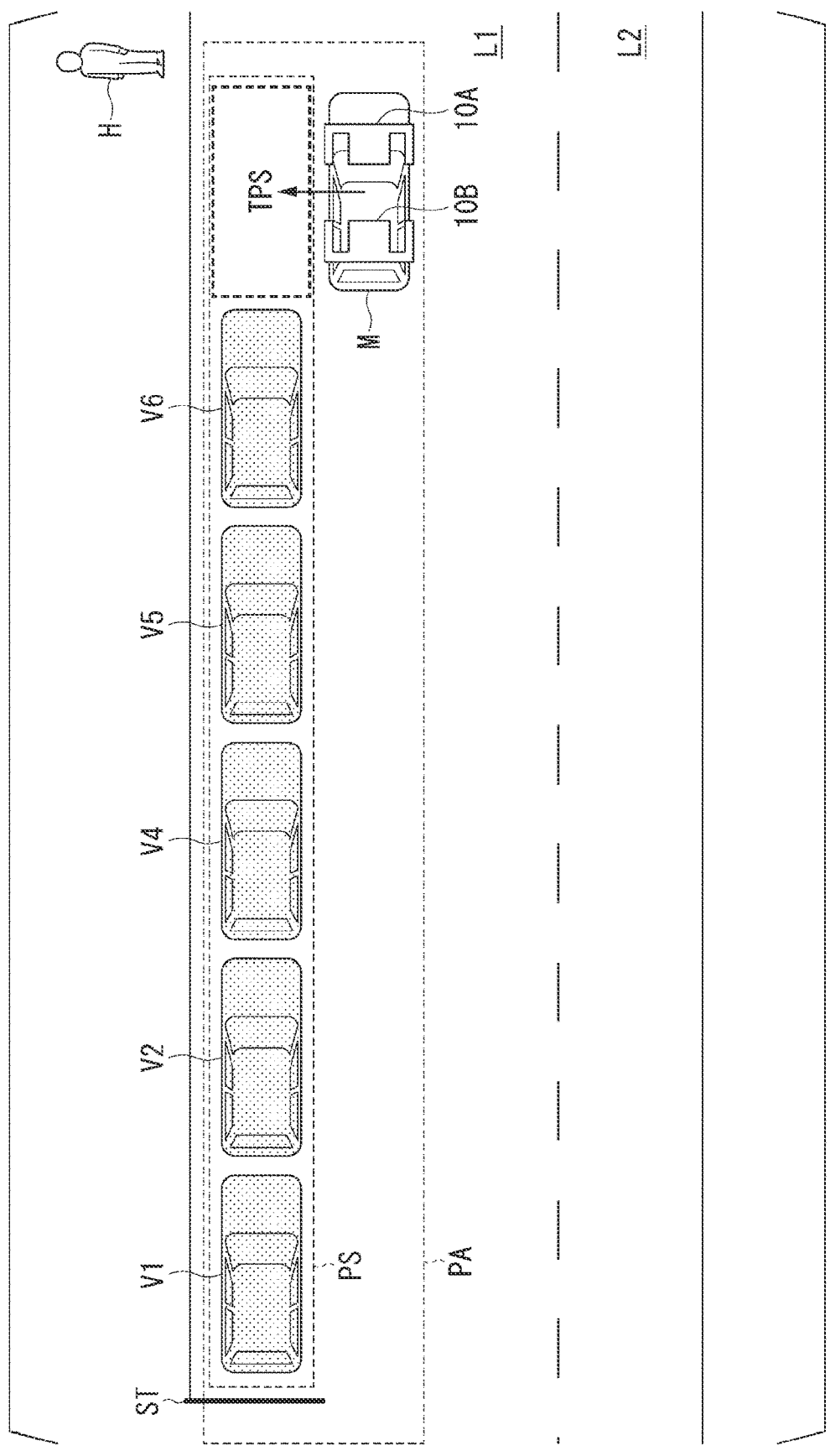
FIG. 12 is a diagram showing an example of a state in which a parking operation is performed in the parking process according to the first embodiment.

Subsequently, the traveling controller 120 of the conveyance control device 100 of the vehicle conveying device 1 controls the drive mechanism 16 so that the drive mechanism 16 moves the vehicle M to the parking location on the basis of the parking instruction received from the vehicle management server 200 (step S7). The traveling controller 120 identifies the location of the vehicle M and the distance to the vehicle M designated by the parking instruction on the basis of information obtained from the sensor 30. FIG. 12 is a diagram showing an example of a state in which a parking operation is performed in the parking process according to the first embodiment. In the example shown in FIG. 12, the traveling controller 120 receives information indicating a parking location TPS from the vehicle management server 200 and performs control for moving the vehicle M to the parking location TPS. The first conveyor robot 10A and the second conveyor robot 10B move under the vehicle M. Also, the traveling controller 120 can estimate widths and locations of the wheels on the basis of the vehicle type information and precisely control stop locations of the first conveyor robot 10A and the second conveyor robot 10B under the vehicle M. The vehicle conveying device 1 may receive vehicle type information from the vehicle M using short-range communication or the like.

After the first conveyor robot 10A and the second conveyor robot 10B move to the stop location of the vehicle M according to the control of the traveling controller 120, the arm controller 130 controls the cargo handling mechanism 20 so that the cargo handling mechanism 20 lifts the vehicle M (step S9). Subsequently, the traveling controller 120 causes the vehicle M to move to the parking location TPS in a state in which the vehicle M has been lifted under the control of the arm controller 130 (step S11). Subsequently, the arm controller 130 controls the cargo handling mechanism 20 so that the cargo handling mechanism 20 lowers the vehicle M to the parking location TPS (step S12).

Figure 13:
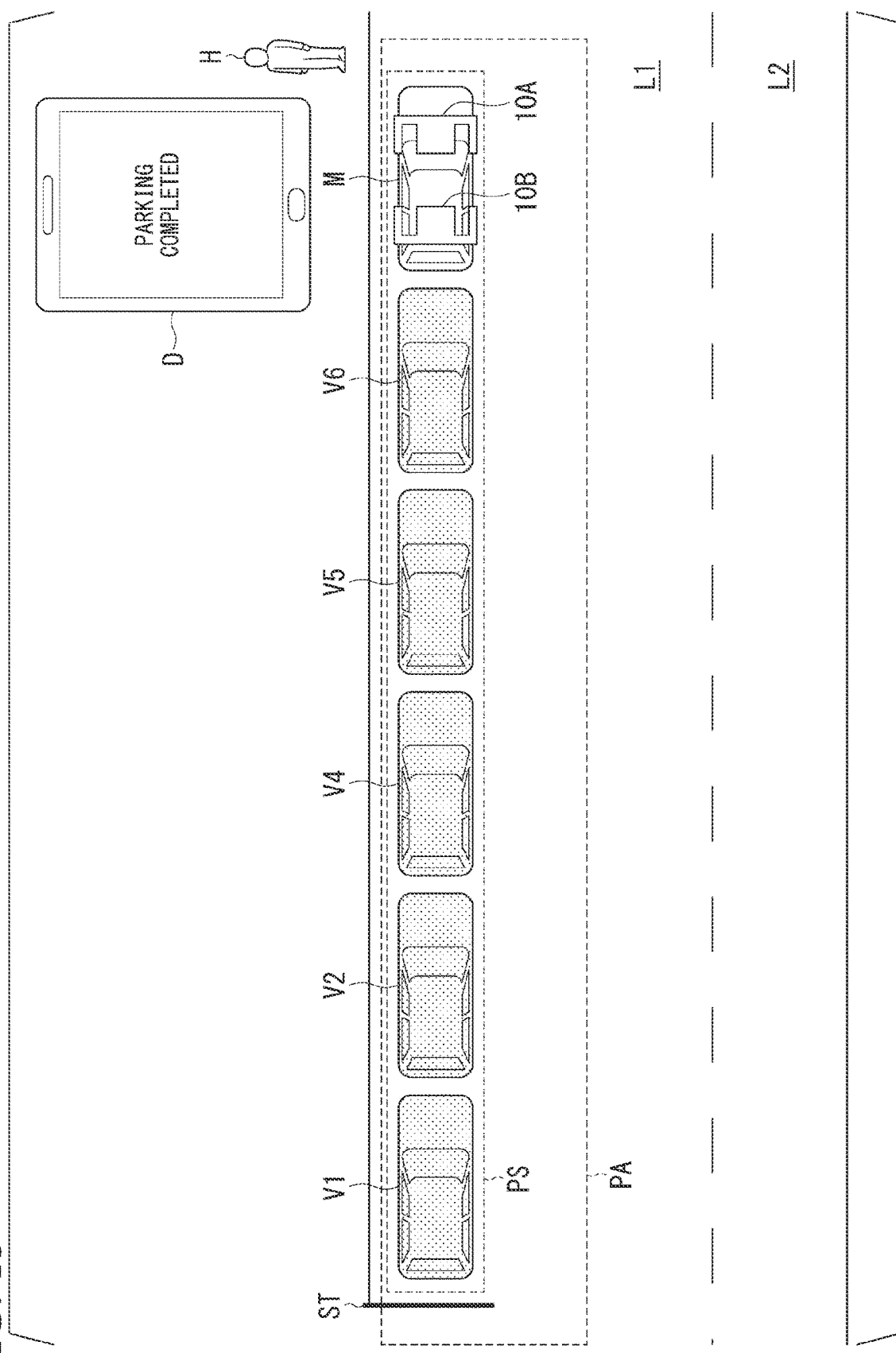
FIG. 13 is a diagram showing an example of a state in which a parking operation is completed in the parking process according to the first embodiment.

FIG. 13 is a diagram showing an example of a state in which the parking operation is completed in the parking process according to the first embodiment. In the example shown in FIG. 13, the vehicle M is moved to the parking location TPS. The communicator 110 transmits a completion notification indicating that the parking process for the vehicle M is completed to the vehicle management server 200 (step S13).

Next, the vehicle manager 223 of the vehicle management server 200 updates the parking information 233 (step S15) and transmits information for displaying a completion screen indicating that the parking process is completed to the terminal device D (step S17). Thereby, the terminal device D displays the completion screen on a display (step S19) and ends the process. Also, when the completion screen is displayed, a parking time point (a time point when a process of counting a parking time period starts) may also be displayed on the terminal device D.

[Delivery Process]

Figure 14:
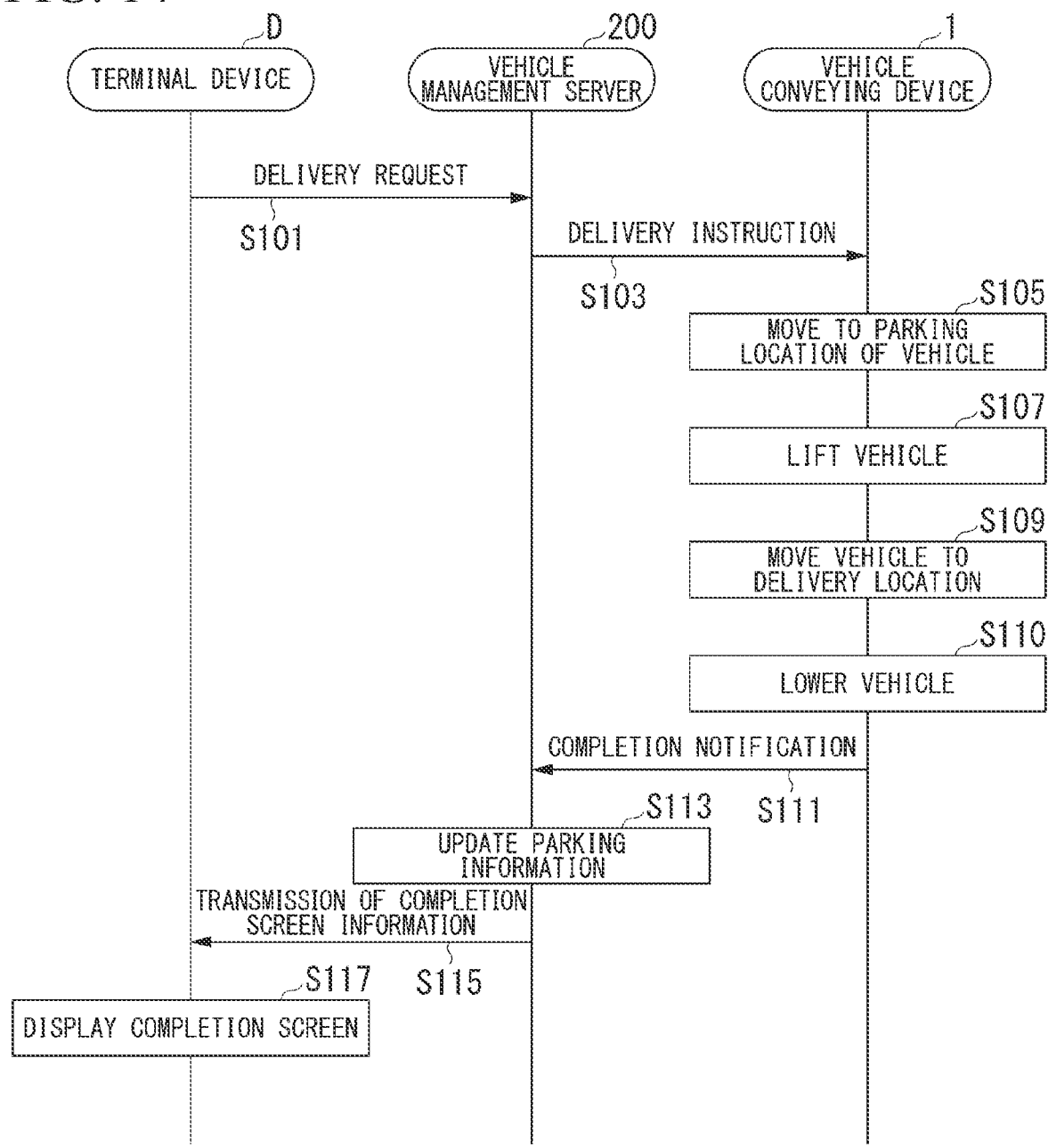
FIG. 14 is a sequence diagram showing an example of a parking process of the management system according to the first embodiment.
Figure 15:
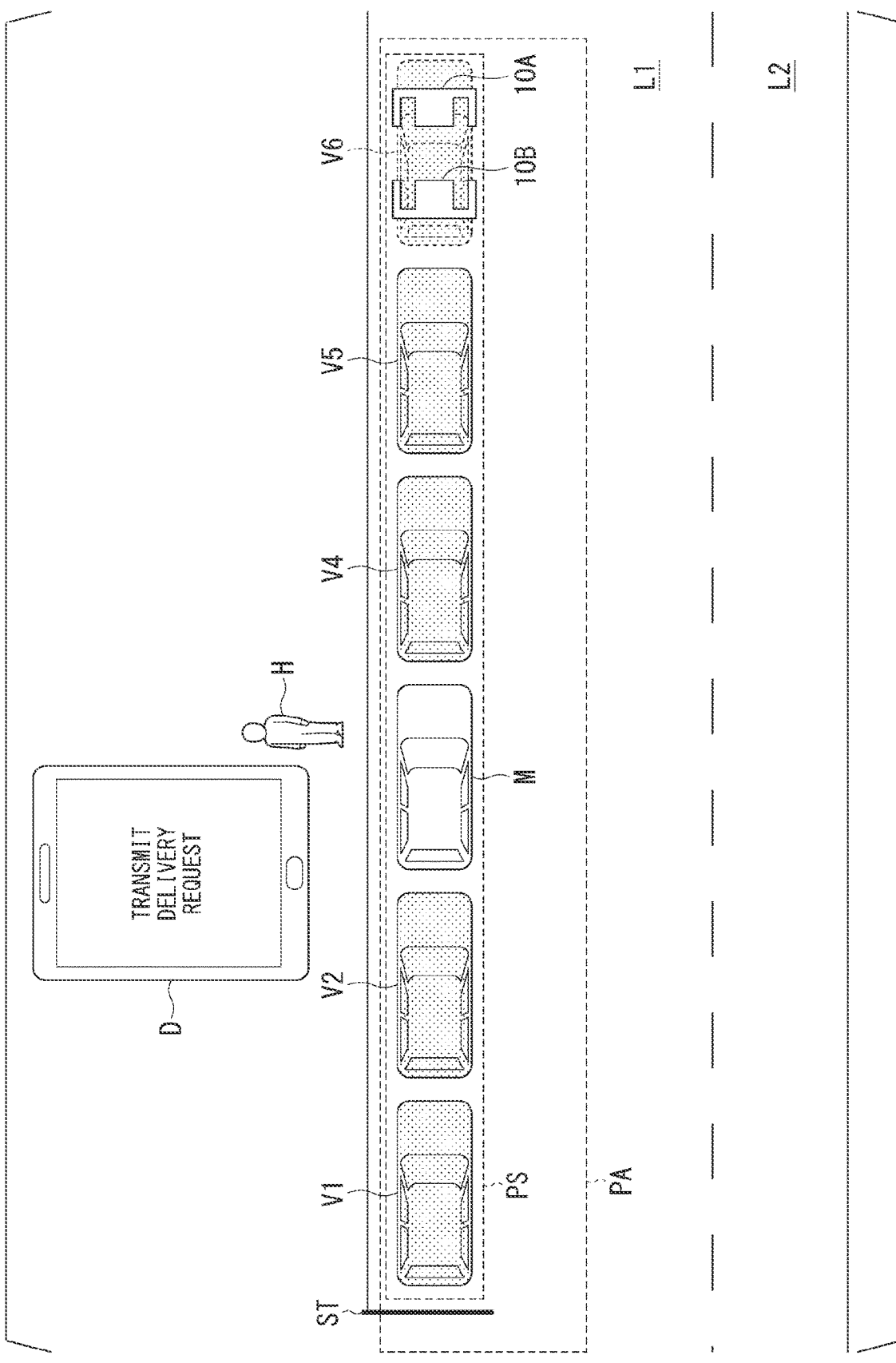
FIG. 15 is a diagram showing an example of a state in which a delivery request is made in a delivery process according to the first embodiment.

Next, a flow of a delivery process of the management system S will be described. FIG. 14 is a sequence diagram showing an example of the parking process of the management system S according to the first embodiment. FIG. 15 is a diagram showing an example of a state in which a delivery request is made in the delivery process according to the first embodiment. In the present example, a total of six vehicles including a vehicle V1, a vehicle V2, a vehicle M, a vehicle V4, a vehicle V5, and a vehicle V6 are parked in the parking space PS. The vehicle conveying device 1 is on standby in a state in which the vehicle conveying device 1 has moved under a parked vehicle (the vehicle V6) at one end of the parking space PS (a state in which the vehicle conveying device 1 has lifted the vehicle V6).

The user H who desires delivery operates the terminal device D near the parking management section PA to make a delivery request. For example, the user H makes the delivery request by operating the terminal device D to access a website to be referred to using a browser that manages the parking space PS or an application page to be referred to using an application program and inputting prescribed information. The prescribed information includes information for identifying the vehicle M (for example, a vehicle ID), license plate information of the vehicle M, vehicle type information of the vehicle M, and the like. The terminal device D transmits the delivery request to the vehicle management server 200 on the basis of the operation of the user H (step S101).

Subsequently, the vehicle manager 223 of the vehicle management server 200 transmits a delivery instruction to the vehicle conveying device 1 (step S103). This delivery instruction includes information for identifying the vehicle M such as information indicating the parking location of the vehicle M from which the delivery request has been received, license plate information of the vehicle M, and vehicle type information of the vehicle M.

Subsequently, the traveling controller 120 of the conveyance control device 100 of the vehicle conveying device 1 controls the drive mechanism 16 so that the conveyance control device 100 is moved to the parking location of the vehicle M on the basis of the delivery instruction transmitted by the vehicle management server 200 (step S105).

After the first conveyor robot 10A and the second conveyor robot 10B are moved to the parking location of the vehicle M according to the control of the traveling controller 120, the arm controller 130 controls the cargo handling mechanism 20 so that the cargo handling mechanism 20 lifts the vehicle M (step S107). Subsequently, the traveling controller 120 causes the vehicle M to move to a location where the vehicle M can travel (a delivery location outside of the parking space PS) according to manual driving or the like in a state in which the vehicle M has been lifted under the control of the arm controller 130 (step S109). Subsequently, the arm controller 130 controls the cargo handling mechanism 20 so that the cargo handling mechanism 20 lowers the vehicle M to the delivery location (step S110).

Figure 16:
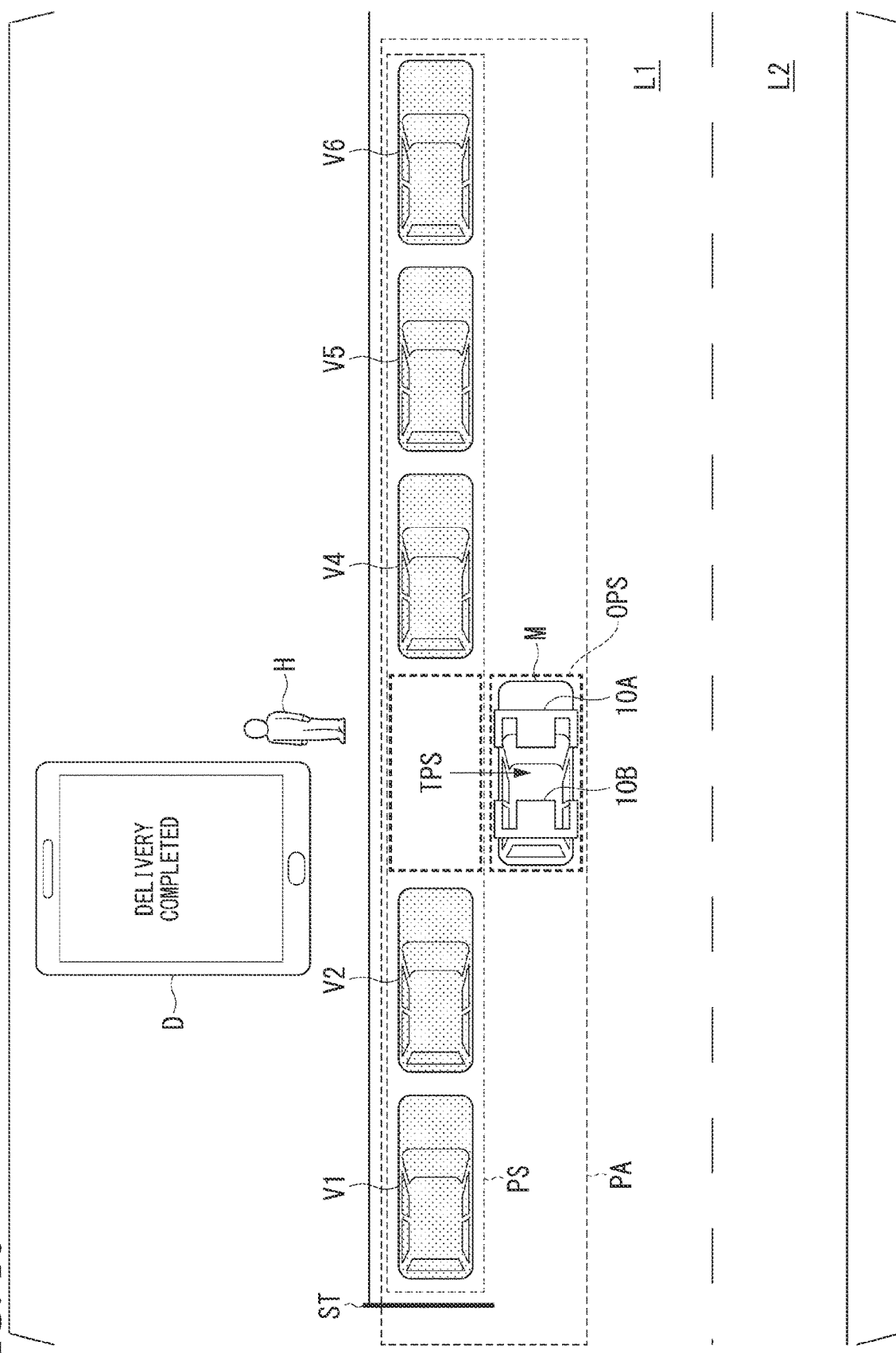
FIG. 16 is a diagram showing an example of a state in which a delivery operation is completed in the delivery process according to the first embodiment.

FIG. 16 is a diagram showing an example of a state in which a delivery operation is completed in the delivery process according to the first embodiment. In the example shown in FIG. 16, the vehicle M is moved from a parking location TPS to a delivery location OPS. The communicator 110 transmits a completion notification indicating that the delivery process of the vehicle M is completed to the vehicle management server 200 (step S111).

Subsequently, the vehicle manager 223 of the vehicle management server 200 updates parking information 233 (step S113) and transmits information for displaying a completion screen indicating that the delivery process is completed to the terminal device D (step S115). Thereby, the terminal device D displays a completion screen on a display (step S117) and ends the process. Also, when the completion screen is displayed, the terminal device D may be allowed to display a delivery time point (a time point when a process of counting the parking time period ends), a total parking time period, and the like.

[Management Process (Deletion of Empty Space)]

Figure 17:
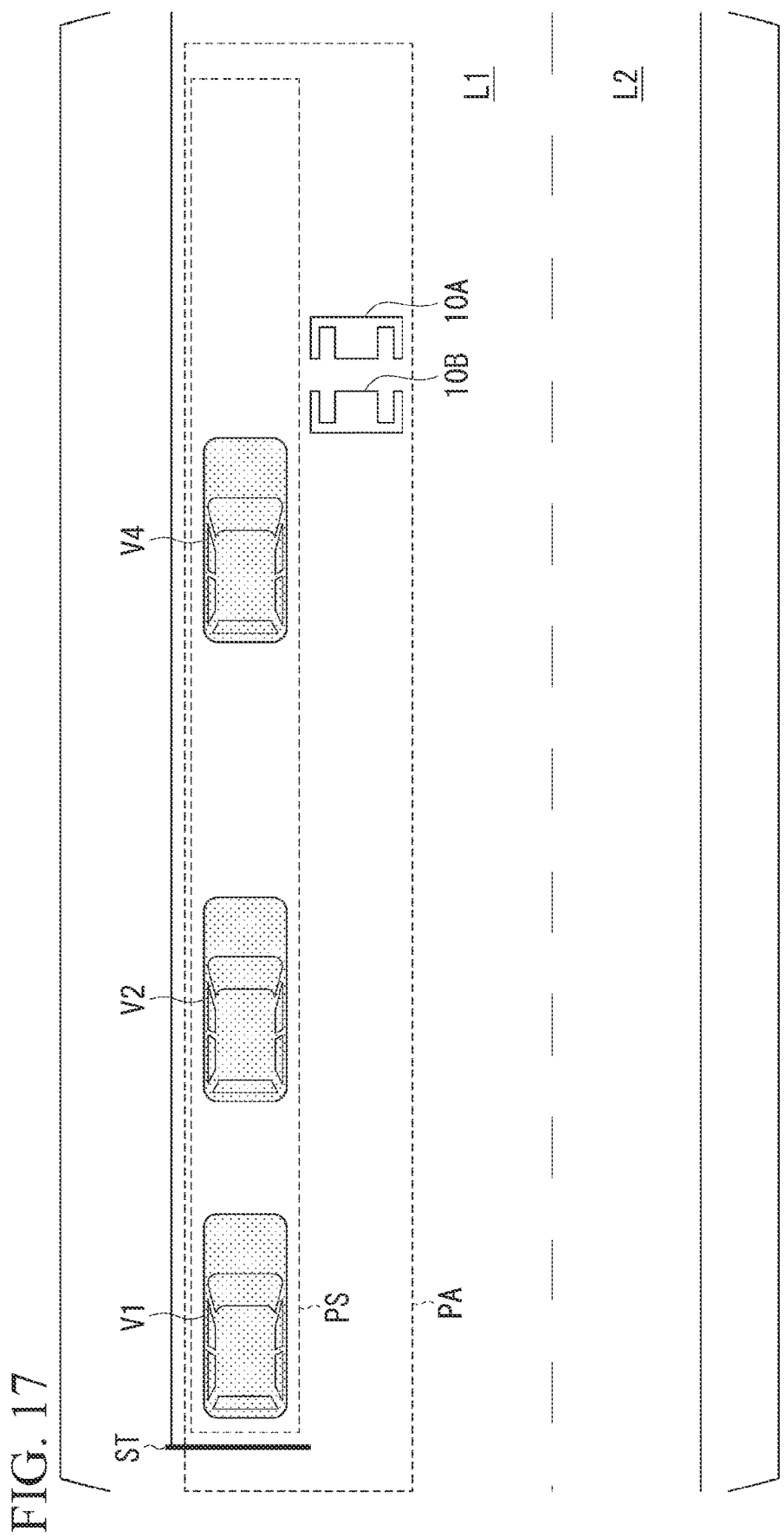
FIG. 17 is a diagram showing an example of a situation in which an unnecessary empty space is generated between parked vehicles according to the first embodiment.

Next, a process in which the management system S manages the parking space PS will be described. FIG. 17 is a diagram showing an example of a situation in which an unnecessary empty space is generated between parked vehicles according to the first embodiment. In the example shown in FIG. 17, as a result of iterating the vehicle parking process and the vehicle delivery process, an empty space where no other vehicle can be parked is generated between the vehicle V1 and the vehicle V2 and an empty space exceeding a size of one vehicle is generated between the vehicle V2 and the vehicle V4. In this case, the parking location adjuster 224 of the vehicle management server 200 adjusts the parking location of the parked vehicle. For example, the parking location adjuster 224 controls the vehicle conveying device 1 so that a distance between the parked vehicles is shortened.

When a distance between the vehicles parked within the parking space PS in the forward-backward direction is greater than or equal to a prescribed distance due to delivery of the vehicle M, the parking location adjuster 224 causes the vehicle parked within the parking space to move by controlling the vehicle conveying device 1 so that a distance between the vehicles parked within the parking space PS in the forward-backward direction is less than the prescribed distance.

Figure 18:
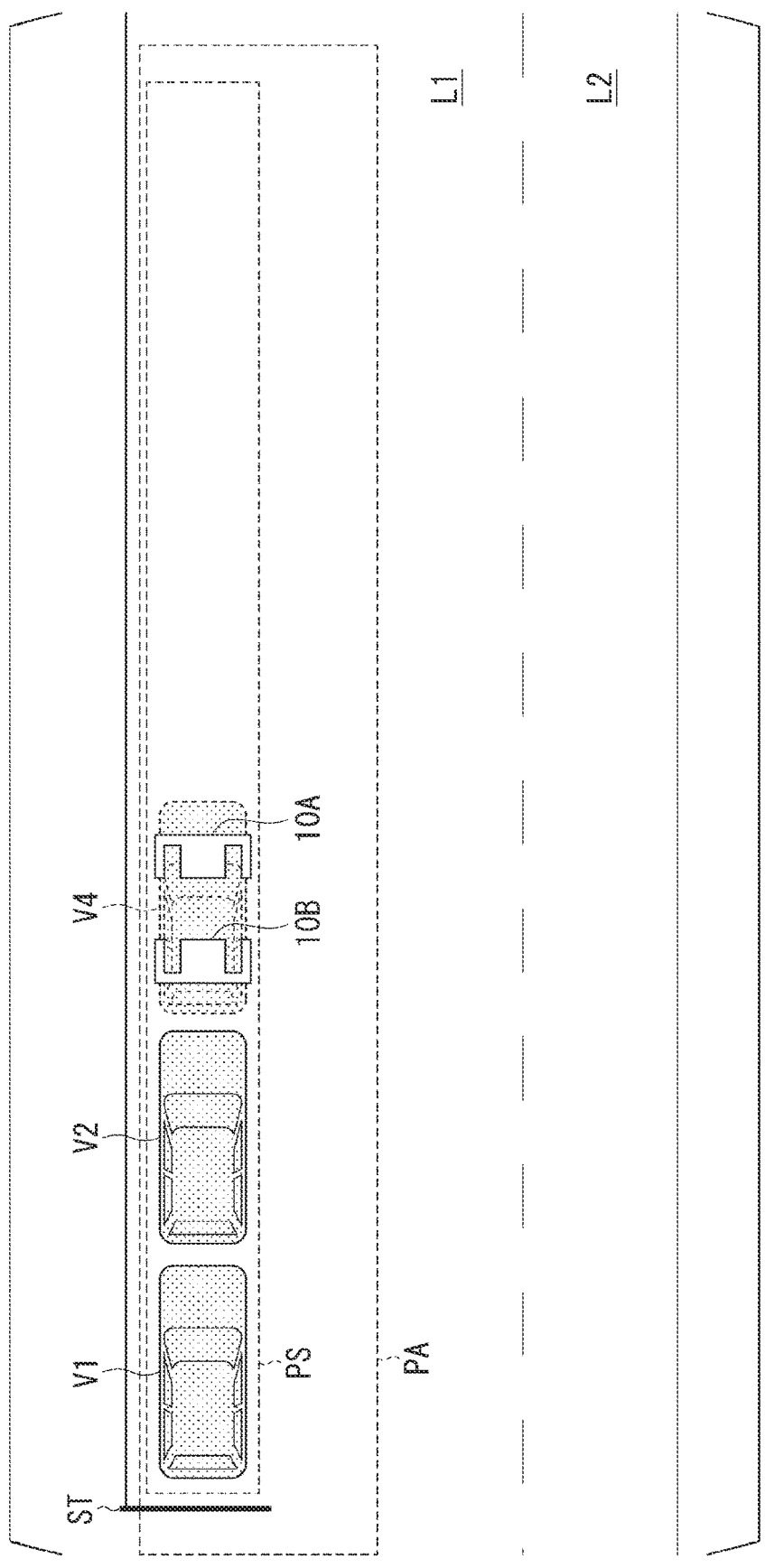
FIG. 18 is a diagram showing an example of a situation in which an unnecessary empty space between parked vehicles is deleted according to the first embodiment.

FIG. 18 is a diagram showing an example of a situation in which an unnecessary empty space between parked vehicles is deleted according to the first embodiment. In the example shown in FIG. 18, a distance between the vehicle V1 and the vehicle V2 and a distance between the vehicle V2 and the vehicle V4 are narrowed and an unnecessary empty space is deleted. Thereby, it is possible to make more effective use of the finite parking space. The parking location adjuster 224 may adjust the parking location as described above at prescribed time intervals. Alternatively, the parking location adjuster 224 may adjust the parking location as described above every time either the parking process or the delivery process is completed.

[Management Process (Parking Time Management)]

The vehicle manager 223 of the vehicle management server 200 may be configured to manage a parking time period on the basis of information such as a parking start date and time and a parking end date and time of the vehicle with reference to the parking information 233 stored in the storage 230. The vehicle manager 223 may control the vehicle conveying device 1 so that the vehicle conveying device 1 moves a vehicle whose elapsed time period from the parking start date and time has exceeded a prescribed time period to the delivery location. Also, the vehicle manager 223 may be configured to request an external server to convey the vehicle whose elapsed time period from the parking start date and time has exceeded the prescribed time period (conveyance by another device different from the vehicle conveying device 1).

The vehicle manager 223 calculates the parking time period of the vehicle M on the basis of a start time point when conveyance of the vehicle M from a prescribed location within the parking management section has been started by the vehicle conveying device 1 or a parking time point when the vehicle M has been parked and an end time point when the conveyance of the vehicle M outside of the parking space PS has been ended by the vehicle conveying device 1 or a delivery time point when the vehicle M has been delivered.

Although an example in which the vehicle conveying device 1 operates on the basis of an instruction of the vehicle management server 200 has been described above, the present invention is not limited thereto. For example, the vehicle conveying device 1 may be configured to manage the parking space PS when the vehicle conveying device 1 has a parking location management function of the vehicle management server 200. In this case, the terminal device D may be configured to directly exchange information with the vehicle conveying device 1 using short-range communication or the like.

Second Embodiment

Next, a second embodiment will be described. For example, in the related art, there is technology for moving a vehicle to a prescribed location using a conveyor device instead of causing a vehicle to travel autonomously in a parking lot or the like (for example, Patent Literature 1 and 2). Also, there is technology for preventing a vehicle other than the automated driving vehicle from entering a dedicated road when there is a dedicated road for an automated driving vehicle (for example, Patent Literature 3). Also, there is technology for moving an automated driving vehicle and park the moved automated driving vehicle in a prescribed parking space in a prescribed parking area (see, for example, Patent Literature 4). However, in the technology disclosed in Patent Literature 1 and 2, there is a problem of how to move a vehicle to be conveyed by a conveyor device and an automated driving vehicle when the vehicle that is a conveyance target and the automated driving vehicle coexist.

Therefore, an objective of the second embodiment is to provide a management system, a management device, a management method, and a storage medium capable of appropriately moving a vehicle conveyed by a conveyor device and an automated driving vehicle when the two vehicles coexist.

Hereinafter, the second embodiment of the management system, the management device, the management method, and the program of the present invention will be described with reference to the drawings.

[Overall Configuration]

Figure 19:
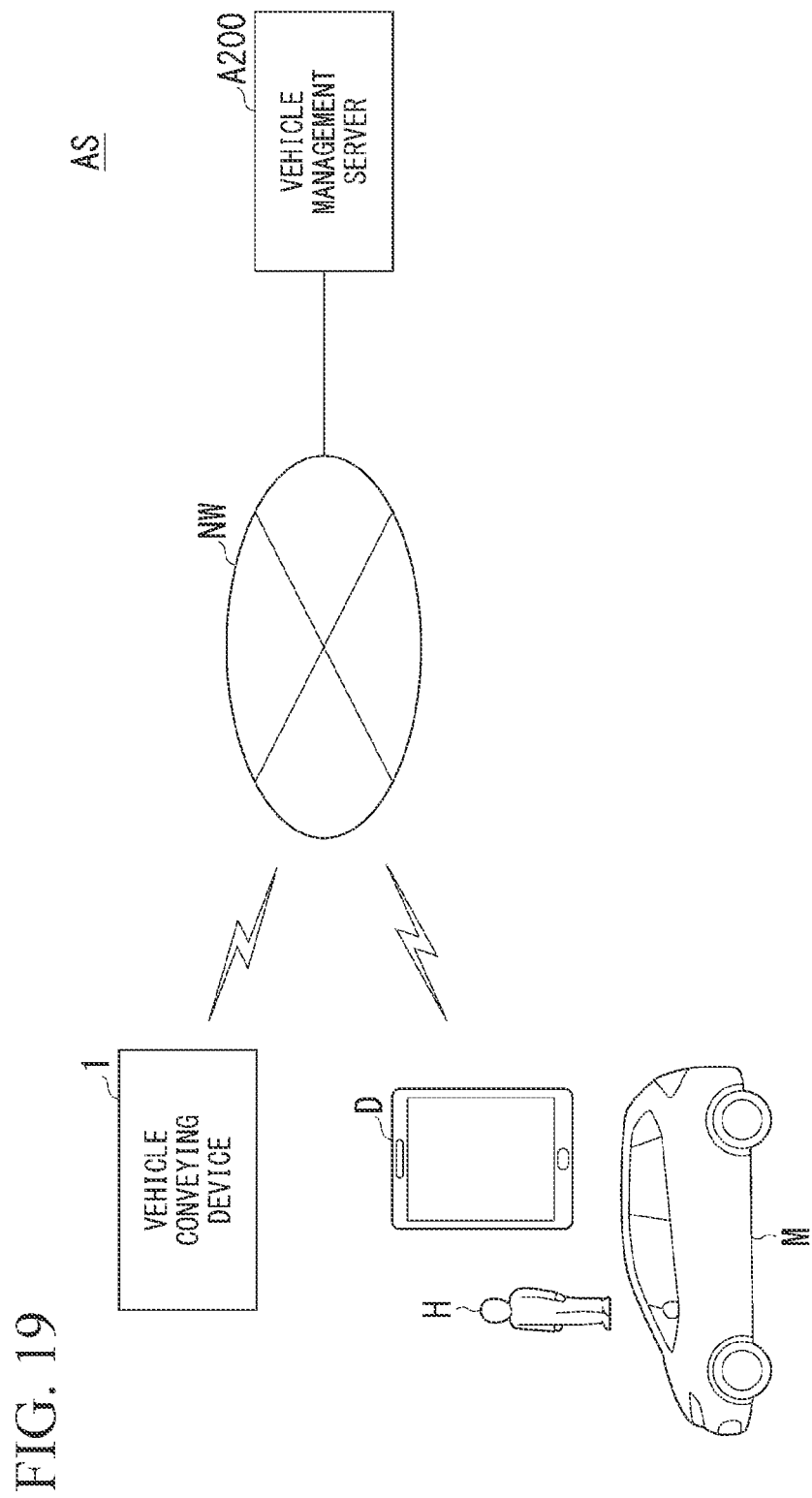
FIG. 19 is a configuration diagram of a vehicle management system using a vehicle conveying device according to a second embodiment.

FIG. 19 is a configuration diagram of a vehicle management system AS using a vehicle conveying device 1 according to the second embodiment. The management system AS is different from the management system S of the first embodiment described above in that a vehicle management server A200 is provided instead of the vehicle management server 200. Thus, differences from the first embodiment will be mainly described below and the description of content that is the same as that of the first embodiment will be omitted here. Specifically, because a configuration of a vehicle conveying device 1, operations, structures, and functional configurations of a first conveyor robot 10A and a second conveyor robot 10B during conveyance of a vehicle M, and the like in the second embodiment are similar to those described with reference to FIGS. 2 to 7, the description thereof will be omitted here. The "vehicle management server 200" in the description of FIGS. 2 to 7 may be read as the "vehicle management server A200" in the second embodiment.

The vehicle management server A200 manages parking of the vehicle in the parking space and delivery of the vehicle from the parking space. The vehicle conveying device 1 is allowed to perform the parking process and the delivery process with respect to the vehicle M on the basis of a request from a user H (for example, an occupant of the vehicle M) who desires to park the vehicle M via a terminal device D. The terminal device D, the vehicle conveying device 1, and the vehicle management server A200 can communicate with each other via the network NW.

Figure 20:
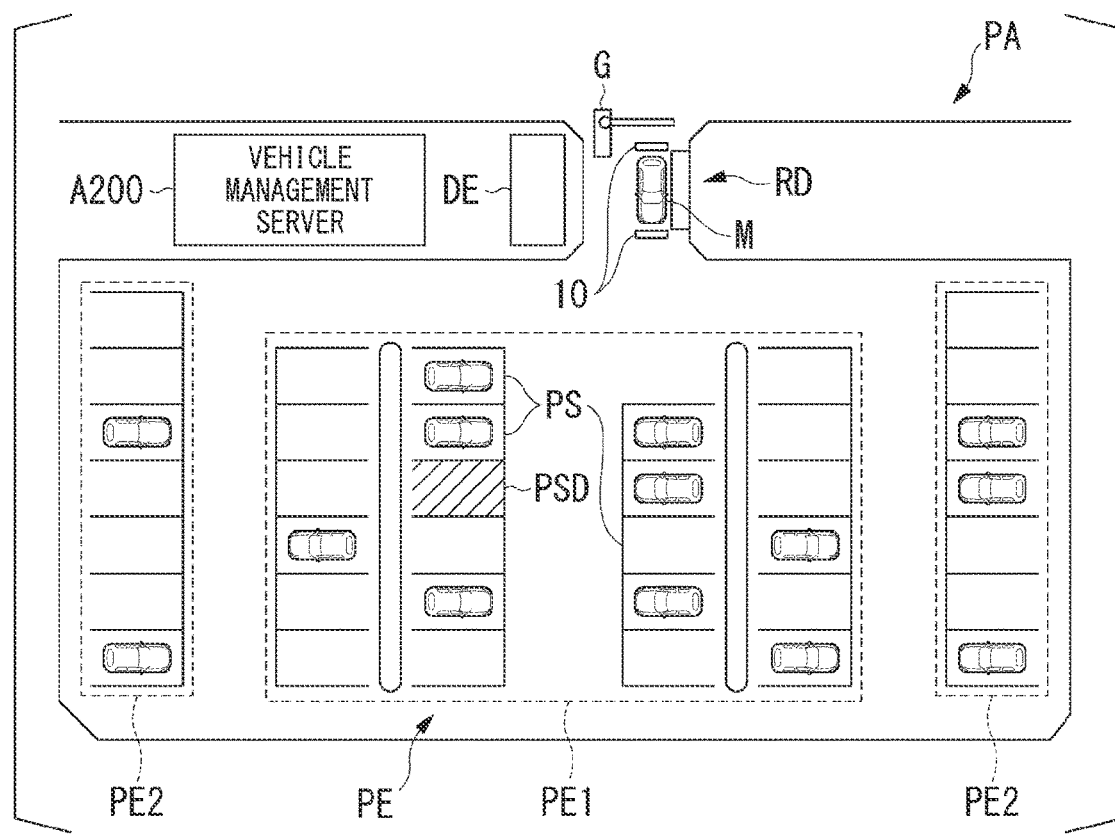
FIG. 20 is a diagram showing an outline of a parking lot that is managed by a vehicle management server according to the second embodiment.

FIG. 20 is a diagram showing an outline of a parking lot PA that is managed by the vehicle management server A200 according to the second embodiment. The management system AS causes the vehicle M to be moved in a parking space designated by the vehicle management server A200 by causing the vehicle M that has entered the parking lot PA to travel autonomously or to be conveyed by the vehicle conveying device 1 in the parking lot PA serving as a management area of the vehicle management server A200. As shown in FIG. 20, the parking lot PA includes a parking area PE partitioned into a large number of parking spaces PS and an entrance/exit gate G is provided at the entrance of the parking lot PA. The entrance of the parking lot PA also serves as the exit of the parking lot PA. Between the parking area PE and the entrance/exit gate G, a getting-in/out area RD where an occupant of the vehicle M gets into or out of the vehicle M is provided. The parking area PE is divided into a first parking area PE1 near the entrance of the parking lot PA and a second parking area PE2 that is not near the entrance of the parking lot PA. The first parking area PE1 is an example of a first area and the second parking area PE2 is an example of a second area. The second parking area PE2 may be an area farther from the entrance of the parking lot PA than the first parking area PE1. For example, a distance from the entrance of the parking lot PA to the first parking area PE1 or the second parking area PE2 may be set as a shortest distance between the entrance of the parking lot PA and the first parking area PE1 or the second parking area PE2 or may be set as a length of the shortest route when the vehicle travels from the entrance of the parking lot PA to the first parking area PE1 or the second parking area PE2.

The vehicle M parked in the parking lot PA stops in the getting-in/out area RD after entering the entrance/exit gate G. When the vehicle M stops in the getting-in/out area RD, the occupant of the vehicle M gets out of the vehicle M. Subsequently, the vehicle management server A200 designates the parking space PS of the vehicle M. The vehicle management server A200 transmits a parking instruction for causing the vehicle M to travel autonomously or conveying the vehicle M to park the vehicle M in the parking space PS using the vehicle conveying device 1 to the vehicle M or the vehicle conveying device 1 and causes the vehicle M to be moved from the getting-in/out area RD to the parking space PS (hereinafter referred to as a "designated parking space PSD") designated by the vehicle management server A200. The vehicle management server A200 transmits a delivery instruction for causing the vehicle M to travel autonomously or conveying and delivering the vehicle M using the vehicle conveying device 1 to the vehicle M or the vehicle conveying device 1 and causes the vehicle M to be moved from the parking space PS to the getting-in/out area RD. The vehicle management server A200 may be configured to cause the vehicle M to be conveyed by the vehicle conveying device 1 from a location other than the getting-in/out area RD.

A warehouse DE capable of accommodating a plurality of vehicle conveying devices 1 is provided near the getting-in/out area RD and the plurality of vehicle conveying devices 1 are accommodated in the warehouse DE. The vehicle conveying device 1 accommodated in the warehouse DE moves from the warehouse DE to the location of the vehicle M stopped in the getting-in/out area RD on the basis of the information transmitted by the vehicle management server A200 and is equipped with the vehicle M to convey the vehicle M to the designated parking space PSD.

Figure 21:
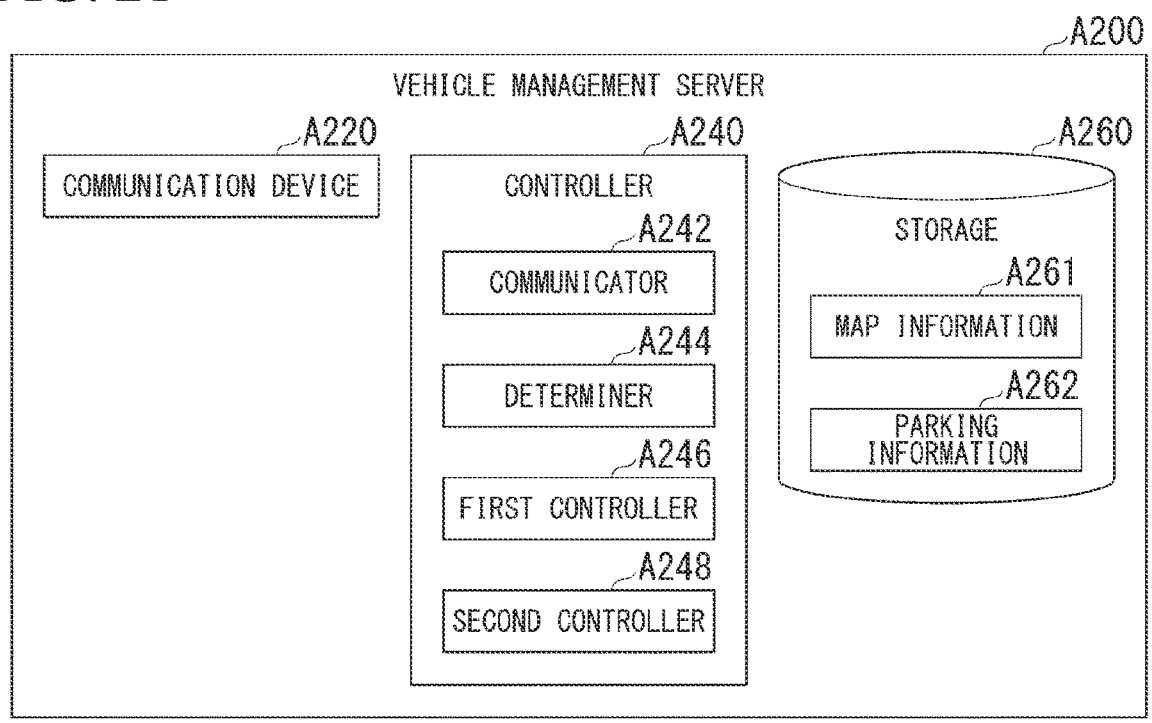
FIG. 21 is a block diagram showing an example of the vehicle management server according to the second embodiment.

FIG. 21 is a block diagram showing an example of the vehicle management server A200 according to the second embodiment. As shown in FIG. 21, the vehicle management server A200 includes, for example, a communication device A220, a controller A240, and a storage A260. The communication device A220 includes, for example, an external communication device, for example, a device for wirelessly communicating with the vehicle conveying device 1 or the vehicle M, and an antenna. The communication device A220 includes a communication module that performs wireless communication via a public circuit.

The controller A240 includes, for example, a communicator A242, a determiner A244, a first controller A246, and a second controller A248. The communicator A242, the determiner A244, the first controller A246, and the second controller A248 are implemented by, for example, a hardware processor such as a CPU (computer) executing a program (software). Also, some or all of the above components may be implemented by hardware (including a circuit; circuitry) such as an LSI circuit, an ASIC, an FPGA, or a GPU or may be implemented by software and hardware in cooperation. The program may be prestored in a storage device (a storage device including a non-transitory storage medium) such as an HDD or a flash memory of vehicle management server A200 or may be stored in a removable storage medium such as a DVD or a CD-ROM and installed in the HDD or the flash memory of the vehicle management server A200 when the storage medium (the non-transitory storage medium) is mounted in a drive device. The storage A260 includes, for example, these storage devices and the like. The storage A260 stores map information A261 about a map within the parking lot PA and parking information A262 indicating a parking situation in the parking space PS.

The communicator A242 transmits and receives a signal to and from the vehicle M located in the getting-in/out area RD or the parking space PS or the vehicle conveying device 1 via the communication device A220. The communicator A242 receives, for example, vehicle information transmitted by the vehicle M in the getting-in/out area RD via the communication device A220. The vehicle information includes automated driving vehicle information and vehicle specification information. The automated driving information is information indicating that the vehicle M has an automated driving function in which the vehicle M can travel autonomously and is transmitted only by the automated driving vehicle. The vehicle specification information is information about specifications such as weight, wheelbase, and vehicle height for the vehicle M. For example, the communicator 242 transmits a parking instruction for moving the vehicle M from the getting-in/out area RD to the designated parking space PSD and a delivery instruction for moving the vehicle M from the parking space PS to the getting-in/out area RD to the vehicle M or the vehicle conveying device 1 via the communication device A220.

The determiner A244 determines whether or not conveyance of the target vehicle that has entered the parking lot PA is necessary. Thus, the determiner A244 determines whether or not the vehicle M is an automated driving vehicle on the basis of whether or not the automated driving vehicle information is included in the vehicle information transmitted by the vehicle M and received by the communicator A242. The determiner A244 determines that the vehicle M is not conveyed by the vehicle conveying device 1 when it is determined that the vehicle M is an automated driving vehicle and is not required to be conveyed and determines that the vehicle M is conveyed by the vehicle conveying device 1 when it is determined that the vehicle M is not the automated driving vehicle.

When the determiner A244 determines that the vehicle M is not an automated driving vehicle and conveyance is required, the first controller A246 designates one of the parking spaces PS within the first parking area PE1 as the designated parking space PSD. After the designated parking space PSD is designated within the first parking area PE1, the first controller A246 sets the designated parking space PSD as a target conveyance point and causes the vehicle conveying device 1 to convey the vehicle M toward the designated parking space PSD. Thus, the first controller A246 determines a vehicle conveying device 1 for conveying the vehicle M among the plurality of vehicle conveying devices 1 and the communicator A242 transmits information of the target conveyance point to the vehicle conveying device 1 determined by the first controller A246. The first controller A246 transmits the vehicle specification information included in the vehicle information to the vehicle conveying device 1 together with the information of the target conveyance point. Also, the management system AS may include only one vehicle conveying device 1.

The first controller A246 searches for an empty space where the vehicle M can be parked among a plurality of parking spaces PS, for example, with reference to the map information A261 and the parking information A262 stored in the storage A260 when the designated parking space PSD is designated among the plurality of parking spaces PS within the first parking area PE1. The first controller A246 designates designated parking spaces PSD in order from a location closest to the entrance of the parking lot PA among the plurality of parking spaces PS that has been found in the search.

Figure 22:
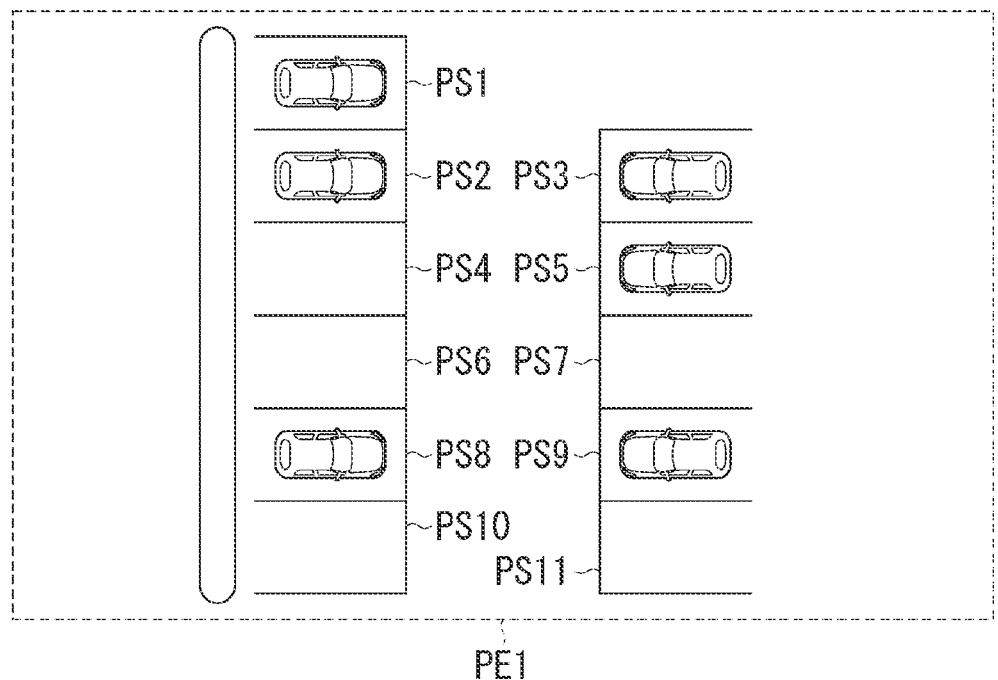
FIG. 22 is a diagram showing an example of a first parking area of a parking lot according to the second embodiment.

For example, as shown in FIG. 22, when the parking spaces set in order from the location closest to the entrance of the parking lot PA are a first parking space PS1, a second parking space PS2, and the like, the first controller A246 first determine whether the first parking space PS1 can be designated as the designated parking space PSD. For example, the first controller A246 determines that the first parking space PS1 cannot be designated as the designated parking space PSD when the vehicle is parked in the first parking space PS1 or when the first parking space PS1 is already designated as the designated parking space PSD for another vehicle and determines that the first parking space PS1 can be designated as the designated parking space PSD otherwise.

It is determined whether the second parking space PS2 can be designated as the designated parking space PSD when the first parking space PS1 cannot be designated as the designated parking space PSD and it is determined whether a third parking space PS3 can be designated as the designated parking space PSD when the second parking space PS2 cannot be designated as the designated parking space PSD. Subsequently, it is similarly determined whether a fourth parking space PS4, a fifth parking space PS5, and the like can be designated as the designated parking space PSD in that order and the parking space determined to be capable of being designated as the designated parking space PSD is designated as the designated parking space PSD. The first controller A246 may determine parking spaces PS each having a size in which the vehicle M can be parked on the basis of the vehicle specification information transmitted by the vehicle M and designate a designated parking space PSD among the parking spaces PS each having the size in which the vehicle M can be parked.

The second controller A248 designates one of the parking spaces PS within the second parking area PE2 as the designated parking space PSD when the determiner A244 determines that the vehicle M is an automated driving vehicle. After the designated parking space PSD is designated within the second parking area PE2, the second controller A248 designates the designated parking space PSD as a target movement point and causes the vehicle M to travel autonomously toward the designated parking space PSD. Thus, the communicator A242 transmits information of the target movement point to the vehicle M.

Figure 23:
FIG. 23 is a diagram showing an example of a second parking area of the parking lot according to the second embodiment.

The second controller A248 searches for an empty space where the vehicle M can be parked among a plurality of parking spaces PS, for example, with reference to the map information A261 and the parking information A262 stored in the storage A260 when the designated parking space PSD is designated among the plurality of parking spaces PS within the second parking area PE2. The second controller A248 designates designated parking spaces PSD in order from a location closest to the entrance of the parking lot PA among the plurality of parking spaces PS that has been found in the search. For example, as shown in FIG. 23, the second controller A248 first determine whether a first parking space PS21 can be designated as the designated parking space PSD when the parking spaces set in order from the location farthest from the entrance of the parking lot PA are the first parking space PS21, a second parking space PS22, and the like. For example, the second controller A248 determines that the first parking space PS21 cannot be designated as the designated parking space PSD when the vehicle is parked in the first parking space PS21 or when the first parking space PS21 is already designated as the designated parking space PSD for another vehicle and determines that the first parking space PS21 can be designated as the designated parking space PSD otherwise.

It is determined whether the second parking space PS22 can be designated as the designated parking space PSD when the first parking space PS21 cannot be designated as the designated parking space PSD and it is determined whether a third parking space PS23 can be designated as the designated parking space PSD when the second parking space PS22 cannot be designated as the designated parking space PSD. Subsequently, similarly, it is determined whether a fourth parking space PS24, a fifth parking space PS25, and the like can be designated as the designated parking space PSD in that order and the parking space determined to be capable of being designated as the designated parking space PSD is designated as the designated parking space PSD. The second controller A248 may determine parking spaces PS each having a size in which the vehicle M can be parked on the basis of the vehicle specification information transmitted by the vehicle M and designate the designated parking space PSD among the parking spaces PS each having the size in which the vehicle M can be parked.

Vehicles entering the parking lot PA include an automated driving vehicle and a vehicle (hereinafter referred to as a "non-automated driving vehicle") other than the automated driving vehicle. The automated driving vehicle includes, for example, a vehicle controller including a transceiver, an autonomous traveling controller, a navigation device, and an action plan generator. The automated driving vehicle stores, for example, vehicle information. The transceiver transmits the vehicle information of the host vehicle to the vehicle management server A200 and receives the information transmitted by the vehicle management server A200. The autonomous traveling controller performs a control process of causing the host vehicle to travel autonomously. The navigation device determines a route from a departure point (or a current location) to an arrival point. The action plan generator automatically generates a target trajectory along which the vehicle M will travel in the future (independent of the driver's operation) with respect to the determined route.

The vehicle controller transmits vehicle information to the vehicle management server A200 in the transceiver when the vehicle M has arrived at the getting-in/out area RD of the parking lot PA. When the vehicle management server A200 has transmitted information of the target movement point, the vehicle controller generates a target trajectory from the getting-in/out area RD to the designated parking space PSD using the autonomous traveling controller and causes the vehicle M to travel autonomously along the target trajectory and to be moved to the designated parking space PSD. Although a control process of the second controller A248 is a process of transmitting information of a target movement point to the vehicle M without determining a route of the vehicle M or generating the target trajectory as a control process of causing the vehicle M to travel autonomously in the second embodiment, the second controller A248 may perform a control process of determining a route of the vehicle M or generating a target trajectory.

For example, as in the case of the automated driving vehicle, when the information of the target conveyance point has been transmitted by the vehicle management server A200, the traveling controller 120 provided in the vehicle conveying device 1 generates a target trajectory from the getting-in/out area RD to the designated parking space PSD and causes the vehicle conveying device 1 to travel along the target trajectory and to move the vehicle M to the designated parking space PSD. Although a control process of the first controller A246 is a process of transmitting information of a target conveyance point to the vehicle conveying device 1 without determining a route of the vehicle conveying device 1 or generating a target trajectory as a control process of causing the vehicle conveying device 1 to travel and causing the vehicle M to be moved in the second embodiment, the first controller A246 may perform a control process of determining a route of the vehicle conveying device 1 and generating a target trajectory.

The non-automated driving vehicle includes a transceiver of the automated driving vehicle that transmits vehicle information of the host vehicle to the vehicle management server A200. The non-automated driving vehicle includes, for example, a storage for storing the vehicle information. The transceiver of the vehicle M, which is a non-automated driving vehicle, transmits the vehicle information stored in the storage to the vehicle management server A200.

Figure 24:
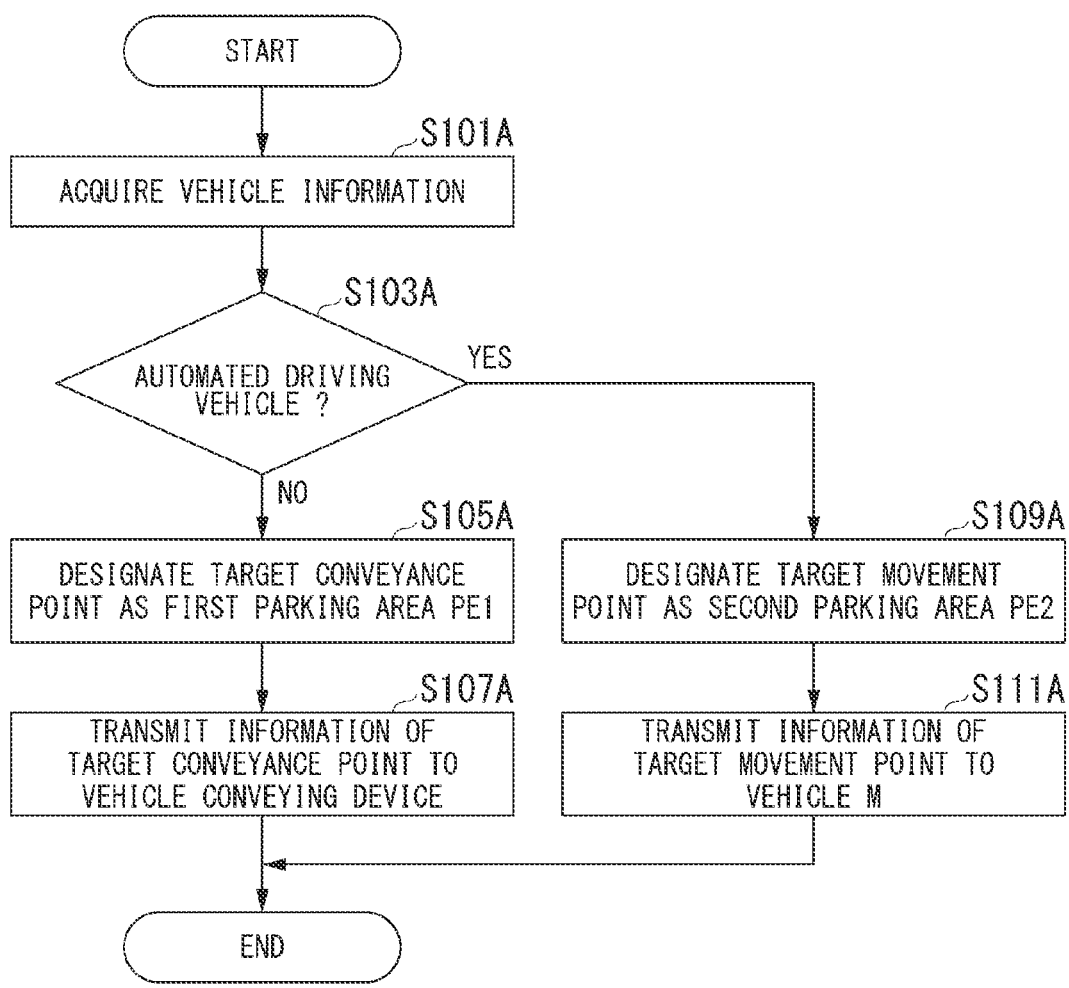
FIG. 24 is a flowchart showing an example of a process of the vehicle management server according to the second embodiment.

Next, a process of the vehicle management server A200 will be described. FIG. 24 is a flowchart showing an example of a process of the vehicle management server A200. As shown in FIG. 24, the vehicle management server A200 receives vehicle information transmitted by the vehicle M using the communicator A242 via the communication device A220 (step S101A). The vehicle M transmits vehicle information to the vehicle management server A200, for example, while passing through the entrance/exit gate G and stopping in the getting-in/out area RD. When the vehicle M does not have a function of transmitting the vehicle information to the vehicle management server A200, the terminal device D of the user of the vehicle M may acquire and transmit the vehicle information of the vehicle M and the vehicle management server A200 may receive the vehicle information transmitted by the terminal device D. In this case, for example, the terminal device D may acquire the vehicle information of the vehicle M from the vehicle M using short-range wireless communication or the like or may acquire the vehicle information of the vehicle M input to the terminal device D by the user of the vehicle M or the like.

The determiner A244 provided in the vehicle management server A200 determines whether or not the vehicle M stopped in the getting-in/out area RD is an automated driving vehicle on the basis of the vehicle information received by the communicator A242 (step S103A). When it is determined that the vehicle stopped in the getting-in/out area RD is not an automated driving vehicle (a non-automated driving vehicle), the first controller A246 designates a designated parking space PSD within the first parking area PE1 and designates the designated parking space PSD as the target conveyance point (step S105A). The first controller A246 designates a parking space PS closest to the entrance of the parking lot PA among the parking spaces PS of the first parking area PE1 as the target conveyance point.

Subsequently, the first controller A246 determines a vehicle conveying device 1 for conveying the vehicle M from among the plurality of vehicle conveying devices 1 and transmits the information of the target conveyance point to the determined vehicle conveying device 1 (step S107A). The vehicle conveying device 1 for conveying the vehicle M may be determined in any way. For example, the vehicle conveying devices 1 may be determined in order among the remaining vehicle conveying devices 1 within the warehouse DE or may be determined in ascending order of frequency of use. Alternatively, information such as a vehicle type and a tire type of the vehicle M may be acquired on the basis of the vehicle specification information transmitted by the vehicle M and the vehicle conveying devices 1 may be determined in accordance with the information. At this time, the first controller A246 transmits the vehicle specification information included in the vehicle information to the vehicle conveying device 1 together with the information of the target conveyance point. In this way, the vehicle management server A200 ends the process shown in FIG. 24.

Also, when it is determined that the vehicle stopped in the getting-in/out area RD is an automated driving vehicle in step S103A, the second controller A248 designates a designated parking space PSD within the second parking area PE2 and designates the designated parking space PSD as the target movement point (step S109A). The second controller A248 designates a parking space PS farthest from the entrance of the parking lot PA among the parking spaces PS of the second parking area PE2 as the designated parking space PSD.

Subsequently, the second controller A248 transmits the information of the target movement point to the vehicle M (step S111A). In this way, the vehicle management server A200 ends the process shown in FIG. 24.

Figure 25:
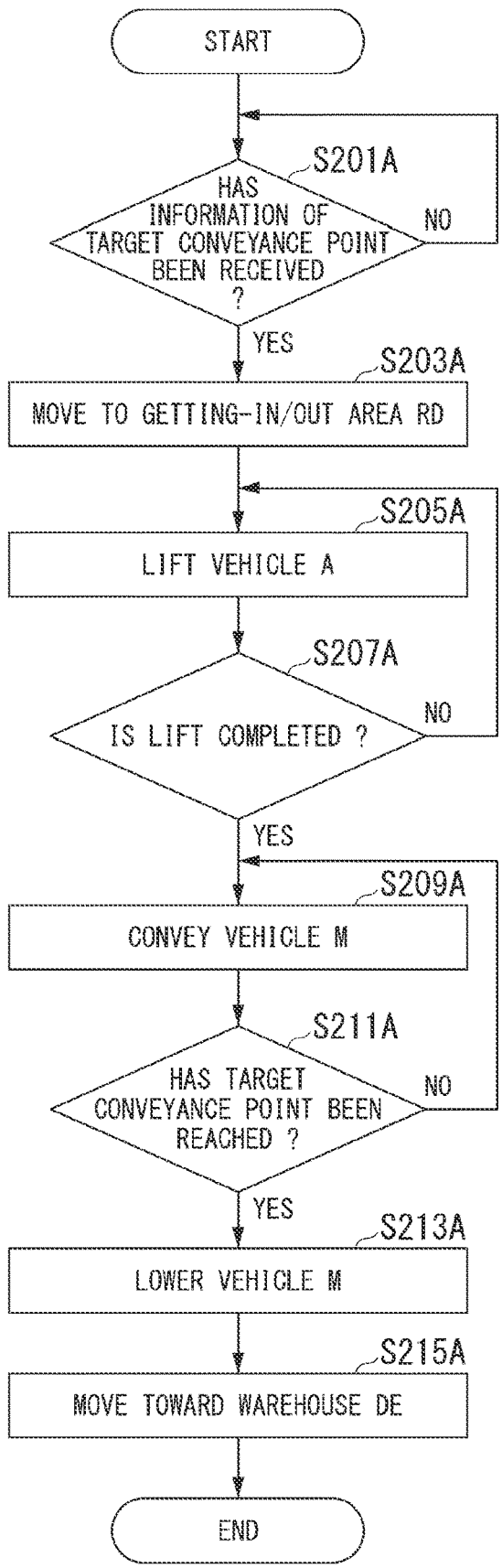
FIG. 25 is a flowchart showing an example of a process of a conveyance control device provided in the vehicle conveying device according to the second embodiment.

Next, a process of the vehicle conveying device 1 will be described. FIG. 25 is a flowchart showing an example of a process of the conveyance control device 100 provided in the vehicle conveying device 1 according to the second embodiment. As shown in FIG. 25, the conveyance control device 100 provided in the vehicle conveying device 1 determines whether or not the communicator 110 has received information of a target conveyance point transmitted by the vehicle management server A200 (step S201A). When it is determined that the information of the target conveyance point has not been received by the communicator 110, the vehicle conveying device 1 iterates the processing of step S201A.

When it is determined that the communicator 110 has received the information of the target conveyance point, the conveyance control device 100 controls the drive mechanism 16 using the traveling controller 120 so that the drive mechanism 16 moves the vehicle conveying device 1 to a location of the vehicle M in the getting-in/out area RD (step S203A). Subsequently, the conveyance control device 100 causes the vehicle conveying device 1 to move near the vehicle M, causes the first conveyor robot 10A to lift the front wheels of the vehicle M, and causes the second conveyor robot 10B to lift the rear wheels of the vehicle M (step S205A). Subsequently, the conveyance control device 100 determines whether or not the vehicle M has been lifted (step S207A) and returns to step S205A to continue a process of lifting the vehicle M when it is determined that the vehicle M has not been lifted.

When it is determined that the vehicle M has been lifted, the conveyance control device 100 conveys the vehicle M to the designated parking space PSD that has been designated according to the information of the target conveyance point transmitted by the vehicle management server A200 (step S209A). Subsequently, the conveyance control device 100 determines whether or not the target conveyance point has been reached (step S211A). When it is determined that the target conveyance point has not been reached, the conveyance control device 100 returns to step S209A and continues conveyance of the vehicle M.

When it is determined that the target conveyance point has been reached, the conveyance control device 100 lowers the lifted vehicle M (step S213A). After the vehicle M is lowered, the conveyance control device 100 causes the vehicle conveying device 1 to move toward the warehouse DE (step S215). When new information of the target conveyance point is received before the vehicle conveying device 1 arrives at the warehouse DE, the conveyance control device 100 causes the vehicle conveying device 1 to move to the getting-in/out area RD as it is without causing the vehicle conveying device 1 to move toward the warehouse DE. In this way, the process shown in FIG. 25 ends.

Figure 26:
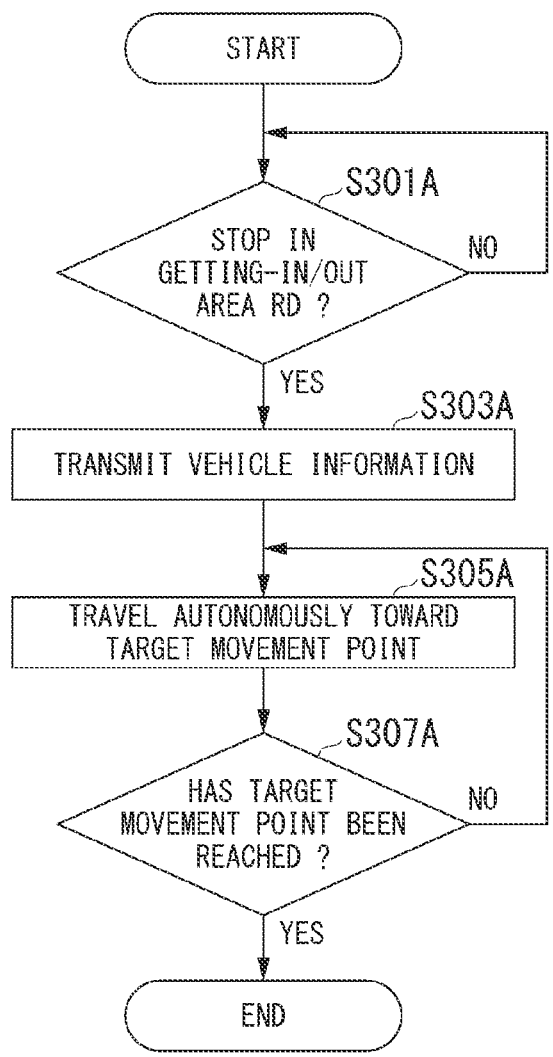
FIG. 26 is a flowchart showing an example of a process of a vehicle controller in a vehicle that is an automated driving vehicle according to the second embodiment.

Next, a process of the vehicle controller in the vehicle M will be described. FIG. 26 is a flowchart showing an example of the process of the vehicle controller in the vehicle M that is the automated driving vehicle according to the second embodiment. As shown in FIG. 26, the vehicle controller provided in the vehicle M determines whether or not the vehicle has stopped in the getting-in/out area RD (step S301A). When it is determined that the vehicle has not stopped in the getting-in/out area RD, the vehicle controller iterates the processing of step S301A. When it is determined that the vehicle has stopped in the getting-in/out area RD, the vehicle controller transmits vehicle information to the vehicle management server A200 (step S303A).

Subsequently, the vehicle controller determines a route to a target movement point transmitted by the vehicle management server A200 using the navigation device, and generates a target trajectory when the vehicle will travel along the route using the action plan generator. The vehicle controller causes the vehicle M to move toward the target movement point using the autonomous traveling controller (step S305A).

Subsequently, the vehicle controller determines whether or not the vehicle M has reached the target movement point (step S307A). When it is determined that the target movement point has not been reached, the vehicle controller returns to step S305A until the target movement point is reached and causes the vehicle M to travel continuously autonomously. When it is determined that the target movement point has been reached, the vehicle controller ends the process shown in FIG. 26.

Also, when the vehicle M is a non-automated driving vehicle, the vehicle controller performs the processing of steps S301A and S303A shown in FIG. 26. Subsequently, the vehicle controller ends the process shown in FIG. 26. Subsequently, the convey of the vehicle M is entrusted to the vehicle conveying device 1 and the vehicle conveying device 1 conveys the vehicle M to the target conveyance point.

The management system AS of the second embodiment determines whether the vehicle M that has entered the parking lot PA is an automated driving vehicle or a non-automated driving vehicle, and the vehicle M is conveyed to the designated parking space PSD using the vehicle conveying device 1 when the vehicle M is a non-automated driving vehicle. Thus, even if the vehicle M is a non-automated driving vehicle, the vehicle M can be moved to the parking space using a function equivalent to the automated driving function. Therefore, when the vehicle that is conveyed by the conveyor device and the automated driving vehicle coexist, both can be moved appropriately. Moreover, when the vehicle M is an automated driving vehicle, the vehicle M is moved to the designated parking space PSD according to the control of the vehicle management server A200. Therefore, when the vehicle that is conveyed by the conveyor device and the automated driving vehicle coexist, both can be moved more appropriately.

Also, in the management system AS of the second embodiment, the designated parking space PSD is designated within the range of the first parking area PE1 near the entrance of the parking lot PA by the vehicle conveying device 1 for the non-automated driving vehicle and the designated parking space PSD is designated within the range of the second parking area PE2 that is not near the entrance of the parking lot PA for the automated driving vehicle. The vehicle conveying device 1 does not often have higher traveling performance than the automated driving vehicle and often has a slower moving speed and a shorter movable distance than the automated driving vehicle. In this regard, in the management system AS of the second embodiment, because the non-automated driving vehicle is conveyed to the first parking area PE1 where the traveling distance is short, it is possible to shorten the overall time period required to park many vehicles in the parking lot PA.

Also, the management system AS of the second embodiment designates the designated parking space PSD for the non-automated driving vehicle in order from the location closest to the entrance of the parking lot PA. Thus, a time period required for conveying the vehicle M can be shortened as a whole. For automated driving vehicles, the designated parking spaces PSD are designated in order from the location closest to the entrance of the parking lot PA. Thus, because the conveyance distance of the vehicle conveying device 1 can be limited, it is possible to prevent traffic congestion of the vehicle near the entrance of the parking lot PA.

Figure 27:
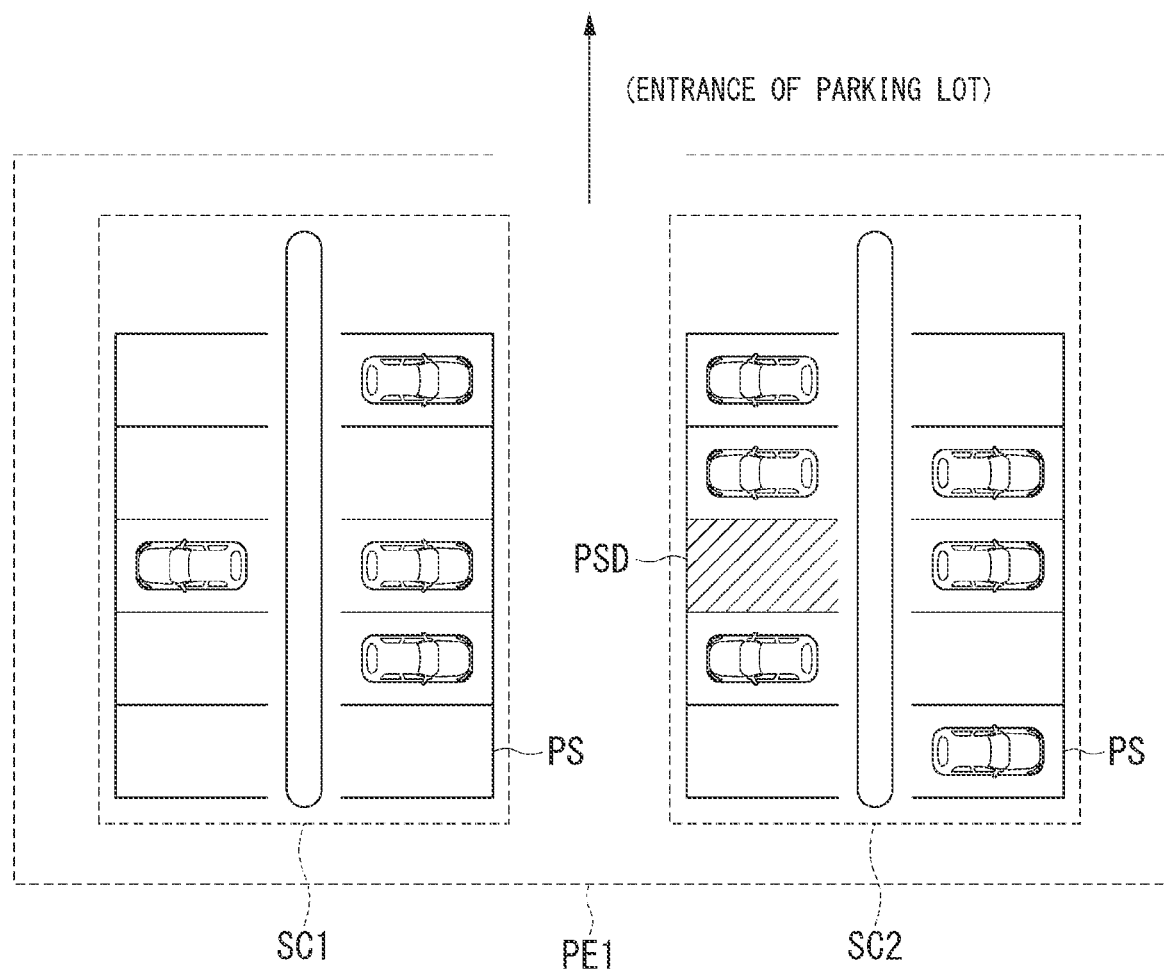
FIG. 27 is a diagram showing another example of the first parking area according to the second embodiment.

Although the designated parking space PSD is designated in order from the location closest to the entrance of the parking lot PA when the non-automated driving vehicle is conveyed by the vehicle conveying device 1 in the above-described second embodiment, the designated parking space PSD may be designated in another mode. For example, the traveling area of the vehicle conveying device 1 for conveying the vehicle M is limited to, for example, the first parking area PE1, the filling density of the first parking area PE1 after the vehicle M is parked may be calculated and the parking space PS having a higher filling density may be designated as a designated parking space PSD. The traveling area can be rephrased as an available parking area. The filling density may be, for example, a numerical value for each subdivided area when an available parking area is subdivided. For example, as shown in FIG. 27, when the first parking area PE1 is divided into a first space group SC1 and a second space group SC2 for a parking space PS for 10 vehicles, if two vehicles are parked in the first space group and four vehicles are parked in the second space group, the parking space PS of the second space group is designated as the designated parking space PSD where a new non-automated driving vehicle to be parked is parked. In this case, because the vehicles parked in the parking lot PA can be put together in a narrow range, the parking lot PA can be efficiently used, the parked vehicles can be easily visually recognized at once, and the crime prevention effect can be enhanced.

Although designated parking spaces PSD are designated in order from the location farthest from the entrance of the parking lot PA when the automated driving vehicle is moved to the designated parking space PSD in the above-described second embodiment, the designated parking space PSD may be designated in another mode. For example, a parking space that increases the vehicle parking/delivery efficiency may be designated as the designated parking space PSD. Also, high parking/delivery efficiency indicates that, for example, it does not take much time and effort when a vehicle is parked and delivered and indicates that, for example, a parking/delivery process is performed by guiding a vehicle to a location where an operation in which wheels turn a plurality of times are unnecessary. By increasing the parking/delivery efficiency, it is possible to make an operation from the parking to the delivery of the automated driving vehicle smoother. If the second parking area PE2 has a first parking space where the vehicle is moved linearly from the entrance of the parking lot PA and a second parking space where the vehicle is moved by repeating right and left turns several times, the first parking space may be designated as the designated parking space PSD even if the second parking space is located to be closer to the entrance of the parking lot PA. In this case, the efficiency of parking of the vehicle in the parking lot PA can be improved.

Although the entrance and the exit in the parking lot PA are provided as the same gate in the above-described second embodiment, the parking lot may be provided in a location where the entrance and the exit are different. In this case, it is preferable that the first parking area PE1 where the vehicle conveying device 1 conveys the non-automated driving vehicle be provided near a passage connecting the exit and the entrance of the parking lot PA and it is preferable that this passage be a passage having the shortest distance between the exit and the entrance of the parking lot PA. It is possible to efficiently perform a vehicle conveying process of the vehicle conveying device 1 by providing the first parking area near the passage connecting the exit and the entrance of the parking lot PA.

Although the vehicle M is allowed to travel autonomously when the vehicle M is an automated driving vehicle and the vehicle conveying device 1 moves the vehicle M to the designated parking space PSD when the vehicle M is a non-automated driving vehicle in the above-described second embodiment, another mode may be used. For example, the vehicle M may be automatically moved when the vehicle M is an automated driving vehicle and is a vehicle capable of traveling autonomously according to control of the vehicle management server A200 and the vehicle M may be moved to the designated parking space PSD by the vehicle conveying device 1 when the vehicle M is a vehicle incapable of traveling autonomously according to control of the vehicle management server A200, for example, when the vehicle M is a non-automated driving vehicle or a vehicle which is an automated driving vehicle but is not allowed to travel autonomously by the vehicle management server A200.

Third Embodiment

Next, a third embodiment will be described. For example, in the related art, technology for conveying a vehicle by causing a bogie to move under a lower part of the vehicle and causing the bogie to travel autonomously in a state in which each wheel of the vehicle has been lifted has been known (for example, Patent Literature 2). Also, technology for placing a vehicle on a pallet that can be moved in a forward-backward direction and a widthwise direction and moving the pallet on which the vehicle is placed to a floor where an available parking space is empty via an elevator in a multistory parking lot where the elevator is provided has been known (for example, Patent Literature 5). Also, technology for determining an electric vehicle whose power storage is required to be preferentially charged from among a plurality of electric vehicles on the basis of a state of charge (SOC) of a power storage of each of the plurality of electric vehicles capable of traveling in an unmanned mode in a state in which cargo is loaded has been known (for example, Patent Literature 6). However, in the related art, technology for efficiently conveying a vehicle using an autonomous traveling conveyor device in a multistory parking lot has not been studied.

Therefore, an objective of the third embodiment is to provide a management system, a management method, and a program capable of efficiently conveying a vehicle in a multistory parking lot.

[Overall Configuration]

Figure 28:
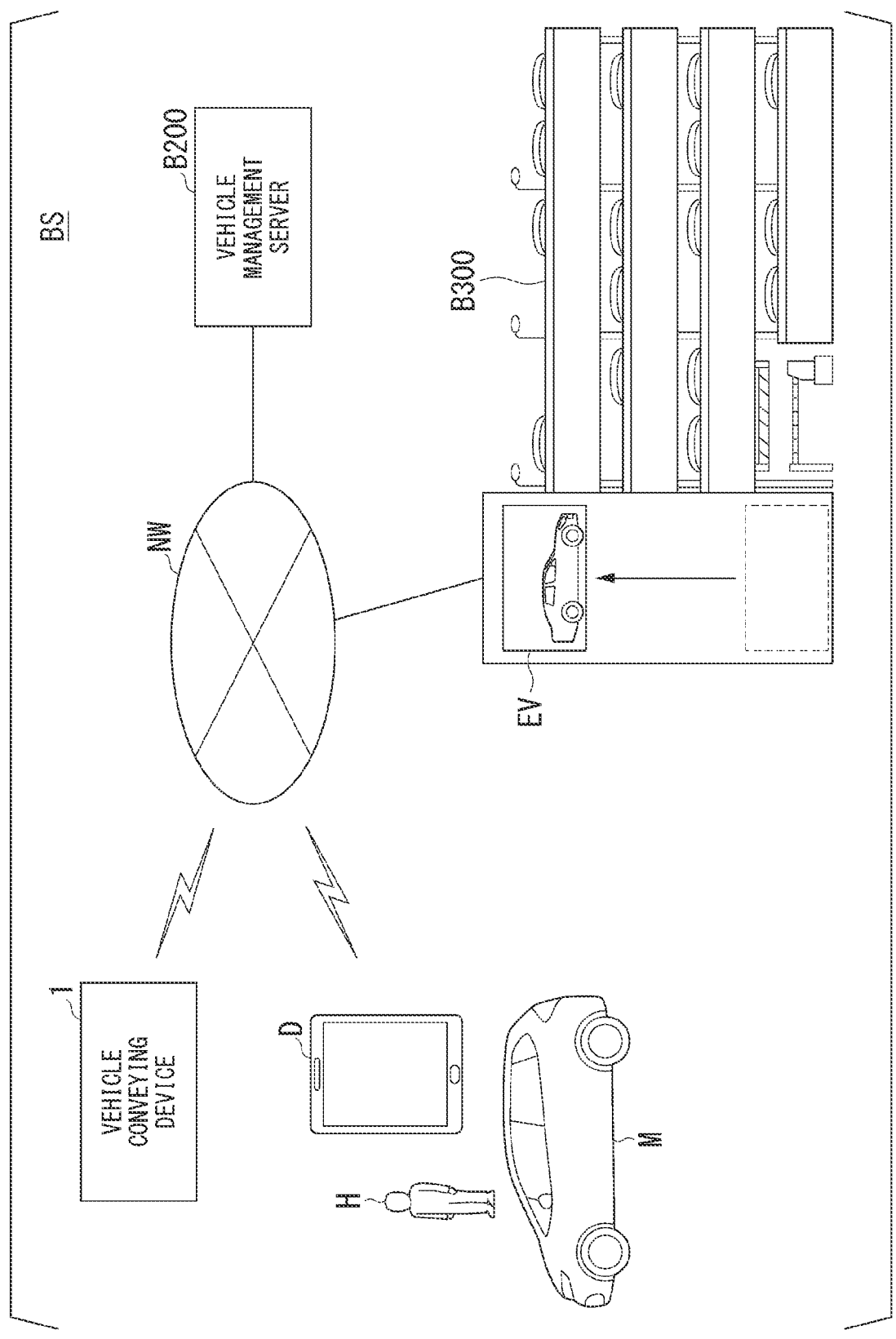
FIG. 28 is a configuration diagram of a management system according to a third embodiment.

FIG. 28 is a configuration diagram of a management system BS according to the third embodiment. The management system BS according to the third embodiment includes, for example, a vehicle conveying device 1, a vehicle management server B200, and a multistory parking lot B300. The management system BS is different from the management system S of the above-described first embodiment in that the vehicle management server B200 is provided instead of the vehicle management server 200 and the multistory parking lot B300 is further provided. Thus, differences will be mainly described below and the description of content that is the same as that of the first embodiment will be omitted here. Specifically, because a configuration of a vehicle conveying device 1, operations, structures, and functional configurations of a first conveyor robot 10A and a second conveyor robot 10B during conveyance of a vehicle M, and the like in the third embodiment are similar to those described with reference to FIGS. 2 to 7, the description thereof will be omitted here. The "vehicle management server 200" in the description of FIGS. 2 to 7 may be read as the "vehicle management server B200" in the third embodiment.

The vehicle management server B200 manages parking of the vehicle in the parking space and delivery of the vehicle from the parking space. The vehicle management server B200 causes the vehicle conveying device 1 to perform the parking process and the delivery process with respect to the vehicle M on the basis of a request from a user H (for example, an occupant of the vehicle M) who desires to park the vehicle M via a terminal device D. The terminal device D, the vehicle conveying device 1, the vehicle management server B200, and the elevator EV of the multistory parking lot B300 can communicate with each other via the network NW. The elevator EV is an elevator capable of ascending from a lower floor to an upper floor or descending from the upper floor to the lower floor.

The management system BS performs parking in the multistory parking lot B300 by conveying the vehicle M that is a conveyance target into a section where parking is possible (hereinafter referred to as a parking space) using the vehicle conveying device 1 and parking the vehicle M in the parking space in the multistory parking lot B300 where the elevator EV is provided. Hereinafter, this process will be referred to and described as a parking process. Also, the management system BS performs delivery from the multistory parking lot B300 by conveying the vehicle M parked in the parking space toward the exit of the multistory parking lot B300 using the vehicle conveying device 1 in the multistory parking lot B300. Hereinafter, this process will be referred to and described as a delivery process. Also, the management system BS may operate the elevator EV in a timely manner in the parking process or the delivery process and causes the vehicle M to move to another floor. The elevator EV can carry the vehicle M. In this way, the management system BS manages the parking of the vehicle M in the multistory parking lot B300. Also, the vehicle M is not limited to a specific vehicle and the management system BS can set any vehicle as the conveyance target.

The vehicle conveying device 1 according to the third embodiment may include, for example, a number of conveyor robots 10 capable of autonomously traveling according to the number of wheels of the vehicle M that is the conveyance target as one set. Specifically, two conveyor robots 10 are used as one set when the vehicle M that is the conveyance target is a four-wheeled vehicle, three conveyor robots 10 are used as one set when the vehicle M that is the conveyance target is a six-wheeled vehicle, and four conveyor robots 10 are used as one set when the vehicle M that is the conveyance target is an eight-wheeled vehicle. Hereinafter, it is assumed that the vehicle M that is the conveyance target is a four-wheeled vehicle as an example, one of the conveyor robots 10 in one set of conveyor robots 10 will be referred to and described as a "first conveyor robot 10A," and the other conveyor robot 10 will be referred to and described as a "second conveyor robot 10B."

At the time of conveyance, the first conveyor robot 10A moves under the vehicle M, lifts the front wheels of the vehicle M, and autonomously travels. The second conveyor robot 10B moves under the vehicle M, lifts the rear wheels of the vehicle M, and autonomously travels. The structures of the first conveyor robot 10A and the second conveyor robot 10B may be the same. One of the first conveyor robot 10A and the second conveyor robot 10B may be a master machine (a master system conveyor robot) and the other may be a slave machine (a slave system conveyor robot).

[Functional Configuration of Vehicle Management Server]

Figure 29:
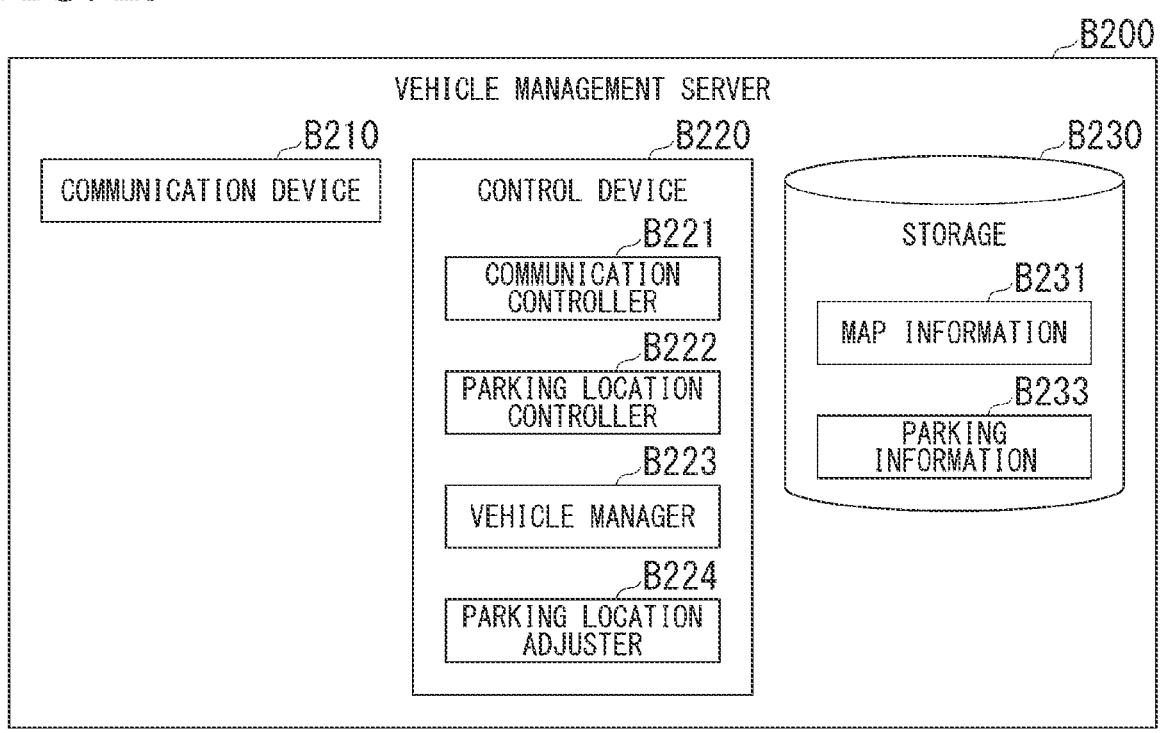
FIG. 29 is a diagram showing an example of a functional configuration of a vehicle management server according to the third embodiment.

Next, a functional configuration of the vehicle management server B200 will be described. FIG. 29 is a diagram showing an example of the functional configuration of the vehicle management server B200 according to the third embodiment. The vehicle management server B200 includes, for example, a communication device B210, a control device B220, and a storage B230. The communication device B210 includes a device for performing wireless communication with external communication devices and an antenna. The external communication devices are, for example, the vehicle conveying device 1, the terminal device D, and the like.

The control device B220 includes, for example, a communication controller B221, a parking location controller B222, a vehicle manager B223, and a parking location adjuster B224. The communication controller B221 acquires various types of information from the external communication devices or provides various types of information to the external communication devices via the communication device B210.

The parking location controller B222 determines a location of a parking space where the vehicle M is parked, i.e., a parking location, in the multistory parking lot B300 on the basis of a parking request transmitted by the terminal device D. The parking request includes information for identifying the vehicle M (for example, a vehicle ID issued in advance by the vehicle management server B200), license plate information of the vehicle M, vehicle type information of the vehicle M, and the like. The parking location controller B222 searches for an empty space where the vehicle M can be parked within the parking space with reference to the map information B231 and the parking information B233 stored in the storage B230. When the parking location controller B222 has found an empty space, the parking location controller B222 determines the empty space as the parking location. The parking location controller B222 controls the vehicle conveying device 1 so that the vehicle conveying device 1 conveys the vehicle M to the parking space.

The vehicle manager B223 associates various types of information about the vehicle (a vehicle ID, a license plate, and a vehicle type), a parking location, a parking start date and time, and a parking end date and time with each vehicle (for each vehicle ID) on the basis of information transmitted by the vehicle conveying device 1 and the terminal device D and causes the associated information to be stored as the parking information B233 in the storage B230.

The parking location adjuster B224 adjusts the parking location of the parked vehicle. For example, the parking location adjuster B224 controls the vehicle conveying device 1 so that a distance between the parked vehicles is shortened when an unnecessary empty space is generated between the parked vehicles due to an iterated process in which vehicles are parked and delivered. Thereby, it is possible to make more effective use of the finite parking space.

Each functional unit of the control device B220 is implemented by, for example, a hardware processor such as a CPU (computer) executing a program (software). Also, some or all of the above components may be implemented by hardware (including a circuit; circuitry) such as an LSI circuit, an ASIC, an FPGA, or a GPU or may be implemented by software and hardware in cooperation. The program may be prestored in a storage device (a storage device including a non-transitory storage medium) such as an HDD or a flash memory of the vehicle management server B200 or may be stored in a removable storage medium such as a DVD or a CD-ROM and installed in the HDD or the flash memory of the vehicle management server B200 when the storage medium (the non-transitory storage medium) is mounted in a drive device.

The storage B230 is implemented by, for example, an HDD, a flash memory, an EEPROM, a ROM, a RAM, or the like. For example, map information B231, parking information B233, and the like are stored in the storage B230.

The map information B231 is the same as the map information 142 stored in the storage 140 of the conveyor robot 10 and includes map information of each floor of the multistory parking lot B300 where the conveyor robot 10 can travel autonomously.

The parking information B233 is, for example, information in which information indicating whether the parking space is empty or the vehicle is already parked is associated with each parking space formed on each floor of the multistory parking lot B300.

[Parking Process]

Figure 30:
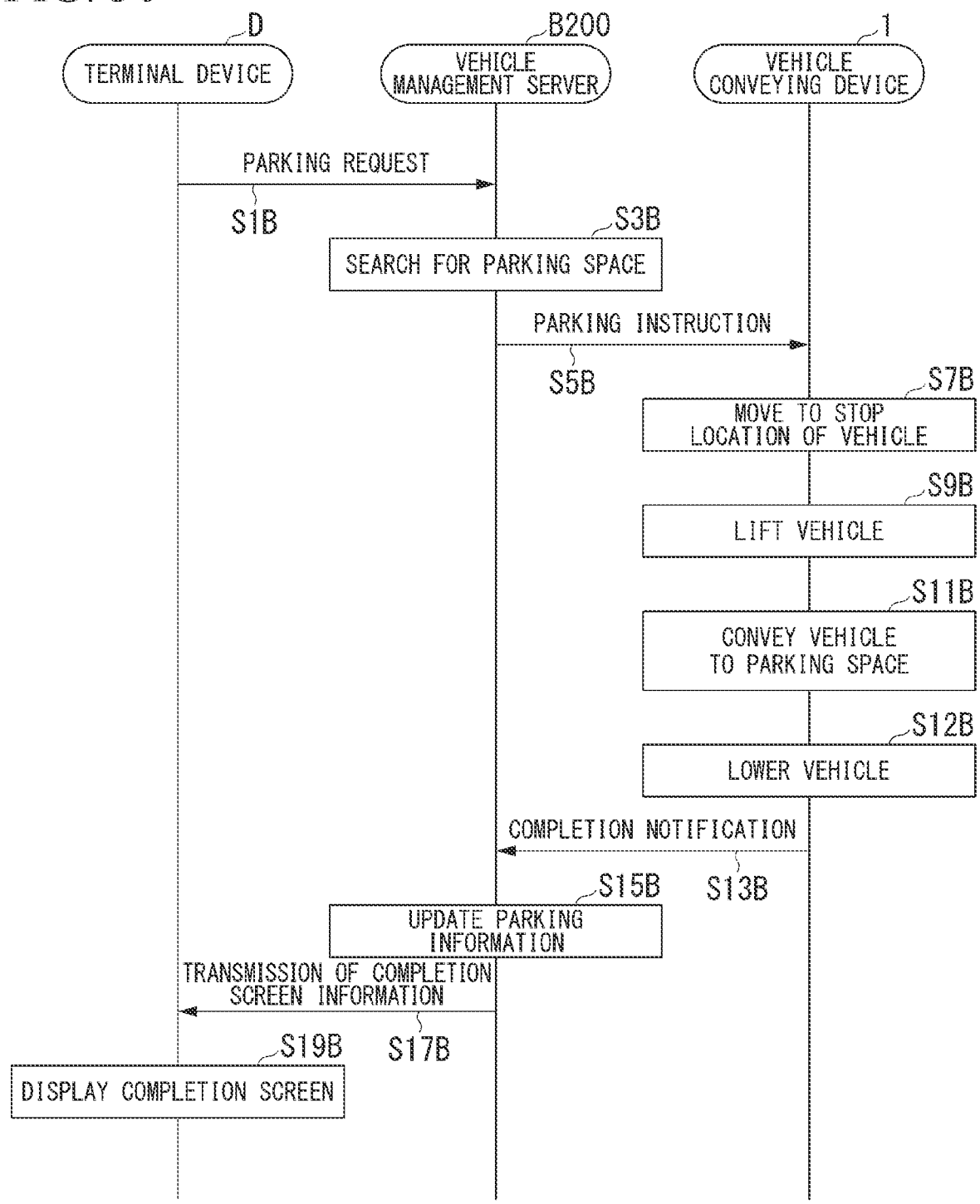
FIG. 30 is a sequence diagram showing an example of a parking process of the management system according to the third embodiment.
Figure 31:
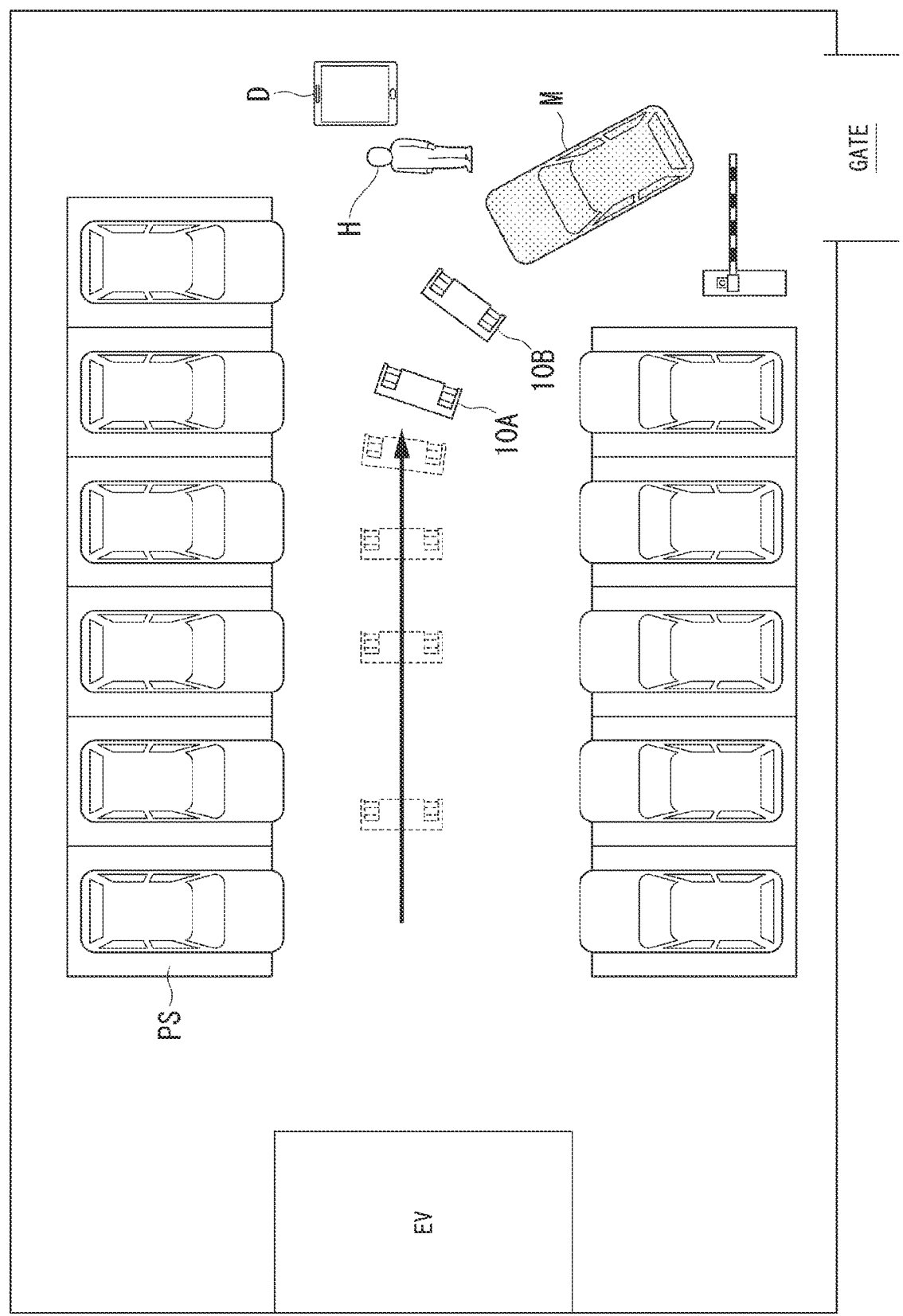
FIG. 31 is a diagram schematically showing a state in which a vehicle is parked in a multistory parking lot according to the third embodiment.
Figure 32:
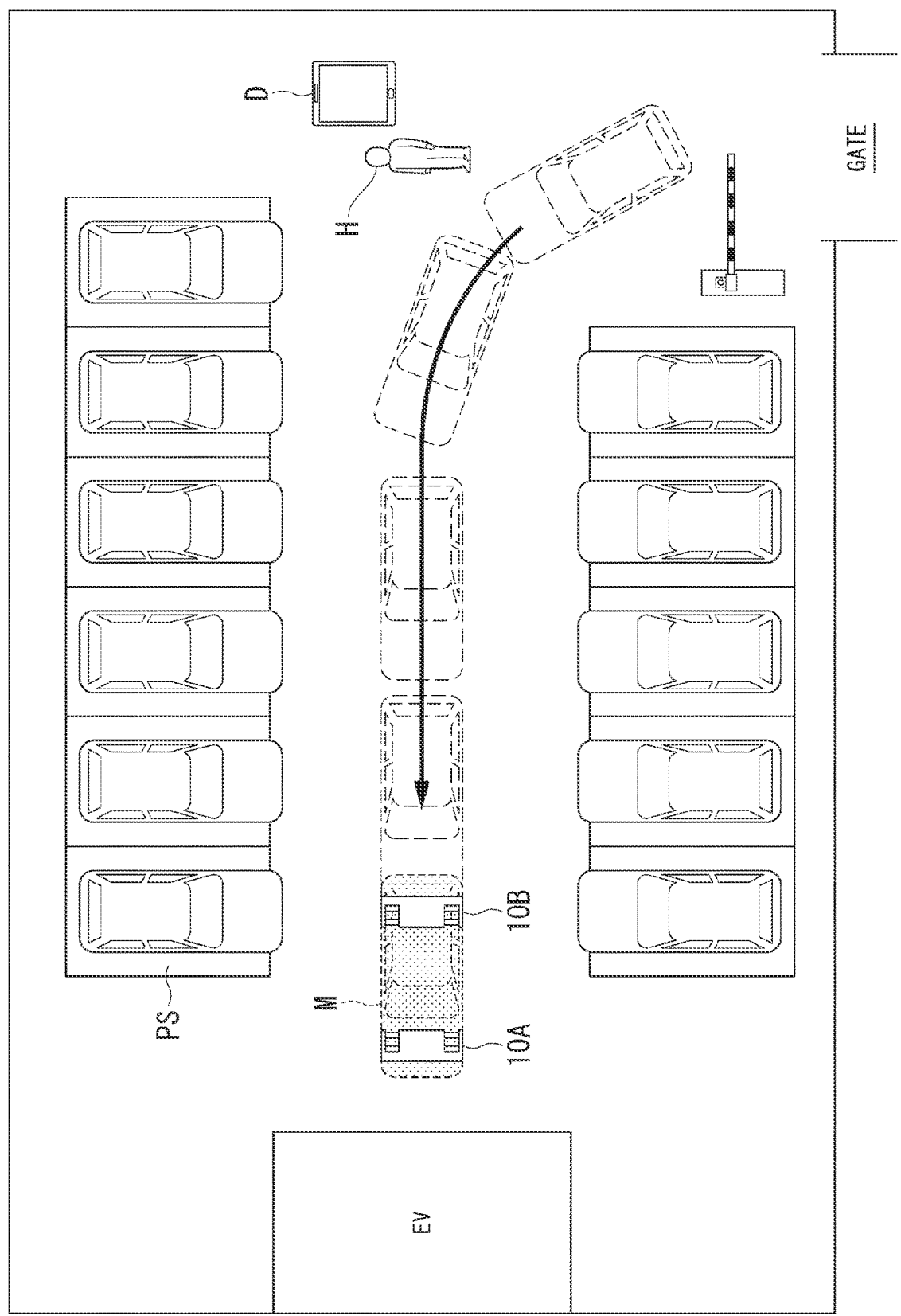
FIG. 32 is a diagram schematically showing a state in which a vehicle is parked in the multistory parking lot according to the third embodiment.
Figure 33:
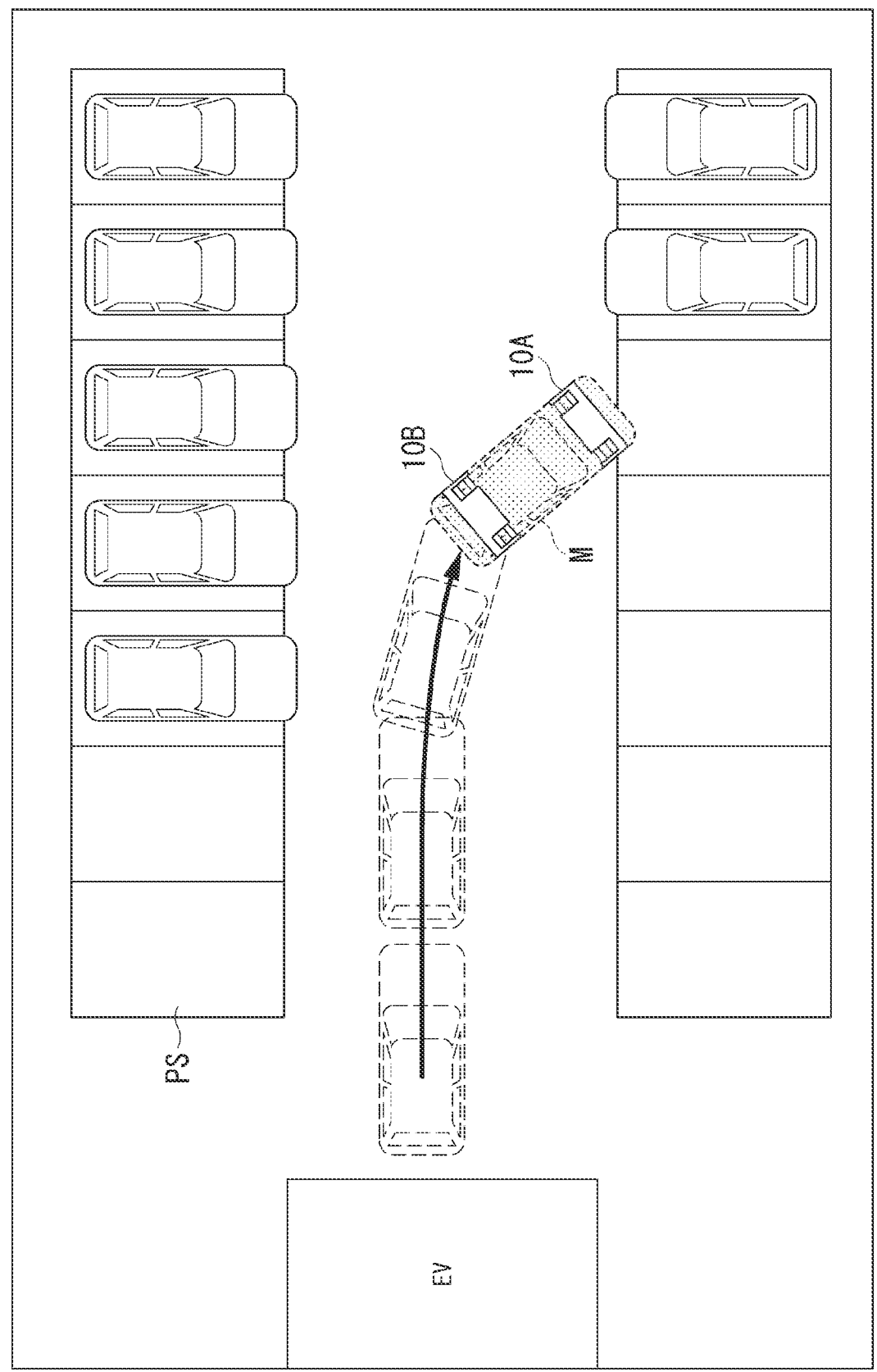
FIG. 33 is a diagram schematically showing a state in which a vehicle is parked in the multistory parking lot according to the third embodiment.

Next, a series of flows of a parking process of the management system BS will be described. FIG. 30 is a sequence diagram showing an example of the parking process of the management system BS according to the third embodiment. FIGS. 31 to 33 are diagrams schematically showing a state in which the vehicle M is parked in the multistory parking lot B300.

As shown in FIG. 31, first, when the user H who desires parking causes the vehicle M to enter the multistory parking lot B300 from the gate, the vehicle M is stopped at any location. The user H operates the terminal device D and requests the vehicle management server B200 to perform a parking process (step S1B). Also, the user H may request the parking process at a timing before the vehicle M is stopped in the multistory parking lot B300 (for example, a timing when he or she gets into the vehicle M at home or the like).

For example, the user H makes the parking request by operating the terminal device D to access a website to be referred to using a browser or an application page to be referred to using an application program, and inputting prescribed information. The prescribed information includes information for identifying the vehicle M (for example, the vehicle ID), license plate information of the vehicle M, vehicle type information of the vehicle M, and the like. The terminal device D transmits a request for the parking process to the vehicle management server B200 on the basis of the operation of the user H. The parking request may include location information, identification information, and/or the like of the terminal device D.

Subsequently, when the communication device B210 receives the request for the parking process from the terminal device D, the parking location controller B222 of the vehicle management server B200 searches for an empty parking space PS where the vehicle M can be parked in the multistory parking lot B300 with reference to the map information B231 and the parking information B233 stored in the storage B230 (step S3B).

In the example of FIG. 31, the vehicle is parked in any parking space PS on the floor where the vehicle M is stopped, i.e., the floor where the gate is provided, and there is no empty parking space PS where the vehicle M that is the conveyance target can be parked. In this case, the parking location controller B222 determines whether or not there is an empty parking space PS on another floor. For example, when there is an empty parking space PS on another floor, the empty parking space PS is determined to be a parking location of the vehicle M that is the conveyance target.

Also, as shown in FIG. 31, the parking space PS may be an area whose size is predetermined by markings or the size of the area may dynamically change with a size (a total length or a width) of a vehicle that is a parking target or an empty state of the parking space.

Subsequently, when the parking location controller B222 determines the parking location (the parking space PS) of the vehicle M that is the conveyance target, the vehicle manager B223 transmits a parking instruction to the vehicle conveying device 1 of the floor where the vehicle M that is the conveyance target is currently stopped (step S5B). This parking instruction includes various types of information such as a location of the empty parking space PS where the vehicle M that is the target of the parking process can be parked, the number of a floor on which the empty parking space PS is present, license plate information of the vehicle M, and vehicle type information of the vehicle M. When the parking request transmitted from the terminal device D includes the location information of the terminal device D, the parking instruction transmitted to the vehicle conveying device 1 may further include the location information of the terminal device D as the location information of the vehicle M at present.

Subsequently, when the communication device 40 receives the parking instruction from the vehicle management server B200, the conveyance control device 100 of the vehicle conveying device 1 controls the drive mechanism 16 so that the drive mechanism 16 moves to a stop location of the vehicle M located on the same floor (step S7B).

For example, one conveyor robot 10 whose state is more suitable than that of the other conveyor robot 10 between the two first conveyor robots 10A and the second conveyor robot 10B provided in the vehicle conveying device 1 is used as a master machine and the other conveyor robot 10 is used as a slave machine.

The "state" of the conveyor robot 10 includes, for example, a state of charge (SOC) of a secondary battery capable of supplying electric power to each component provided in the conveyor robot 10, a traveling distance of the conveyor robot 10, the number of times the conveyor robot 10 has lifted the vehicle M, the weight of the vehicle M conveyed by the conveyor robot 10, and the like. Thus, the suitable state may indicate that the SOC of the secondary battery is a SOC whose deterioration progresses slowly, the traveling distance is short, the number of times the vehicle M is lifted is small, the weight of the lifted vehicle M is small, and the like. That is, the conveyor robot 10 in a suitable state has little physical deterioration and maintains high quality and performance.

Here, as an example, the first conveyor robot 10A is used as a master machine and the second conveyor robot 10B is used as a slave machine. The traveling controller 120 of the first conveyor robot 10A that is the master machine determines an operation quantity (for example, a torque amount of a motor or the like) of a traveling motor 17 or a drive-side decelerator 18 included in its own drive mechanism 16 and determines an operation quantity of a traveling motor 17 or a drive-side decelerator 18 included in a drive mechanism 16 of the second conveyor robot 10B that is the slave machine on the basis of the parking instruction.

The traveling controller 120 on the master machine side controls the drive mechanism 16 with the determined operation quantity. Also, the traveling controller 120 of the master machine transmits information indicating the operation quantity of the drive mechanism 16 on the slave machine side to the second conveyor robot 10B that is the slave machine using short-range communication of Wi-Fi or Bluetooth (registered trademark that will be omitted hereinafter) or the like. In response to this, the traveling controller 120 on the slave machine side controls the drive mechanism 16 with the operation quantity determined by the master machine. Thereby, as shown in FIG. 31, the first conveyor robot 10A and the second conveyor robot 10B move to the vehicle M in cooperation with each other. The first conveyor robot 10A and the second conveyor robot 10B may appropriately correct the operation quantity of the drive mechanism 16 on the basis of the image of the camera 32 and the detection result of the distance measuring sensor 34. In this way, it is possible to reduce an amount of calculation or shorten a calculation time period even if both processors of the first conveyor robot 10A and the second conveyor robot 10B perform calculation with movement when the master machine remotely controls the slave machine and these two conveyor robots 10 move in cooperation with each other.

When the first conveyor robot 10A and the second conveyor robot 10B of the vehicle conveying device 1 that have received the parking instruction move to the location where the vehicle M that is the conveyance target is currently stopped, the first conveyor robot 10A and the second conveyor robot 10B move under the vehicle M. An arm controller 130 of each conveyor robot 10 controls a cargo handling mechanism 20 so that the cargo handling mechanism 20 lifts the vehicle M (step S9B).

Subsequently, the traveling controller 120 of each conveyor robot 10 controls the drive mechanism 16 so that the drive mechanism 16 conveys the vehicle M lifted by the cargo handling mechanism 20 to an empty parking space PS on a floor indicated in the parking instruction (step S11B). Subsequently, the arm controller 130 controls the cargo handling mechanism 20 so that the cargo handling mechanism 20 lowers the vehicle M to the parking space PS (step S12B).

For example, as shown in FIG. 32, when there is no empty parking space PS on the current floor and there is an empty parking space PS on another floor, the parking instruction includes a number of a floor where there is an empty parking space PS. In this case, the first conveyor robot 10A and the second conveyor robot 10B conveys the vehicle M to the elevator EV while lifting the vehicle M.

On the other hand, the parking location controller B222 of the vehicle management server B200 remotely controls the elevator EV via the communication device 210 and causes the elevator EV to move to the floor where the vehicle M is currently stopped.

When the elevator EV arrives at the floor where the vehicle M is currently stopped, the first conveyor robot 10A and the second conveyor robot 10B carry the vehicle M into the elevator EV. At this time, the first conveyor robot 10A and the second conveyor robot 10B may move to another floor where there is an empty parking space PS while getting on the elevator EV together with the vehicle M or may exit the elevator EV after the vehicle M is carried into the elevator EV and stay on the current floor. When the vehicle M is conveyed using the elevator EV, the vehicle management server B200 may determine whether or not to cause the vehicle M to move together with the first conveyor robot 10A and the second conveyor robot 10B.

Next, the parking location controller B222 of the vehicle management server B200 remotely controls the elevator EV via the communication device B210 and causes the vehicle M to move to another floor where there is an empty parking space PS.

As shown in FIG. 33, when the first conveyor robot 10A and the second conveyor robot 10B are moving on the elevator EV together with the vehicle M, the vehicle M is carried outside of the elevator EV if the elevator EV arrives at another floor. The first conveyor robot 10A and the second conveyor robot 10B cause the vehicle M to move to the empty parking space PS and cause the vehicle M to park in the parking space PS.

When the first conveyor robot 10A and the second conveyor robot 10B are not on the elevator EV, the first conveyor robot 10A and the second conveyor robot 10B located on another floor may move under the vehicle M within the elevator EV that has arrived at the floor, cause the vehicle M to move to an empty parking space PS while lifting the vehicle M, and cause the vehicle M to park in the parking space PS.

When the vehicle M is parked in the empty parking space PS, the communicator 110 of the first conveyor robot 10A that is the master machine transmits a completion notification indicating that the parking process of the vehicle M is completed to the vehicle management server B200 via the communication device 210 (step S13B).

Subsequently, the vehicle manager B223 of the vehicle management server B200 updates the parking information B233 by associating information indicating that the vehicle is already parked with the parking space PS where the vehicle M is newly parked (step S15B). The vehicle manager B223 transmits information for displaying a completion screen indicating that the parking process is completed to the terminal device D (step S17B). In response to this, the terminal device D displays the completion screen on a display (step S19B). Thereby, the parking process ends. When the completion screen is displayed on the terminal device D, the vehicle manager B223 may also cause the terminal device D to display a parking time point (a time point when a process of counting the parking time period starts).

[Delivery Process]

Figure 34:
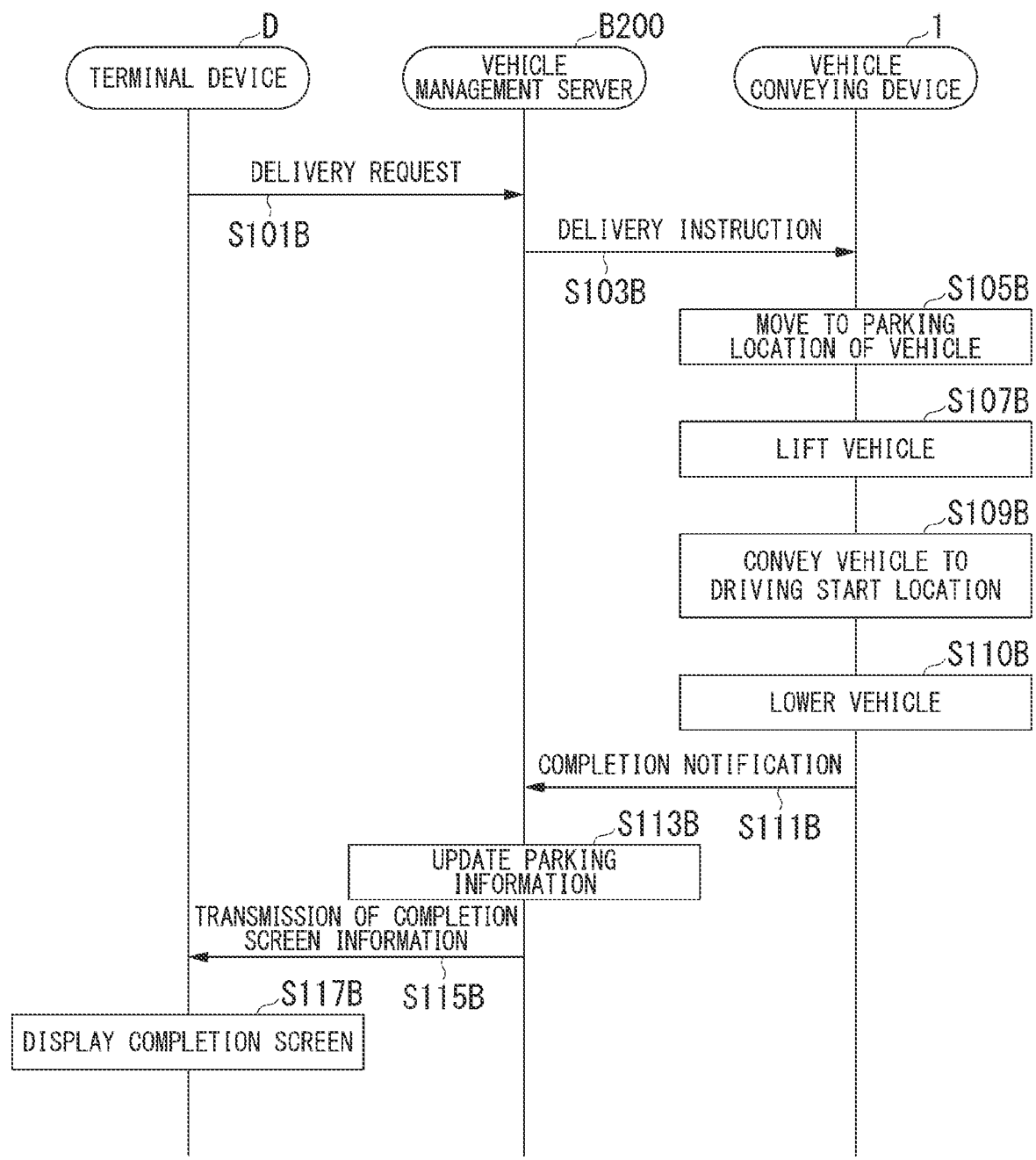
FIG. 34 is a sequence diagram showing an example of a delivery process of the management system according to the third embodiment.

Next, a flow of a delivery process of the management system S will be described. FIG. 34 is a sequence diagram showing an example of the delivery process of the management system BS according to the third embodiment.

The user H who desires delivery operates the terminal device D and requests the vehicle management server B200 to perform a delivery process (step S101B).

For example, as in the case when the parking process is requested, the user H makes a delivery request by operating the terminal device D to access a website to be referred to using a browser or an application page to be referred to using an application program and inputting a vehicle ID and license plate information as prescribed information. The terminal device D transmits a request for the delivery process to the vehicle management server B200 on the basis of the operation of the user H.

Subsequently, when the communication device B210 receives the request for the delivery process from the terminal device D, the vehicle manager B223 of the vehicle management server B200 issues a delivery instruction to the vehicle conveying device 1 on the floor where the vehicle M that is the conveyance target is currently parked (step S103B). This delivery instruction includes various types of information such as a location of the parking space PS where the vehicle M that is the target of the delivery process is parked, a number of a floor where there is a parking space PS, license plate information of the vehicle M, and vehicle type information of the vehicle M.

Subsequently, when the communication device 40 receives the delivery instruction from the vehicle management server B200, the conveyance control device 100 of the vehicle conveying device 1 controls the drive mechanism 16 so that the drive mechanism 16 moves to the parking location of the vehicle M located on the same floor (step S105B).

When the first conveyor robot 10A and the second conveyor robot 10B of the vehicle conveying device 1 that have received the delivery instruction move to the location where the vehicle M that is the conveyance target is currently parked, the first conveyor robot 10A and the second conveyor robot 10B move under the vehicle M. The arm controller 130 of each conveyor robot 10 controls the cargo handling mechanism 20 so that the cargo handling mechanism 20 lifts the vehicle M (step S107B).

Subsequently, the traveling controller 120 of each conveyor robot 10 controls the drive mechanism 16 so that the drive mechanism 16 conveys the vehicle M lifted by the cargo handling mechanism 20 to a location where the user H can easily start the vehicle M according to manual driving (hereinafter referred to as a driving start location) (step S109B). The driving start location may be, for example, near the gate of the multistory parking lot B300. Subsequently, the arm controller 130 controls the cargo handling mechanism 20 so that the cargo handling mechanism 20 lowers the vehicle M to the driving start location (step S110B).

For example, when a floor where the vehicle M is parked is different from a floor where a driving start location is present, the first conveyor robot 10A and the second conveyor robot 10B may convey the vehicle M to the elevator EV while lifting the vehicle M and cause the vehicle M to move from the floor where the vehicle M is parked to the floor where the driving start location is present as in the parking process.

When the vehicle M is conveyed to the driving start location and the vehicle M is lowered to the driving start location, the communicator 110 of the first conveyor robot 10A that is the master machine transmits a completion notification indicating that the delivery process of the vehicle M is completed to the vehicle management server B200 via the communication device B210 (step S111B).

Subsequently, the vehicle manager B223 of the vehicle management server B200 updates the parking information B233 by associating information indicating an empty state with a parking space PS that is empty due to the movement of the vehicle M (step S113B). The vehicle manager B223 transmits information for displaying the completion screen indicating that the delivery process is completed to the terminal device D (step S115B). In response to this, the terminal device D displays the completion screen on the display (step S117B). Thereby, the delivery process ends. When the terminal device D is allowed to display the completion screen, the vehicle manager B223 may also cause the terminal device D to display a delivery time point (a time point when a process of counting the parking time period ends).

[Flow of Process of Vehicle Management Server]

Figure 35:
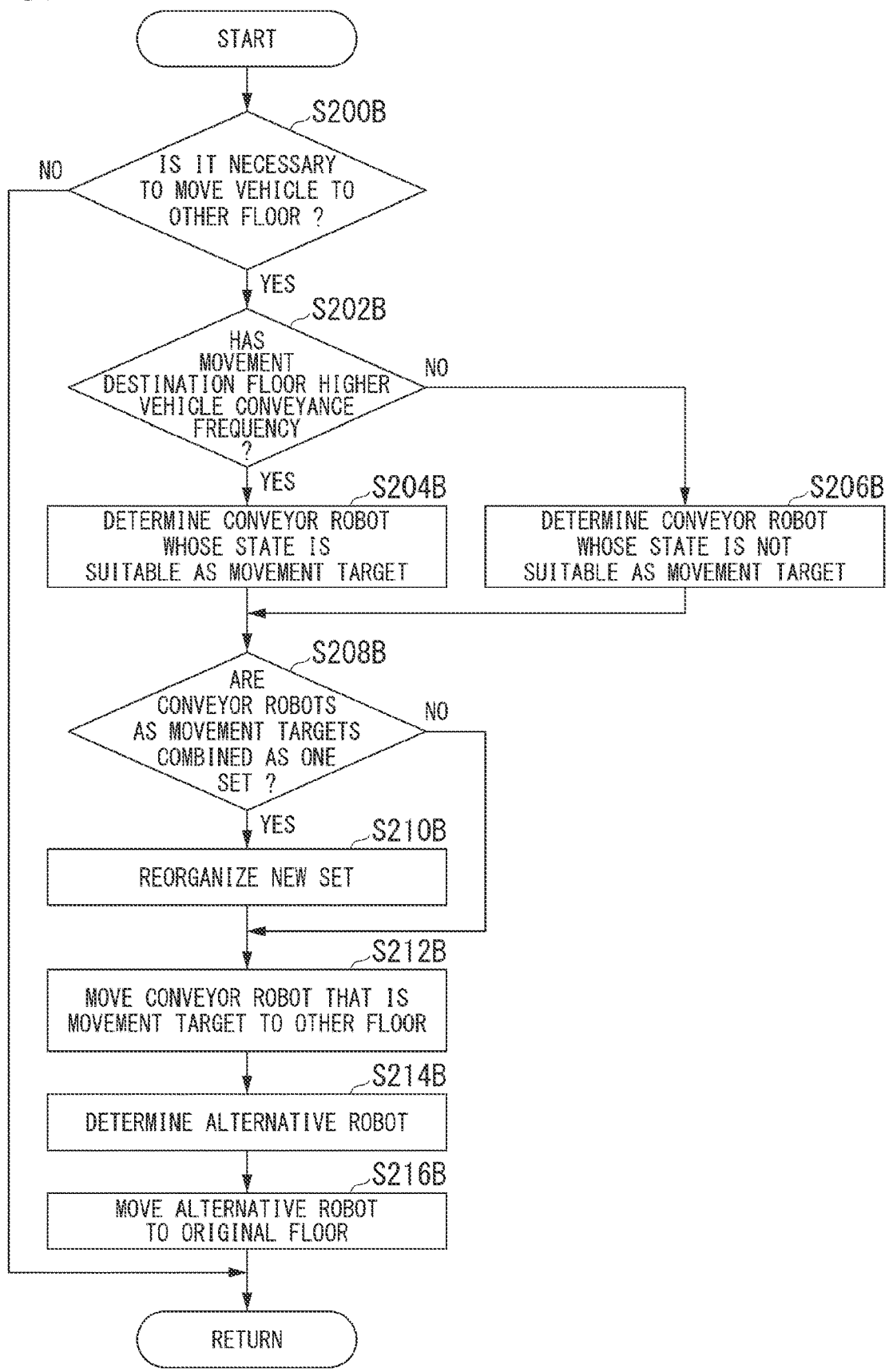
FIG. 35 is a flowchart showing a flow of a series of processing steps of a vehicle management server according to the third embodiment.

Hereinafter, a flow of a series of processing steps of the vehicle management server B200 according to the third embodiment will be described according to a flowchart. FIG. 35 is a flowchart showing a flow of a series of processing steps of the vehicle management server B200 according to the third embodiment. The process of the present flowchart may be iterated, for example, at prescribed intervals.

First, the vehicle manager B223 determines whether or not it is necessary to move the vehicle M that is the conveyance target to another floor using the elevator EV during the parking process and the delivery process (step S200B).

For example, in the parking process, the vehicle manager B223 determines that it is necessary to move the vehicle M that is the conveyance target to another floor when a parking space PS where the vehicle M can be parked is located on the other floor different from a floor where the vehicle M is currently located (hereinafter referred to as a current floor) and determines that it is unnecessary to move the vehicle M that is the conveyance target to another floor when a parking space PS where the vehicle M can be parked is located on the current floor.

Also, for example, in the delivery process, the vehicle manager B223 determines that it is necessary to move the vehicle M that is the conveyance target to another floor when there is a driving start location on another floor different from the current floor and determines that it is unnecessary to move the vehicle M that is the conveyance target to another floor when there is a driving start location on the current floor.

When it is determined that it is necessary to move the vehicle M that is the conveyance target to another floor, the vehicle manager B223 determines whether or not a movement destination floor has a higher vehicle conveyance frequency than the current floor (step S202B).

For example, in the multistory parking lot B300, the vehicle M passes through the lowest floor on which the gate is provided regardless of whether the vehicle M is parked on the upper floor or is delivered from the upper floor. Thus, when the lowermost floor on which the gate is provided is compared with the upper floor, the lowermost floor on which the gate is provided is likely to have a higher vehicle conveyance frequency than the upper floor.

Accordingly, for example, the vehicle manager B223 may determine that a movement destination floor has a higher vehicle conveyance frequency than the current floor when the vehicle M is already parked on the upper floor of the multistory parking lot B300 and the vehicle M is required to be moved from the upper floor to the lowest floor on which the gate is provided, i.e., when the current floor is the upper floor and the movement destination floor is the lowest floor, and determine that the movement destination floor has a lower vehicle conveyance frequency than the current floor otherwise.

Also, when the multistory parking lot B300 is an underground parking lot, the floor on which the gate is provided becomes the uppermost floor of the multistory parking lot B300. At this time, for example, when the vehicle M is already parked on the lower floor of the multistory parking lot B300 that is the underground parking lot and the vehicle M is moved from the lower floor to the uppermost floor on which a gate is provided, the current floor becomes the lower floor and the movement destination floor becomes the uppermost floor. In this case, the vehicle manager B223 determines that the vehicle is conveyed more frequently on the movement destination floor than on the current floor. On the other hand, when the vehicle M is allowed to move from the uppermost floor so that the vehicle M is parked in the multistory parking lot B300 that is the underground parking lot, the current floor becomes the uppermost floor and the movement destination floor becomes the lower floor. In this case, the vehicle manager B223 determines that the movement destination floor has a lower vehicle conveyance frequency than the current floor.

When it is determined that the movement destination floor has a higher vehicle conveyance frequency than the current floor, the vehicle manager B223 determines two conveyor robots 10 whose states are more suitable than those of the other conveyor robots 10 among the plurality of conveyor robots 10 located on the current floor as targets which are moved together with the vehicle M via the elevator EV (step S204B).

On the other hand, when it is determined that the movement destination floor has a lower vehicle conveyance frequency than the current floor, the vehicle manager B223 determines two conveyor robots 10 whose states are not more suitable than those of the other conveyor robots 10 among the plurality of conveyor robots 10 located on the current floor as targets which are moved together with the vehicle M via the elevator EV (step S206B).

Also, when the vehicle M that is the conveyance target is a six-wheeled vehicle instead of a four-wheeled vehicle, for example, the vehicle manager B223 may determine three conveyor robots 10 as movement targets. That is, the vehicle manager B223 may determine a number of conveyor robots 10 according to the number of wheels of the vehicle M that is the conveyance target as the movement targets.

Subsequently, the vehicle manager B223 determines whether or not a plurality of conveyor robots 10 determined to be the movement targets are conveyor robots 10 that are already combined as one set (step S208B).

The vehicle manager B223 reorganizes a new set when the plurality of conveyor robots 10 determined to be the movement targets are a part of each of a plurality of existing sets different from each other (step S210B). Thereby, the process of the present flowchart ends.

Figure 36:
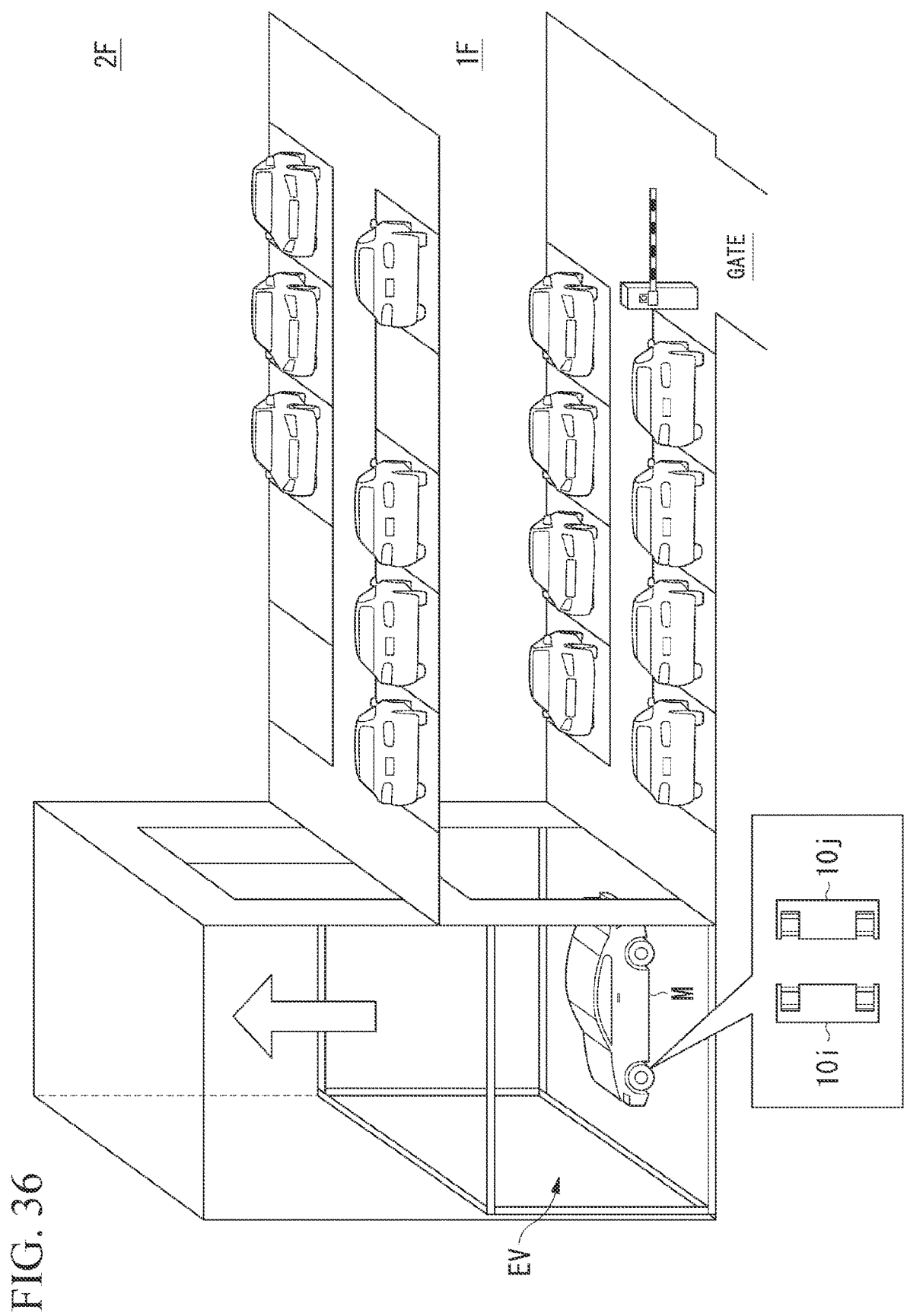
FIG. 36 is a diagram schematically showing a scene in which a vehicle that is a conveyance target is moved to another floor using an elevator according to the third embodiment.

FIG. 36 is a diagram schematically showing a scene in which the vehicle M that is the conveyance target is moved to another floor using the elevator EV. In the example of FIG. 36, the current floor is a lowest first floor (1F or a first floor) on which a gate is provided and the movement destination floor is a second floor (2F). In this case, the vehicle manager B223 determines two conveyor robots 10i and 10j whose states are not more suitable than those of the other conveyor robots 10 as movement targets from among the plurality of conveyor robots 10 located on the first floor.

Figure 37:
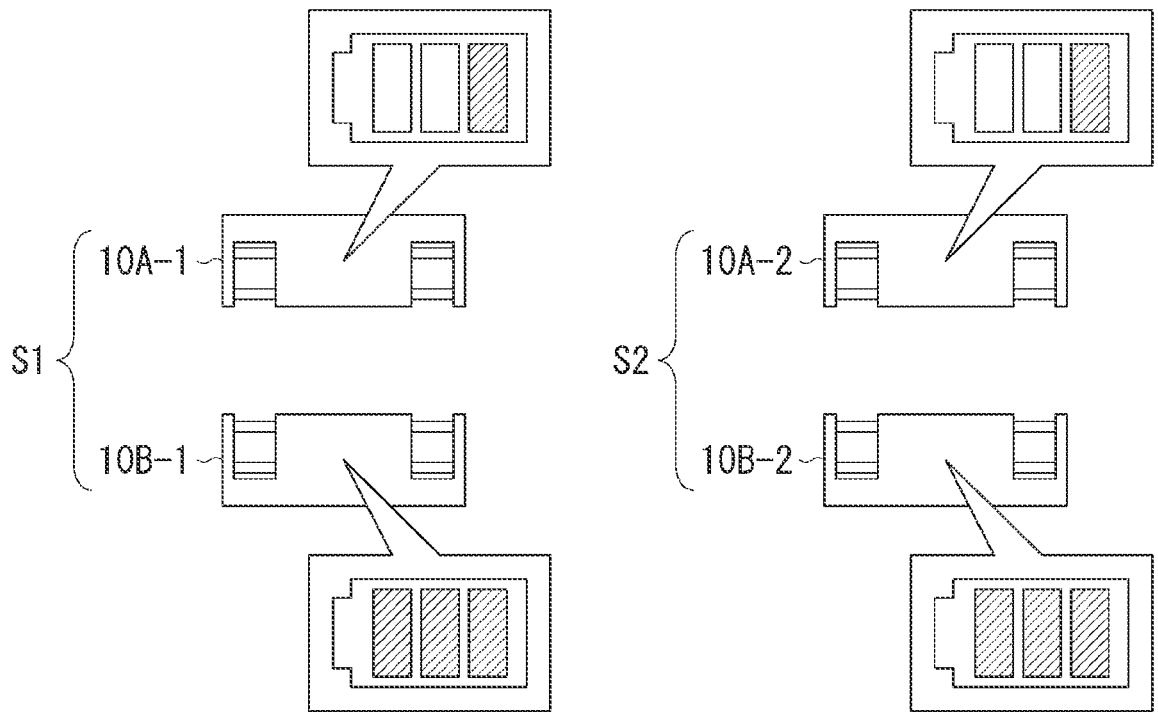
FIG. 37 is a diagram for describing a method of reorganizing a set according to the third embodiment.
Figure 38:
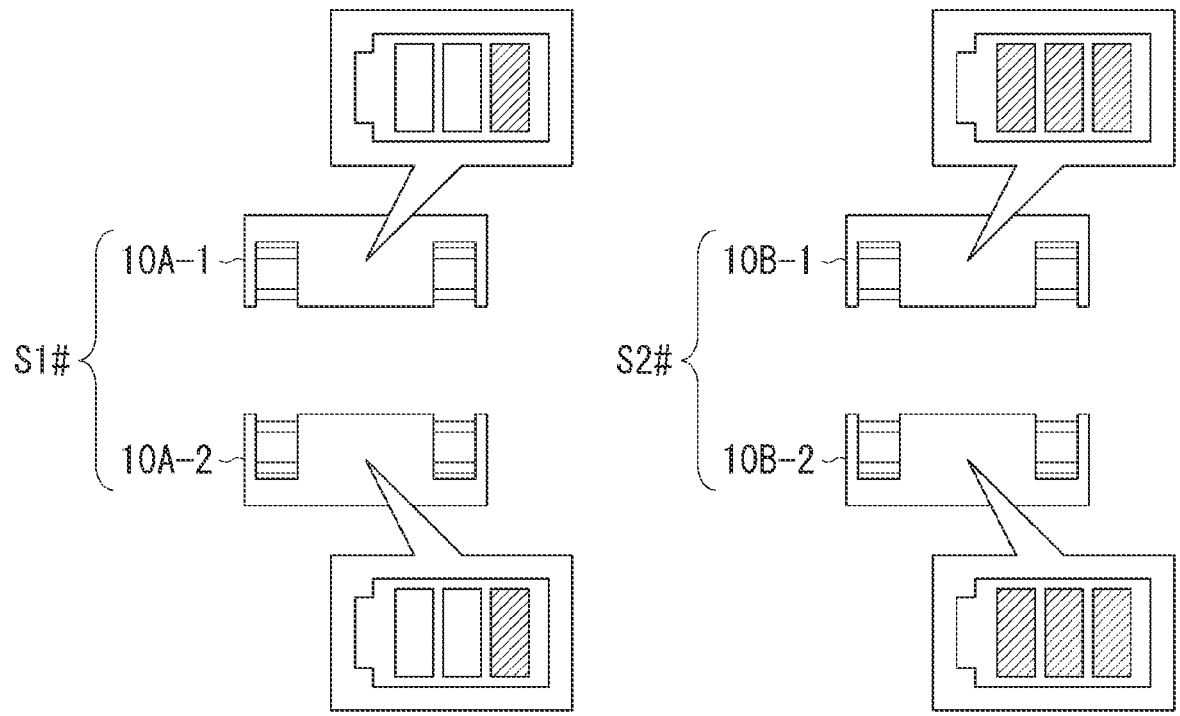
FIG. 38 is a diagram for describing a method of reorganizing a set according to the third embodiment.

FIGS. 37 and 38 are diagrams for describing a method of reorganizing a set. For example, it is assumed that there are a first set S1 in which a first conveyor robot 10A-1 and a second conveyor robot 10B-1 are combined and a second set S2 in which a first conveyor robot 10A-2 and a second conveyor robot 10B-2 are combined on the current floor. In this case, the vehicle manager B223 determines two conveyor robots (an example of a third conveyor device and a fourth conveyor device) 10 whose states are not more suitable than the other conveyor robots 10 among the four conveyor robots 10 as a new set for the conveyance target.

In the example of FIG. 37, the first conveyor robot 10A-1 included in the first set S1 has a secondary battery whose SOC is about 30[%] and the second conveyor robot 10B-1 included in the same first set S1 has a secondary battery whose SOC is about 100 [%]. Also, the first conveyor robot 10A-2 included in the second set S2 has a secondary battery whose SOC is about 30[%] and the second conveyor robot 10B-2 included in the same second set S2 has a secondary battery whose SOC is about 100 [%]. Accordingly, for example, the vehicle manager B223 determines the first conveyor robot 10A-1 included in the first set S1 and the first conveyor robot 10A-2 included in the second set S2 as the conveyor robots 10 whose states are not suitable for the conveyance targets.

Because one of the two conveyor robots 10 included in the first set S1 and one of the two conveyor robots 10 included in the second set S2 have been determined to be the conveyance targets, the vehicle manager B223 reorganizes a new set. For example, as shown in FIG. 38, the vehicle manager B223 uses the first conveyor robot 10A-1 and the first conveyor robot 10A-2 determined to be the conveyance targets as a new first set S1 # and uses the second conveyor robot 10B-1 and the second conveyor robot 10B-2 that have not been determined to be the conveyance targets as a new second set S2 #.

As described above, the first conveyor robot 10A between the two first conveyor robots 10A and the second conveyor robot 10B is a master machine and the second conveyor robot 10B is a slave machine. Thus, the new first set S1 # is a combination of master machines and the new second set S2 # is a combination of slave machines. Therefore, the vehicle manager 223 performs a change process of setting one conveyor robot 10 whose state is not more suitable than that of the other conveyor robot 10 between the first conveyor robot 10A-1 and the first conveyor robot 10A-2, both of which are master machines, as the slave machine in the first set S1 # and performs a change process of setting one conveyor robot 10 whose state is more suitable than that of the other conveyor robot 10 between the second conveyor robot 10B-1 and the second conveyor robot 10B-2, both of which are slave machines, as the master machine in the second set S2 #. Thereby, because it is possible to cause one of the two conveyor robots 10 to perform calculations associated with control of the other conveyor robot, an amount of calculation can be reduced or a calculation time period can be shortened.

The description returns to the flowchart of FIG. 35. Next, the parking location controller B222 moves the conveyor robot 10 determined to be a movement target to a movement destination floor using the elevator EV by transmitting a parking instruction or a delivery instruction to the conveyor robot 10 determined to be the movement target (step S212B).

Subsequently, the vehicle manager B223 determines the conveyor robot 10 (hereinafter referred to as an alternative robot 10 as necessary) to be moved to a movement source floor among the plurality of conveyor robots 10 located on a movement destination floor (step S214B).

As shown in FIG. 36, for example, when two conveyor robots 10i and 10j have moved from the first floor that is the current floor to the second floor that is the movement destination floor, the number of conveyor robots 10 operating on the first floor is decreased by two and the number of conveyor robots 10 operating on the second floor is increased by two. Therefore, the vehicle manager B223 determines an alternative robot 10 moved from the first floor in place of the conveyor robot 10 moved to the first floor among a plurality of conveyor robots 10 located on the second floor so that the conveyor robot 10 moved from the second floor that is the movement destination floor to the first floor that is the movement source floor is replenished.

For example, as in the above-described processing of S202, when it is determined whether or not the movement source floor has a higher vehicle conveyance frequency than the movement destination floor and it is determined that the movement source floor has a higher vehicle conveyance frequency than the movement destination floor, the vehicle manager 223 determines two conveyor robots 10 whose states are more suitable than those of the other conveyor robots 10 among the plurality of conveyor robots 10 located on the movement destination floor as alternative robots 10.

On the other hand, when it is determined that the movement source floor has a lower vehicle conveyance frequency than the movement destination floor, the vehicle manager 223 determines two conveyor robots 10 whose states are not more suitable than those of the other conveyor robots 10 among the plurality of conveyor robots 10 located on the movement destination floor as alternative robots 10.

In the example of FIG. 36, the two conveyor robots 10 whose states are more suitable state than those of the other conveyor robots 10 among the plurality of conveyor robots 10 located on the second floor are determined to be the alternative robots 10.

When the alternative robots 10 are determined, the vehicle manager B223 may reorganize the set as in the processing of S210B.

When the alternative robots 10 are determined by the vehicle manager B223, the parking location controller B222 causes the alternative robots 10 to move to the movement source floor using the elevator EV (step S216B). In this way, when two conveyor robots 10 have moved from a certain floor to another floor, two conveyor robots 10 are sent back from the other floor to the original floor. That is, the number of conveyor robots 10 to be moved from a certain movement source floor to the movement destination floor is the same as the number of conveyor robots 10 to be moved from the movement destination floor to the movement source floor. Thereby, the number of conveyor robots 10 on each floor can be kept constant. Thereby, the process of the present flowchart ends.

According to the above-described third embodiment, the management system BS for managing a vehicle parked in the multistory parking lot B300 where the elevator EV is provided includes the conveyor robot 10 configured to be able to travel autonomously and convey the vehicle M; and the vehicle management server B200 configured to cause the conveyor robot 10 to travel autonomously on a floor of the multistory parking lot B300 and causes the conveyor robot 10 to move to the vehicle M, wherein, when the vehicle M is moved to another floor of the multistory parking lot B300, the vehicle management server B200 causes the conveyor robot 10 to convey the vehicle M to the elevator EV and causes the elevator EV on which the vehicle M is placed to move to the other floor. Thereby, the vehicle M can be efficiently conveyed in the multistory parking lot B300.

Also, according to the above-described third embodiment, a conveyor robot 10 whose state is more suitable among a plurality of conveyor robots 10 located on a movement source floor is moved to a movement destination floor when a vehicle conveyance frequency of the movement destination floor is higher and a conveyor robot 10 whose state is not more suitable among the plurality of conveyor robots 10 located on the movement source floor is moved to the movement destination floor when a vehicle conveyance frequency of the movement destination floor is lower. As a result, it is possible to limit the bias of the operating state in which only some of the conveyor robots 10 among the plurality of conveyor robots 10 operating in the multistory parking lot 300 are concentrated and operated.

Also, according to the above-described third embodiment, because a number of conveyor robots 10 according to the number of wheels of the vehicle M that is the conveyance target are operated as one set when the conveyor robot 10 is moved to another floor so that the bias of the operating state is limited, it is possible to limit the occurrence of an excess conveyor robot 10 on the movement source floor or the movement destination floor.

Also, according to the above-described third embodiment, because some conveyor robots 10 remaining in the existing sets are used as a new set when some of the conveyor robots 10 included in each of a plurality of existing sets different from each other are used as a new set and moved, it is possible to further limit the bias of the operating state.

Also, according to the above-described third embodiment, because the conveyor robot 10 is moved together with the vehicle M when the conveyor robot 10 is moved to another floor so that the bias of the operating state is limited, it is possible to reduce the number of operations of the elevator EV.

Also, according to the above-described third embodiment, because conveyor robots 10 equal in number to conveyor robots 10 moved to another floor are sent back from the movement destination floor to the movement source floor when the conveyor robots 10 are moved to the other floor so that the bias of the operating state is limited, the number of conveyor robots 10 on each floor can be kept constant. As a result, the conveyor robot 10 can be operated according to the vehicle conveyance frequency on each floor.

Also, according to the above-described third embodiment described above, the stability of the vehicle conveying device 1 in which a master machine and slave machines are set can be improved because one conveyor robot 10 whose state is more suitable than those of the other conveyor robots 10 among a plurality of conveyor robots 10 combined as one set is determined to be a master machine and the remaining conveyor robots 10 are determined to be slave machines.

Also, each of the first and third embodiments described above may be a combination of some or all of the other embodiments.

Although modes for carrying out the present invention have been described using embodiments, the present invention is not limited to the embodiments and various modifications and substitutions can also be made without departing from the scope and spirit of the present invention.

What is claim is:

1. A management system comprising:
a vehicle management device configured to manage parking of a vehicle in a parking space and delivery of the vehicle from the parking space; and
a vehicle conveying device configured to be able to convey the vehicle in forward-backward and widthwise directions of the vehicle,
wherein the vehicle management device includes a controller configured to control the vehicle conveying device so that the vehicle is conveyed to the parking space when a request for parking the vehicle located within a section where parking in the parking space is able to be requested has been received,
wherein the controller controls the vehicle conveying device so that a distance from another vehicle parked within the parking space in the forward-backward direction is less than a prescribed distance and the vehicle is parallel parked with respect to the another vehicle, and
wherein, when a plurality of vehicles are parallel parked in the parking space, the vehicle conveying device is on standby in a state in which at least one of a foremost vehicle and a rearmost vehicle among the plurality of vehicles that are parallel parked is able to be conveyed.

2. The management system according to claim 1, wherein the prescribed distance is a distance at which the vehicle is not able to be delivered from the parking space even if the vehicle moves in the forward-backward direction with a steering operation.

3. The management system according to claim 1, wherein, when the plurality of vehicles are parallel parked in the parking space, the controller controls the vehicle conveying device so that at least one of a foremost vehicle and a rearmost vehicle among the plurality of vehicles that are parallel parked is parked in proximity to a boundary of the parking space.

4. The management system according to claim 1, wherein the controller controls the vehicle conveying device so that a parking location of the vehicle that is a conveyance target is determined on the basis of location information of other vehicles parked within the parking space and the vehicle that is the conveyance target is conveyed to the determined parking location.

5. The management system according to claim 1, further comprising an adjuster configured to cause a vehicle parked within the parking space to move by controlling the vehicle conveying device so that a distance between vehicles parked within the parking space in the forward-backward direction is less than the prescribed distance when the distance between the vehicles parked within the parking space in the forward-backward direction is greater than or equal to the prescribed distance according to the delivery of the vehicle.

6. The management system according to claim 1, wherein the vehicle management device further includes a manager configured to calculate a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered.

7. The management system according to claim 6, wherein, when the parking time period has exceeded a prescribed time period, the manager controls the vehicle conveying device so that a vehicle whose parking time period has exceeded the prescribed time period is conveyed outside of the parking space.

8. The management system according to claim 6, wherein, when the parking time period has exceeded a prescribed time period, the manager requests conveyance of the vehicle whose parking time period has exceeded the prescribed time period by another device different from the vehicle conveying device.

9. A management system comprising:
a vehicle conveying device configured to convey a vehicle that has entered a management area; and
a management device configured to manage the management area,
wherein the management device includes
a determiner configured to determine whether or not it is necessary to convey a target vehicle that has entered the management area; and
a first controller configured to cause the target vehicle to be conveyed to a target conveyance point by controlling the vehicle conveying device when the determiner determines that it is necessary to convey the target vehicle,
wherein the determiner determines that it is unnecessary to convey the target vehicle when the target vehicle is able to travel autonomously according to control of the management device,
wherein the management device further includes a second controller configured to cause the target vehicle to move to a target movement point by controlling the target vehicle when the determiner determines that it is unnecessary to convey the target vehicle, and
wherein the first controller causes the target vehicle to be conveyed to a target conveyance point within a range of a first area near a gate of the management area by controlling the vehicle conveying device, and
wherein the second controller causes the target vehicle to be moved to the target movement point within a range of a second area that is not near the gate of the management area by controlling the target vehicle.

10. The management system according to claim 9,
wherein the first controller designates target conveyance points in order from a location nearest a gate of the management area, and
wherein the second controller designates target movement points in order from a location farthest from the gate of the management area.

11. The management system according to claim 9,
wherein the management device limits a traveling area where the vehicle conveying device is able to travel,
wherein the first controller designates a location where a filling density of vehicles in the traveling area becomes high as the target conveyance point, and
wherein the second controller designates a location where parking/delivery efficiency for vehicles becomes high as the target movement point.

12. A management system for managing a vehicle within a multistory parking lot where an elevator is provided, the management system comprising:
a conveyor device configured to be able to travel autonomously and convey the vehicle; and a control device configured to cause the conveyor device to travel autonomously on a floor of the multistory parking lot and cause the conveyor device to convey the vehicle, wherein the control device causes the conveyor device to convey the vehicle into the elevator when the vehicle is moved from a first floor of the multistory parking lot to a second floor, wherein the control device causes the elevator into which the vehicle has been carried to be moved from the first floor to the second floor, wherein the control device further causes the conveyor device to be placed on the elevator by causing the conveyor device to travel autonomously, wherein the control device further causes the conveyor device to be moved from the first floor to the second floor by lifting or lowering the elevator on which the conveyor device is placed, and wherein the control device determines a conveyor device to be placed on the elevator and moved to the second floor from among a plurality of conveyor devices on the basis of a state of each of the plurality of conveyor devices.

13. The management system according to claim 12, wherein the control device causes a conveyor device whose state is not more suitable than those of other conveyor devices among the plurality of conveyor devices located on the first floor to be moved to the second floor via the elevator when the first floor has a higher vehicle conveyance frequency than the second floor, wherein the control device causes a conveyor device whose state is more suitable than those of the other conveyor devices among the plurality of conveyor devices located on the first floor to be moved to the second floor via the elevator when the first floor has a lower vehicle conveyance frequency than the second floor, and wherein the conveyor device whose state is more suitable than those of the other conveyor devices has little physical deterioration and maintains high quality and performance relative to the other conveyor devices, and the conveyor device whose state is not more suitable than those of the other conveyor devices has more physical deterioration and maintains lower quality and performance relative to the other conveyor devices.

14. The management system according to claim 12, wherein the control device further causes a conveyor device whose state is more suitable than those of other conveyor devices among the plurality of conveyor devices located on the second floor to be moved to the first floor via the elevator when the first floor has a higher vehicle conveyance frequency than the second floor, wherein the control device further causes a conveyor device whose state is not more suitable than those of the other conveyor devices among the plurality of conveyor devices located on the second floor to be moved to the first floor via the elevator when the first floor has a lower vehicle conveyance frequency than the second floor, and wherein the conveyor device whose state is more suitable than those of the other conveyor devices has little physical deterioration and maintains high quality and performance relative to the other conveyor devices, and the conveyor device whose state is not more suitable than those of the other conveyor devices has more physical deterioration and maintains lower quality and performance relative to the other conveyor devices.

15. The management system according to claim 12, wherein the control device controls movement of the conveyor device between floors so that the number of conveyor devices on each floor is not changed.

16. The management system according to claim 12, wherein, when the vehicle is moved from the first floor to the second floor via the elevator, the control device causes the conveyor device to be moved to the second floor together with the vehicle.

17. The management system according to claim 12,
wherein the control device sets a number of conveyor devices according to a number of wheels of a vehicle that is a conveyance target as one set and causes the conveyor devices to travel autonomously, and wherein, when a first conveyor device that is a conveyor device among a plurality of conveyor devices included in a first set located on the first floor is moved to the second floor via the elevator, the control device sets a second conveyor device that is a conveyor device included in a second set located on the first floor and the first conveyor device as a new set and causes the new set to be moved to the second floor.

18. The management system according to claim 17,
wherein the control device determines any one conveyor device whose state is more suitable than those of other conveyor devices among the plurality of conveyor devices included in a set as a master system conveyor device and determines remaining conveyor devices as slave system conveyor devices, and wherein the master system conveyor device controls the slave system conveyor devices on the basis of an instruction from the control device, and wherein the conveyor device whose state is more suitable than those of the other conveyor devices has little physical deterioration and maintains high quality and performance relative to the other conveyor devices.

19. The management system according to claim 17, wherein the control device further sets a third conveyor device that is a remaining conveyor device when the first conveyor device is excluded from the first set and a fourth conveyor device that is the remaining conveyor device when the second conveyor device is excluded from the second set as a new set.

20. The management system according to claim 19, wherein, when a new set is reorganized, the control device redetermines a master system conveyor device and a slave system conveyor device in the reorganized set.

21. A management method of managing parking of a vehicle in a parking space and delivery of the vehicle from the parking space, the management method comprising:
controlling, by a computer of a vehicle management device, a vehicle conveying device capable of conveying the vehicle in forward-backward and widthwise directions of the vehicle so that the vehicle is conveyed to the parking space when a request for parking the vehicle located within a section where parking in the parking space is able to be requested has been received; and controlling, by the computer of the vehicle management device, the vehicle conveying device so that a distance from another vehicle parked within the parking space in the forward-backward direction is less than a prescribed distance and the vehicle is parallel parked with respect to the another vehicle, wherein, when a plurality of vehicles are parallel parked in the parking space, the vehicle conveying device is on standby in a state in which at least one of a foremost vehicle and a rearmost vehicle among the plurality of vehicles that are parallel parked is able to be conveyed.

22. A non-transitory computer-readable storage medium storing a program for managing parking of a vehicle in a parking space and delivery of the vehicle from the parking space, the program causing a computer of a vehicle management device to:
control a vehicle conveying device capable of conveying the vehicle in forward-backward and widthwise directions of the vehicle so that the vehicle is conveyed to the parking space when a request for parking the vehicle located within a section where parking in the parking space is able to be requested has been received; and
control the vehicle conveying device so that a distance from another vehicle parked within the parking space in the forward-backward direction is less than a prescribed distance and the vehicle is parallel parked with respect to the another vehicle,
wherein, when a plurality of vehicles are parallel parked in the parking space, the vehicle conveying device is on standby in a state in which at least one of a foremost vehicle and a rearmost vehicle among the plurality of vehicles that are parallel parked is able to be conveyed.

23. A management device for managing a management area, the management device comprising:
a determiner configured to determine whether or not it is necessary to convey a target vehicle that has entered the management area; and
a first controller configured to cause the target vehicle to be conveyed to a target conveyance point by controlling a vehicle conveying device that conveys a vehicle that has entered the management area when the determiner determines that it is necessary to convey the target vehicle,
wherein the determiner determines that it is unnecessary to convey the target vehicle when the target vehicle is able to travel autonomously according to control of the management device,
wherein the management device further includes a second controller configured to cause the target vehicle to move to a target movement point by controlling the target vehicle when the determiner determines that it is unnecessary to convey the target vehicle,
wherein the first controller causes the target vehicle to be conveyed to a target conveyance point within a range of a first area near a gate of the management area by controlling the vehicle conveying device, and
wherein the second controller causes the target vehicle to be moved to the target movement point within a range of a second area that is not near the gate of the management area by controlling the target vehicle.

24. A management method comprising:
determining, by a computer of a management device, whether or not it is necessary to convey a target vehicle that has entered a management area;
causing, by the computer of the management device, the target vehicle to be conveyed to a target conveyance point by controlling a vehicle conveying device that conveys a vehicle that has entered the management area when it is determined that it is necessary to convey the target vehicle;
determining, by the computer of the management device, that it is unnecessary to convey the target vehicle when the target vehicle is able to travel autonomously according to control of the management device;
causing, by the computer of the management device, the target vehicle to move to a target movement point by controlling the target vehicle when it is determined that it is unnecessary to convey the target vehicle;
causing, by the computer of the management device, the target vehicle to be conveyed to a target conveyance point within a range of a first area near a gate of the management area by controlling the vehicle conveying device; and
causing, by the computer of the management device, the target vehicle to be moved to the target movement point within a range of a second area that is not near the gate of the management area by controlling the target vehicle.

25. A non-transitory computer-readable storage medium storing a program for causing a computer of a management device to:
determine whether or not it is necessary to convey a target vehicle that has entered a management area;
cause the target vehicle to be conveyed to a target conveyance point by controlling a vehicle conveying device that conveys a vehicle that has entered the management area when it is determined that it is necessary to convey the target vehicle;
determine that it is unnecessary to convey the target vehicle when the target vehicle is able to travel autonomously according to control of the management device;
cause the target vehicle to move to a target movement point by controlling the target vehicle when it is determined that it is unnecessary to convey the target vehicle;
cause the target vehicle to be conveyed to a target conveyance point within a range of a first area near a gate of the management area by controlling the vehicle conveying device; and
cause the target vehicle to be moved to the target movement point within a range of a second area that is not near the gate of the management area by controlling the target vehicle.

26. A management method of managing a vehicle parked in a multistory parking lot where an elevator is provided, the management method comprising:
causing, by a computer, the vehicle to be conveyed to a conveyor device capable of traveling autonomously and conveying the vehicle by causing the conveyor device to travel autonomously on a floor of the multistory parking lot;
causing, by the computer, the conveyor device to convey the vehicle into the elevator when the vehicle is moved to another floor of the multistory parking lot;
causing, by the computer, the elevator into which the vehicle is conveyed to be moved from a floor where the vehicle has been conveyed to the another floor;
causing, by the computer, the conveyor device to be placed on the elevator by causing the conveyor device to travel autonomously;
causing, by the computer, the conveyor device to be moved from a first floor to a second floor by lifting or lowering the elevator on which the conveyor device is placed; and
determining, by the computer, a conveyor device to be placed on the elevator and moved to the second floor from among a plurality of conveyor devices on the basis of a state of each of the plurality of conveyor devices.

27. A non-transitory computer-readable storage medium storing a program for managing a vehicle parked in a multistory parking lot where an elevator is provided, the program causing a computer to:
- cause the vehicle to be conveyed to a conveyor device capable of traveling autonomously and conveying the vehicle by causing the conveyor device to travel autonomously on a floor of the multistory parking lot;
- cause the conveyor device to convey the vehicle into the elevator when the vehicle is moved to another floor of the multistory parking lot;
- cause the elevator into which the vehicle is conveyed to be moved from a floor where the vehicle has been conveyed to the another floor;
- cause the conveyor device to be placed on the elevator by causing the conveyor device to travel autonomously;
- cause the conveyor device to be moved from a first floor to a second floor by lifting or lowering the elevator on which the conveyor device is placed; and
- determine a conveyor device to be placed on the elevator and moved to the second floor from among a plurality of conveyor devices on the basis of a state of each of the plurality of conveyor devices.

28. A management system comprising:
- a vehicle management device configured to manage parking of a vehicle in a parking space and delivery of the vehicle from the parking space; and
- a vehicle conveying device configured to be able to convey the vehicle in forward-backward and widthwise directions of the vehicle,
- wherein the vehicle management device includes a controller configured to control the vehicle conveying device so that the vehicle is conveyed to the parking space when a request for parking the vehicle located within a section where parking in the parking space is able to be requested has been received,
- wherein the controller controls the vehicle conveying device so that a distance from another vehicle parked within the parking space in the forward-backward direction is less than a prescribed distance and the vehicle is parallel parked with respect to the another vehicle, and
- wherein, when a plurality of vehicles are parallel parked in the parking space, the controller controls the vehicle conveying device so that at least one of a foremost vehicle and a rearmost vehicle among the plurality of vehicles that are parallel parked is parked in proximity to a boundary of the parking space.

29. A management method of managing parking of a vehicle in a parking space and delivery of the vehicle from the parking space, the management method comprising:
- controlling, by a computer of a vehicle management device, a vehicle conveying device capable of conveying the vehicle in forward-backward and widthwise directions of the vehicle so that the vehicle is conveyed to the parking space when a request for parking the vehicle located within a section where parking in the parking space is able to be requested has been received;
- controlling, by the computer, the vehicle conveying device so that a distance from another vehicle parked within the parking space in the forward-backward direction is less than a prescribed distance and the vehicle is parallel parked with respect to the another vehicle; and
- when a plurality of vehicles are parallel parked in the parking space, controlling, by the computer, the vehicle conveying device so that at least one of a foremost vehicle and a rearmost vehicle among the plurality of vehicles that are parallel parked is parked in proximity to a boundary of the parking space.

30. A non-transitory computer-readable storage medium storing a program for managing parking of a vehicle in a parking space and delivery of the vehicle from the parking space, the program causing a computer of a vehicle management device to:
- control a vehicle conveying device capable of conveying the vehicle in forward-backward and widthwise directions of the vehicle so that the vehicle is conveyed to the parking space when a request for parking the vehicle located within a section where parking in the parking space is able to be requested has been received;
- control the vehicle conveying device so that a distance from another vehicle parked within the parking space in the forward-backward direction is less than a prescribed distance and the vehicle is parallel parked with respect to the another vehicle; and
- when a plurality of vehicles are parallel parked in the parking space, control the vehicle conveying device so that at least one of a foremost vehicle and a rearmost vehicle among the plurality of vehicles that are parallel parked is parked in proximity to a boundary of the parking space.

31. A management system comprising:
- a vehicle management device configured to manage parking of a vehicle in a parking space and delivery of the vehicle from the parking space; and
- a vehicle conveying device configured to be able to convey the vehicle in forward-backward and widthwise directions of the vehicle,
- wherein the vehicle management device includes a controller configured to control the vehicle conveying device so that the vehicle is conveyed to the parking space when a request for parking the vehicle located within a section where parking in the parking space is able to be requested has been received,
- wherein the vehicle management device further includes a manager configured to calculate a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered, and
- wherein, when the parking time period has exceeded a prescribed time period, the manager controls the vehicle conveying device so that a vehicle whose parking time period has exceeded the prescribed time period is conveyed outside of the parking space.

32. A management method of managing parking of a vehicle in a parking space and delivery of the vehicle from the parking space, the management method comprising:
- controlling, by a computer of a vehicle management device, a vehicle conveying device capable of conveying the vehicle in forward-backward and widthwise directions of the vehicle so that the vehicle is conveyed to the parking space when a request for parking the vehicle located within a section where parking in the parking space is able to be requested has been received;
- calculating, by the computer of the vehicle management device, a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered; and when the parking time period has exceeded a prescribed time period, controlling, by the computer of the vehicle management device, the vehicle conveying device so that a vehicle whose parking time period has exceeded the prescribed time period is conveyed outside of the parking space.

33. A non-transitory computer-readable storage medium storing a program for managing parking of a vehicle in a parking space and delivery of the vehicle from the parking space, the program causing a computer of a vehicle management device to:

control a vehicle conveying device capable of conveying the vehicle in forward-backward and widthwise directions of the vehicle so that the vehicle is conveyed to the parking space when a request for parking the vehicle located within a section where parking in the parking space is able to be requested has been received;

calculate a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered; and when the parking time period has exceeded a prescribed time period, control the vehicle conveying device so that a vehicle whose parking time period has exceeded the prescribed time period is conveyed outside of the parking space.

34. A management system comprising:

a vehicle management device configured to manage parking of a vehicle in a parking space and delivery of the vehicle from the parking space; and a vehicle conveying device configured to be able to convey the vehicle in forward-backward and widthwise directions of the vehicle, wherein the vehicle management device includes a controller configured to control the vehicle conveying device so that the vehicle is conveyed to the parking space when a request for parking the vehicle located within a section where parking in the parking space is able to be requested has been received, wherein the vehicle management device further includes a manager configured to calculate a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered, and wherein, when the parking time period has exceeded a prescribed time period, the manager requests conveyance of the vehicle whose parking time period has exceeded the prescribed time period by another device different from the vehicle conveying device.

35. A management method of managing parking of a vehicle in a parking space and delivery of the vehicle from the parking space, the management method comprising:

controlling, by a computer of a vehicle management device, a vehicle conveying device capable of conveying the vehicle in forward-backward and widthwise directions of the vehicle so that the vehicle is conveyed to the parking space when a request for parking the vehicle located within a section where parking in the parking space is able to be requested has been received;

calculating, by the computer of the vehicle management device, a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered; and when the parking time period has exceeded a prescribed time period, requesting, by the computer of the vehicle management device, conveyance of the vehicle whose parking time period has exceeded the prescribed time period by another device different from the vehicle conveying device.

36. A non-transitory computer-readable storage medium storing a program for managing parking of a vehicle in a parking space and delivery of the vehicle from the parking space, the program causing a computer of a vehicle management device to:

control a vehicle conveying device capable of conveying the vehicle in forward-backward and widthwise directions of the vehicle so that the vehicle is conveyed to the parking space when a request for parking the vehicle located within a section where parking in the parking space is able to be requested has been received;

calculate a parking time period of the vehicle on the basis of a start time point when conveyance of the vehicle from a prescribed location within the section has been started by the vehicle conveying device or a parking time point when the vehicle has been parked in the parking space and an end time point when the conveyance of the vehicle outside of the parking space has been ended by the vehicle conveying device or a delivery time point when the vehicle has been delivered; and when the parking time period has exceeded a prescribed time period, request conveyance of the vehicle whose parking time period has exceeded the prescribed time period by another device different from the vehicle conveying device.

37. A management system comprising:

a vehicle management device configured to manage parking of a vehicle in a parking space and delivery of the vehicle from the parking space;

a vehicle conveying device configured to be able to convey the vehicle in forward-backward and widthwise directions of the vehicle, wherein the vehicle management device includes a controller configured to control the vehicle conveying device so that the vehicle is conveyed to the parking space when a request for parking the vehicle located within a section where parking in the parking space is able to be requested has been received, and wherein the controller controls the vehicle conveying device so that a distance from another vehicle parked within the parking space in the forward-backward direction is less than a prescribed distance and the vehicle is parallel parked with respect to the another vehicle; and an adjuster configured to cause a vehicle parked within the parking space to move by controlling the vehicle conveying device so that a distance between vehicles parked within the parking space in the forward-backward direction is less than the prescribed distance when the distance between the vehicles parked within the parking space in the forward-backward direction is greater than or equal to the prescribed distance according to the delivery of the vehicle.

38. A management method of managing parking of a vehicle in a parking space and delivery of the vehicle from the parking space, the management method comprising:

controlling, by a computer of a vehicle management device, a vehicle conveying device capable of conveying the vehicle in forward-backward and widthwise directions of the vehicle so that the vehicle is conveyed to the parking space when a request for parking the vehicle located within a section where parking in the parking space is able to be requested has been received;

controlling, by the computer of the vehicle management device, the vehicle conveying device so that a distance from another vehicle parked within the parking space in the forward-backward direction is less than a prescribed distance and the vehicle is parallel parked with respect to the another vehicle; and controlling, by the computer of the vehicle management device and using an adjuster configured to cause a vehicle parked within the parking space to move, the vehicle conveying device so that a distance between vehicles parked within the parking space in the forward-backward direction is less than the prescribed distance when the distance between the vehicles parked within the parking space in the forward-backward direction is greater than or equal to the prescribed distance according to the delivery of the vehicle.

39. A non-transitory computer-readable storage medium storing a program for managing parking of a vehicle in a parking space and delivery of the vehicle from the parking space, the program causing a computer of a vehicle management device to:

control a vehicle conveying device capable of conveying the vehicle in forward-backward and widthwise directions of the vehicle so that the vehicle is conveyed to the parking space when a request for parking the vehicle located within a section where parking in the parking space is able to be requested has been received;

control the vehicle conveying device so that a distance from another vehicle parked within the parking space in the forward-backward direction is less than a prescribed distance and the vehicle is parallel parked with respect to the another vehicle; and control, using an adjuster configured to cause a vehicle parked within the parking space to move, the vehicle conveying device so that a distance between vehicles parked within the parking space in the forward-backward direction is less than the prescribed distance when the distance between the vehicles parked within the parking space in the forward-backward direction is greater than or equal to the prescribed distance according to the delivery of the vehicle.

40. A management system comprising:

a vehicle conveying device configured to convey a vehicle that has entered a management area; and a management device configured to manage the management area, wherein the management device includes a determiner configured to determine whether or not it is necessary to convey a target vehicle that has entered the management area; and a first controller configured to cause the target vehicle to be conveyed to a target conveyance point by controlling the vehicle conveying device when the determiner determines that it is necessary to convey the target vehicle, wherein the determiner determines that it is unnecessary to convey the target vehicle when the target vehicle is able to travel autonomously according to control of the management device, wherein the management device further includes a second controller configured to cause the target vehicle to move to a target movement point by controlling the target vehicle when the determiner determines that it is unnecessary to convey the target vehicle, wherein the first controller designates target conveyance points in order from a location nearest a gate of the management area, and wherein the second controller designates target movement points in order from a location farthest from the gate of the management area.

41. A management device for managing a management area, the management device comprising:

a determiner configured to determine whether or not it is necessary to convey a target vehicle that has entered the management area; and a first controller configured to cause the target vehicle to be conveyed to a target conveyance point by controlling a vehicle conveying device that conveys a vehicle that has entered the management area when the determiner determines that it is necessary to convey the target vehicle, wherein the determiner determines that it is unnecessary to convey the target vehicle when the target vehicle is able to travel autonomously according to control of the management device, wherein the management device further includes a second controller configured to cause the target vehicle to move to a target movement point by controlling the target vehicle when the determiner determines that it is unnecessary to convey the target vehicle, wherein the first controller designates target conveyance points in order from a location nearest a gate of the management area, and wherein the second controller designates target movement points in order from a location farthest from the gate of the management area.

42. A management method comprising:

determining, by a computer of a management device, whether or not it is necessary to convey a target vehicle that has entered a management area;

causing, by the computer of the management device, the target vehicle to be conveyed to a target conveyance point by controlling a vehicle conveying device that conveys a vehicle that has entered the management area when it is determined that it is necessary to convey the target vehicle;

determining, by the computer of the management device, that it is unnecessary to convey the target vehicle when the target vehicle is able to travel autonomously according to control of the management device;

causing, by the computer of the management device, the target vehicle to move to a target movement point by controlling the target vehicle when it is determined that it is unnecessary to convey the target vehicle;

designating, by the computer of the management device, target conveyance points in order from a location nearest a gate of the management area; and designating, by the computer of the management device, target movement points in order from a location farthest from the gate of the management area.

43. A non-transitory computer-readable storage medium storing a program for causing a computer of a management device to:

determine whether or not it is necessary to convey a target vehicle that has entered a management area;

cause the target vehicle to be conveyed to a target conveyance point by controlling a vehicle conveying device that conveys a vehicle that has entered the management area when it is determined that it is necessary to convey the target vehicle;

determine that it is unnecessary to convey the target vehicle when the target vehicle is able to travel autonomously according to control of the management device;

cause the target vehicle to move to a target movement point by controlling the target vehicle when it is determined that it is unnecessary to convey the target vehicle;

designate target conveyance points in order from a location nearest a gate of the management area; and designate target movement points in order from a location farthest from the gate of the management area.

44. A management system comprising:

a vehicle conveying device configured to convey a vehicle that has entered a management area; and a management device configured to manage the management area, wherein the management device includes a determiner configured to determine whether or not it is necessary to convey a target vehicle that has entered the management area; and a first controller configured to cause the target vehicle to be conveyed to a target conveyance point by controlling the vehicle conveying device when the determiner determines that it is necessary to convey the target vehicle, wherein the determiner determines that it is unnecessary to convey the target vehicle when the target vehicle is able to travel autonomously according to control of the management device, wherein the management device further includes a second controller configured to cause the target vehicle to move to a target movement point by controlling the target vehicle when the determiner determines that it is unnecessary to convey the target vehicle, wherein the management device limits a traveling area where the vehicle conveying device is able to travel, wherein the first controller designates a location where a filling density of vehicles in the traveling area becomes high as the target conveyance point, and wherein the second controller designates a location where parking/delivery efficiency for vehicles becomes high as the target movement point.

45. A management device for managing a management area, the management device comprising:

a determiner configured to determine whether or not it is necessary to convey a target vehicle that has entered the management area; and a first controller configured to cause the target vehicle to be conveyed to a target conveyance point by controlling a vehicle conveying device that conveys a vehicle that has entered the management area when the determiner determines that it is necessary to convey the target vehicle, wherein the determiner determines that it is unnecessary to convey the target vehicle when the target vehicle is able to travel autonomously according to control of the management device, wherein the management device further includes a second controller configured to cause the target vehicle to move to a target movement point by controlling the target vehicle when the determiner determines that it is unnecessary to convey the target vehicle, wherein the management device limits a traveling area where the vehicle conveying device is able to travel, wherein the first controller designates a location where a filling density of vehicles in the traveling area becomes high as the target conveyance point, and wherein the second controller designates a location where parking/delivery efficiency for vehicles becomes high as the target movement point.

46. A management method comprising:

determining, by a computer of a management device, whether or not it is necessary to convey a target vehicle that has entered a management area;

causing, by the computer of the management device, the target vehicle to be conveyed to a target conveyance point by controlling a vehicle conveying device that conveys a vehicle that has entered the management area when it is determined that it is necessary to convey the target vehicle;

determining, by the computer of the management device, that it is unnecessary to convey the target vehicle when the target vehicle is able to travel autonomously according to control of the management device;

causing, by the computer of the management device, the target vehicle to move to a target movement point by controlling the target vehicle when it is determined that it is unnecessary to convey the target vehicle;

limiting, by the computer of the management device, a traveling area where the vehicle conveying device is able to travel;

designating, by the computer of the management device, a location where a filling density of vehicles in the traveling area becomes high as the target conveyance point; and designating, by the computer of the management device, a location where parking/delivery efficiency for vehicles becomes high as the target movement point.

47. A non-transitory computer-readable storage medium storing a program for causing a computer of a management device to:

determine whether or not it is necessary to convey a target vehicle that has entered a management area;

cause the target vehicle to be conveyed to a target conveyance point by controlling a vehicle conveying device that conveys a vehicle that has entered the management area when it is determined that it is necessary to convey the target vehicle;

determine that it is unnecessary to convey the target vehicle when the target vehicle is able to travel autonomously according to control of the management device;

cause the target vehicle to move to a target movement point by controlling the target vehicle when it is determined that it is unnecessary to convey the target vehicle;

limit a traveling area where the vehicle conveying device is able to travel;

designate a location where a filling density of vehicles in the traveling area becomes high as the target conveyance point; and designate a location where parking/delivery efficiency for vehicles becomes high as the target movement point.

48. A management system for managing a vehicle within a multistory parking lot where an elevator is provided, the management system comprising:

a conveyor device configured to be able to travel autonomously and convey the vehicle; and a control device configured to cause the conveyor device to travel autonomously on a floor of the multistory parking lot and cause the conveyor device to convey the vehicle, wherein the control device causes the conveyor device to convey the vehicle into the elevator when the vehicle is moved from a first floor of the multistory parking lot to a second floor, wherein the control device causes the elevator into which the vehicle has been carried to be moved from the first floor to the second floor, wherein the control device further causes the conveyor device to be placed on the elevator by causing the conveyor device to travel autonomously, wherein the control device further causes the conveyor device to be moved from the first floor to the second floor by lifting or lowering the elevator on which the conveyor device is placed, and wherein the control device controls movement of the conveyor device between floors so that the number of conveyor devices on each floor is not changed.

49. A management method of managing a vehicle parked in a multistory parking lot where an elevator is provided, the management method comprising:

causing, by a computer, the vehicle to be conveyed to a conveyor device capable of traveling autonomously and conveying the vehicle by causing the conveyor device to travel autonomously on a floor of the multistory parking lot;

causing, by the computer, the conveyor device to convey the vehicle into the elevator when the vehicle is moved to another floor of the multistory parking lot;

causing, by the computer, the elevator into which the vehicle is conveyed to be moved from a floor where the vehicle has been conveyed to the another floor;

causing, by the computer, the conveyor device to be placed on the elevator by causing the conveyor device to travel autonomously;

causing, by the computer, the conveyor device to be moved from a first floor to a second floor by lifting or lowering the elevator on which the conveyor device is placed; and controlling, by the computer, movement of the conveyor device between floors so that the number of conveyor devices on each floor is not changed.

50. A non-transitory computer-readable storage medium storing a program for managing a vehicle parked in a multistory parking lot where an elevator is provided, the program causing a computer to:

cause the vehicle to be conveyed to a conveyor device capable of traveling autonomously and conveying the vehicle by causing the conveyor device to travel autonomously on a floor of the multistory parking lot;

cause the conveyor device to convey the vehicle into the elevator when the vehicle is moved to another floor of the multistory parking lot;

cause the elevator into which the vehicle is conveyed to be moved from a floor where the vehicle has been conveyed to the another floor;

cause the conveyor device to be placed on the elevator by causing the conveyor device to travel autonomously;

cause the conveyor device to be moved from a first floor to a second floor by lifting or lowering the elevator on which the conveyor device is placed; and control movement of the conveyor device between floors so that the number of conveyor devices on each floor is not changed.

51. A management system for managing a vehicle within a multistory parking lot where an elevator is provided, the management system comprising:

a conveyor device configured to be able to travel autonomously and convey the vehicle; and a control device configured to cause the conveyor device to travel autonomously on a floor of the multistory parking lot and cause the conveyor device to convey the vehicle, wherein the control device causes the conveyor device to convey the vehicle into the elevator when the vehicle is moved from a first floor of the multistory parking lot to a second floor, wherein the control device causes the elevator into which the vehicle has been carried to be moved from the first floor to the second floor, wherein the control device further causes the conveyor device to be placed on the elevator by causing the conveyor device to travel autonomously, wherein the control device further causes the conveyor device to be moved from the first floor to the second floor by lifting or lowering the elevator on which the conveyor device is placed, wherein the control device sets a number of conveyor devices according to a number of wheels of a vehicle that is a conveyance target as one set and causes the conveyor devices to travel autonomously, and wherein, when a first conveyor device that is a conveyor device among a plurality of conveyor devices included in a first set located on the first floor is moved to the second floor via the elevator, the control device sets a second conveyor device that is a conveyor device included in a second set located on the first floor and the first conveyor device as a new set and causes the new set to be moved to the second floor.

52. A management method of managing a vehicle parked in a multistory parking lot where an elevator is provided, the management method comprising:

causing, by a computer, the vehicle to be conveyed to a conveyor device capable of traveling autonomously and conveying the vehicle by causing the conveyor device to travel autonomously on a floor of the multistory parking lot;

causing, by the computer, the conveyor device to convey the vehicle into the elevator when the vehicle is moved to another floor of the multistory parking lot;

causing, by the computer, the elevator into which the vehicle is conveyed to be moved from a floor where the vehicle has been conveyed to the another floor;

causing, by the computer, the conveyor device to be placed on the elevator by causing the conveyor device to travel autonomously;

causing, by the computer, the conveyor device to be moved from a first floor to a second floor by lifting or lowering the elevator on which the conveyor device is placed;

setting, by the computer, a number of conveyor devices according to a number of wheels of a vehicle that is a conveyance target as one set and setting, by the computer, the conveyor devices to travel autonomously; and when a first conveyor device that is a conveyor device among a plurality of conveyor devices included in a first set located on the first floor is moved to the second floor via the elevator, setting, by the computer, a second conveyor device that is a conveyor device included in a second set located on the first floor and the first conveyor device as a new set and causing, by the computer, the new set to be moved to the second floor.

53. A non-transitory computer-readable storage medium storing a program for managing a vehicle parked in a multistory parking lot where an elevator is provided, the program causing a computer to:

cause the vehicle to be conveyed to a conveyor device capable of traveling autonomously and conveying the vehicle by causing the conveyor device to travel autonomously on a floor of the multistory parking lot;

cause the conveyor device to convey the vehicle into the elevator when the vehicle is moved to another floor of the multistory parking lot;

cause the elevator into which the vehicle is conveyed to be moved from a floor where the vehicle has been conveyed to the another floor;

cause the conveyor device to be placed on the elevator by causing the conveyor device to travel autonomously;

cause the conveyor device to be moved from a first floor to a second floor by lifting or lowering the elevator on which the conveyor device is placed;

set a number of conveyor devices according to a number of wheels of a vehicle that is a conveyance target as one set and cause the conveyor devices to travel autonomously; and when a first conveyor device that is a conveyor device among a plurality of conveyor devices included in a first set located on the first floor is moved to the second floor via the elevator, set a second conveyor device that is a conveyor device included in a second set located on the first floor and the first conveyor device as a new set and cause the new set to be moved to the second floor.

* * * * *